(12) United States Patent
Sugihara et al.

(10) Patent No.: US 11,077,579 B2
(45) Date of Patent: *Aug. 3, 2021

(54) STAPLE-REFILL

(71) Applicant: MAX CO., LTD., Tokyo (JP)

(72) Inventors: Shinpei Sugihara, Tokyo (JP); Futoshi Kameda, Tokyo (JP)

(73) Assignee: MAX CO., LTD., Tokyo (JP)

( * ) Notice: Subject to any disclaimer, the term of this patent is extended or adjusted under 35 U.S.C. 154(b) by 353 days.

This patent is subject to a terminal disclaimer.

(21) Appl. No.: 16/113,248

(22) Filed: Aug. 27, 2018

(65) Prior Publication Data

US 2018/0361614 A1   Dec. 20, 2018

Related U.S. Application Data

(60) Continuation of application No. 15/608,298, filed on May 30, 2017, now Pat. No. 10,688,680, which is a
(Continued)

(30) Foreign Application Priority Data

Oct. 13, 2011  (JP) ................................. 2011-226280
Aug. 2, 2012   (JP) ................................. 2012-172231

(51) Int. Cl.
*B27F 7/38* (2006.01)
*B65H 37/04* (2006.01)
(Continued)

(52) U.S. Cl.
CPC .................. *B27F 7/38* (2013.01); *B25C 7/00* (2013.01); *B65H 37/04* (2013.01); *B25C 5/1637* (2013.01);
(Continued)

(58) Field of Classification Search
CPC .......... B27F 7/38; B25C 5/1637; B65H 37/04
(Continued)

(56) References Cited

U.S. PATENT DOCUMENTS 5,474,222 A * 12/1995 Kanai ................... B25C 5/1624
                                              227/120
5,501,387 A *  3/1996 Yoshie ................. B25C 5/1686
                                              206/340
(Continued)

FOREIGN PATENT DOCUMENTS

CN    A-1283553    2/2001
CN    A-1538896    10/2004
(Continued)

OTHER PUBLICATIONS

Office Action dated Nov. 15, 2019 that issued in U.S. Appl. No. 15/608,298.

*Primary Examiner* — Andrew M Tecco
(74) *Attorney, Agent, or Firm* — Faegre Drinker Biddle & Reath LLP

(57) ABSTRACT

A staple-refill 11 is provided with: a casing 12 in which a plurality of sheet-type connected staples 10 are stacked; a staple inserting port 14; a staple discharge port 16; a cover member 15 which covers the sheet-type connected staples 10 in the casing 12 from a side of the staple inserting port 14; and a notch portion 18 formed in the casing 12 and extending from an edge of the staple inserting port 14 in an insertion direction.

10 Claims, 77 Drawing Sheets

Related U.S. Application Data division of application No. 13/645,099, filed on Oct. 4, 2012, now Pat. No. 9,694,509.

(51) Int. Cl.
  *B25C 7/00* (2006.01)
  *B25C 5/16* (2006.01)
  *F16B 15/00* (2006.01)

(52) U.S. Cl.
  CPC ............... *B65H 2301/51611* (2013.01); *B65H 2801/27* (2013.01); *F16B 15/0015* (2013.01)

(58) Field of Classification Search
  USPC ........................................................ 206/340
  See application file for complete search history.

(56) References Cited

U.S. PATENT DOCUMENTS

| | | | | |
|---|---|---|---|---|
| 5,836,502 | A * | 11/1998 | Kanai | B25C 5/1624 227/131 |
| 6,705,504 | B1 | 3/2004 | Kanai et al. | |
| 7,703,650 | B2 * | 4/2010 | Haramiishi | B27F 7/38 227/120 |
| 7,748,587 | B2 * | 7/2010 | Haramiishi | B27F 7/38 227/120 |
| 9,694,509 | B2 * | 7/2017 | Sugihara | B65H 37/04 |
| 10,688,680 | B2 * | 6/2020 | Sugihara | B27F 7/38 |
| 2003/0111504 | A1 | 6/2003 | Kanai et al. | |
| 2003/0111506 | A1 | 6/2003 | Kanai et al. | |
| 2004/0200875 | A1 | 10/2004 | Haramiisiii | |
| 2005/0029324 | A1 * | 2/2005 | Yoshie | B27F 7/38 227/131 |
| 2005/0242149 | A1 * | 11/2005 | Higuchi | B25C 5/1689 227/2 |
| 2006/0144890 | A1 * | 7/2006 | Haramiishi | B27F 7/38 227/120 |
| 2006/0157530 | A1 | 7/2006 | Yagi | |
| 2008/0083805 | A1 * | 4/2008 | Haramiishi | B27F 7/38 227/129 |
| 2009/0212087 | A1 | 8/2009 | Yoshie | |
| 2010/0193563 | A1 | 8/2010 | Haramiishi et al. | |
| 2010/0270353 | A1 * | 10/2010 | Sugihara | B27F 7/21 227/87 |
| 2011/0089215 | A1 * | 4/2011 | Shimizu | B27F 7/38 227/120 |
| 2011/0089216 | A1 * | 4/2011 | Shimizu | B27F 7/38 227/120 |
| 2011/0290849 | A1 * | 12/2011 | Haramiishi | B25C 5/1637 227/120 |
| 2013/0092580 | A1 | 4/2013 | Sugihara et al. | |
| 2017/0197328 | A1 | 7/2017 | Sugihara et al. | |

FOREIGN PATENT DOCUMENTS

| | | |
|---|---|---|
| CN | A-1585689 | 2/2005 |
| CN | 1750915 A | 3/2006 |
| CN | A-1816423 | 8/2006 |
| CN | 1845814 A | 10/2006 |
| CN | A-101870129 | 10/2010 |
| CN | 102059873 A | 5/2011 |
| EP | 0637487 A1 | 2/1995 |
| EP | 1 598 149 A1 | 11/2005 |
| EP | 1 803 535 A1 | 7/2007 |
| EP | 2 311 614 A2 | 4/2011 |
| JP | A-S59-073901 | 4/1984 |
| JP | A-H06-031650 | 2/1994 |
| JP | 7148674 A | 6/1995 |
| JP | 11235679 A | 8/1999 |
| JP | 2004358977 A | 12/2004 |
| JP | 4042159 B2 | 2/2008 |
| JP | A-2008-279583 | 11/2008 |
| JP | A-2011-083872 | 4/2011 |

\* cited by examiner

STAPLE-REFILL

BACKGROUND OF THE INVENTION

Field of the Invention

The present invention relates to a staple-refill, in which a plurality of sheet-type connected staples are stacked and accommodated, capable of supplying the staples to a stapling machine.

Related Art

Electric stapling machines are disclosed, for example, in JP-A-2004-358977, JP-B2-4042159, JP-A-11-235679 and JP-A-07-148674. Among electric stapling machines, there are known a type of stapling machines which are built in a paper processing device provided adjacent to an image forming apparatus, such as a copying machine or a printing machine. The electric stapling machine includes a motor as a driving source, and sequentially strikes the staples. For example, a staple-refill, in which a plurality of sheet-type connected staples are stacked and accommodated, is mounted in a cartridge detachably provided in a stapling-machine main-body. With the electric stapling machine, if a cartridge incorporated with the staple-refill is mounted in a magazine of a stapling-machine main-body, a lowermost sheet-type connected staple is sequentially fed to a striking section during a stapling operation. The sent-out sheet-type connected staples are sequentially bent into substantially U-shapes from a leading end staple among staples, and then are struck by a driver plate towards sheets of paper to be bound on a clincher.

According to the staple-refill in which the plurality of sheet-type connected staples are stacked and accommodated, the casing is provided with a cover member for closing a receiving portion so as to prevent the sheet-type connected staples from being escaped from the accommodating portion. The cover member is movable to the casing in a staking direction in which the sheet-type connected staples are stacked by engaging a guide boss of the cover member with a guide groove. When the cover member is mounted to the stapling-machine main-body, the cover member is pressed by a push lever.

When the staple-refill is manufactured, the sheet-type connected staples are accommodated in the accommodating portion, and then the cover member is attached to the staple-refill. If strength of a lateral plate or the like of the casing, to which the cover member is attached, is excessively high, the lateral plate of the staple-refill is hard to be bent, so that it is difficult to attach the cover member to the casing by engaging the guide boss to the guide groove. Also, if the lateral plate is formed to have a thin thickness to be easily bent, its molding ability is deteriorated. Moreover, the casing is likely to be broken.

SUMMARY OF THE INVENTION

One or more embodiments of the invention provide a staple-refill, in which a cover member can be easily attached to a casing to improve a production efficiency.

According to an embodiment, a staple-refill 11 may include: a casing 12 in which a plurality of sheet-type connected staples 10 are stacked and accommodated; a staple inserting port 14 which is formed in the casing 12 and through which the sheet-type connected staples 10 are inserted in the casing 12 in an insertion direction; a staple discharge port 16 which is formed in the casing 12 and from which the sheet-type connected staples 10 in the casing 12 are discharged; a cover member 15 which covers the sheet-type connected staples 10 in the casing 12 from a side of the staple inserting port 14; a guide boss 22 formed in the cover member 15; a guide portion 21 which is formed in the casing 12 and extending in the insertion direction, the guide boss 22 being engaged with the guide portion 21 to guide the cover member 15 in the insertion direction; and a notch portion 18 formed in the casing 12 and extending from an edge of the staple inserting port 14 in the insertion direction.

Other aspects and advantages of the invention will be apparent from the following description, the drawings and the claims.

BRIEF DESCRIPTION OF THE DRAWINGS

FIGS. 32(A) and 32(B) are diagrams illustrating a locking mechanism of the staple-refill, in which FIG. 32(A) is a plan view of the cartridge, and FIG. 32(B) is a cross-sectional view taken along the line A-A in FIG. 32(A).

FIGS. 54(A) and 54(B) are diagrams illustrating the staple-refill including an H-shaped cover member, in which FIG. 54(A) is a perspective view when seen from its front side, and FIG. 54(B) is a plan view.

FIGS. 55(A) and 55(B) are diagrams illustrating the staple-refill including the casing provided in the lateral surface with a guide hole which is formed as a groove having a bottom, in which FIG. 55(A) is a perspective view when seen from its front side, and FIG. 55(B) is a perspective view illustrating a state in which the cover member is excluded, when seen from its rear view.

FIGS. 56(A) and 56(B) are diagrams illustrating the staple-refill in which a notch portion is not formed in the front surface of the casing, but a notch portion is formed in an opposite lateral surface, in which FIG. 56(A) is a perspective view when seen from its front side, and FIG. 56(B) is a side view.

FIGS. 58(A) and 58(B) are diagrams illustrating the staple-refill including the casing provided in the lateral surface with the guide hole, and the notch portion formed in the rear surface, in which FIG. 58(A) is a perspective view when seen from its front side, and FIG. 58(B) is a perspective view when seen from its rear view.

FIGS. 61(A) and 61(B) are diagrams illustrating a state in which the staple-refill is mounted in the mounting object, such as the package, in the example of FIG. 60, in which FIG. 61(A) is a side view, and FIG. 61(B) is a cross-sectional view taken along the like A-A in FIG. 61(A).

FIGS. 63(A) and 63(B) are diagrams illustrating a state in which the staple-refill is mounted in the mounting object, such as the package, in the example of FIG. 62, in which FIG. 63(A) is a side view, and FIG. 63(B) is a cross-sectional view taken along the like A-A in FIG. 63(A).

FIGS. 89(A) and 89(B) are diagrams illustrating a state in which the push portion of the push lever is engaged with the concave portion of the cover member, in which FIG. 89(A) is a cross-sectional view, and FIG. 89(B) is an enlarged view thereof.

FIGS. 90(A) and 90(B) are diagrams illustrating a state in which the push portion of the push lever is engaged with a stepped portion of the cover member, in which FIG. 90(A) is a cross-sectional view, and FIG. 90(B) is an enlarged view thereof.

FIGS. 91(A) and 91(B) are diagrams illustrating a state in which the push portion of the push lever is engaged with the projection of the cover member, in which FIG. 91(A) is a cross-sectional view, and FIG. 91(B) is an enlarged view thereof.

FIGS. 97(A) and 97(B) are cross-sectional views illustrating the second modification of the locking mechanism when the staple-refill is inserted into the cartridge, in which FIG. 97(A) is a lateral view, and FIG. 97(B) is a cross-sectional view taken along the line A-A in FIG. 97(A).

FIGS. 98(A) and 98(B) are cross-sectional views illustrating the second modification of the locking mechanism when the staple-refill has been inserted into the cartridge, in which FIG. 97(A) is a lateral view, and FIG. 98(B) is a cross-sectional view taken along the line A-A in FIG. 98(A).

DETAILED DESCRIPTION OF THE EMBODIMENTS

Figure 1:
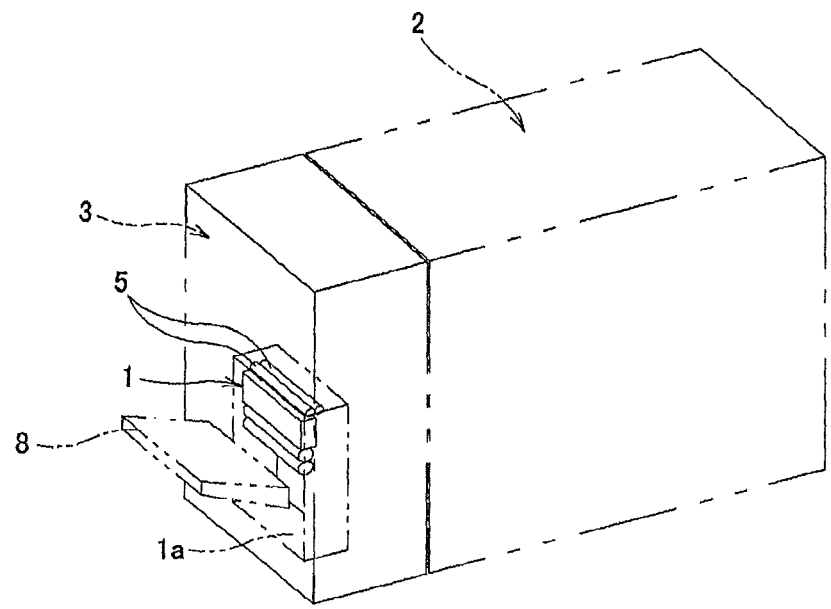
FIG. 1 is a perspective view schematically illustrating an image forming apparatus and a paper processing device.

The description will be given hereinbelow on the basis of embodiments and modifications with reference to the drawings. Further, the embodiments and the modifications are not intended to limit the invention but to merely serve as examples thereof, and all features or combinations thereof described in the embodiments or the modifications are not always essential to the invention.

The description will be performed by the following order.
1. Summary of image forming apparatus and paper processing device (FIGS. 1 to 4)
2. Summary of electric stapling machine (FIGS. 5 to 10)
3. Description of fundamental configuration of staple-refill (FIGS. 10 to 15)
  3-1. Description of casing
  3-2. Description of cover member
4. Description of fundamental configuration of cartridge (FIGS. 5 to 9, FIGS. 29 to 38, and so forth)
  4-1. Description of push lever
  4-2. Description of locking mechanism (engaging portion)
  4-3. Description of staple guide section
  4-4. Description of transfer mechanism
  4-5. Description of positioning mechanism
5. Description of fundamental configuration of magazine (FIGS. 36 to 38, FIG. 41, and so forth)
6. Description of fundamental operation until staple-refill is mounted in cartridge
7. Description of modification of staple-refill (FIGS. 54 to 63)
  7-1. Description of modification of notch portion of casing
  7-2. Description of positioning when staple-refill is mounted in mounting object such as package
8. Description of mounting object (FIGS. 64 to 68)
9. Description of modification of push lever (FIGS. 69 to 78)
  9-1. First description of modification of push lever and notch portion
  9-2. Second description of modification of push lever and notch portion
10. Description of modification of guide of push lever (FIGS. 79 and 91)
11. Description of modification of locking mechanism of staple-refill (FIGS. 92 to 99)
  11-1. Description of first modification of locking mechanism
  11-2. Description of second modification of locking mechanism
12. Description of positioning of staple-refill in height direction (FIGS. 100 to 103)
13. Other modifications
  13-1. Description of first modification
  13-2. Description of second modification (FIGS. 104 to 108)

<1. Summary of Image Forming Apparatus and Paper Processing Device (FIGS. 1 to 4)>

Figure 2:
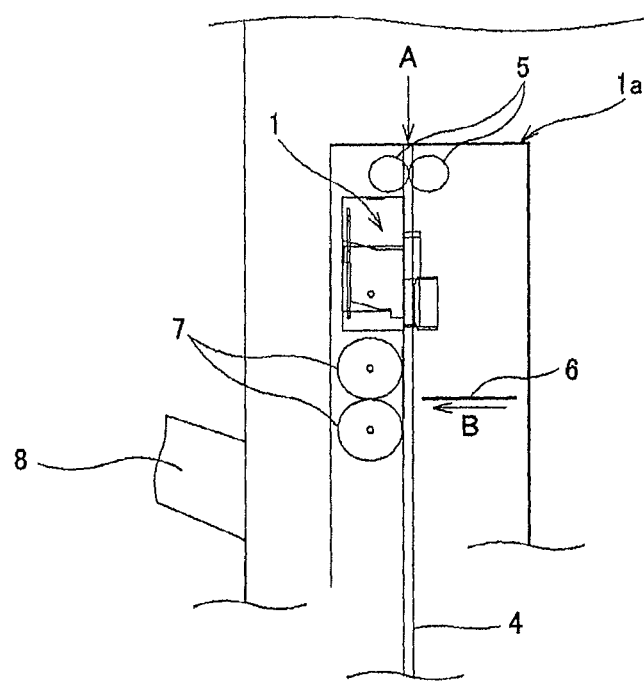
FIG. 2 is a cross-sectional view of major parts of the paper processing device.

As illustrated in FIG. 1, an electric stapling machine 1 using a staple-refill according to an embodiment, in which a plurality of sheet-type connected staples are stacked and accommodated, is used, for example, as an electric stapling machine for saddle stitch. According to an embodiment, the electric stapling machine 1 is incorporated in a paper processing device 3 provided adjacent to an image forming apparatus 2, such as a copying machine or a printing machine. Specifically, the paper processing device 3 is provided with a saddle stitch unit 1a for saddle-stitching sheets of paper 4 to be bound. The saddle stitch unit 1a includes, as illustrated in FIG. 2, guide rollers 5 and 5 for guiding the sheets of paper 4, a knife edge 6 for folding a paper center, and a pair of folding rollers 7 and 7 for the center folding, in addition to the electric stapling machine 1. When the sheets of paper 4 printed by the image forming apparatus 2 is saddle-stitched, for example, the sheets of paper 4 are guided by the pair of guide rollers 5 and 5 from the image forming apparatus 2, and is fed from a direction of the arrow A in FIG. 2, so that a predetermined number of sheets of paper are stored. The predetermined number of sheets of paper 4 to be bound are saddle-stitched by the electric stapling machine 1. After that, the sheets of paper 4 which are saddle-stitched are transferred to a position suitable for a knife edge 6, and then the knife edge 6 is moved in a direction of the arrow B in FIG. 2 which is vertical to the sheets of paper 4, and enters between the pair of folding rollers 7 and 7, so that the sheets of paper 4 which are folded at its center are discharged through a discharge tray 8.

Figure 3:
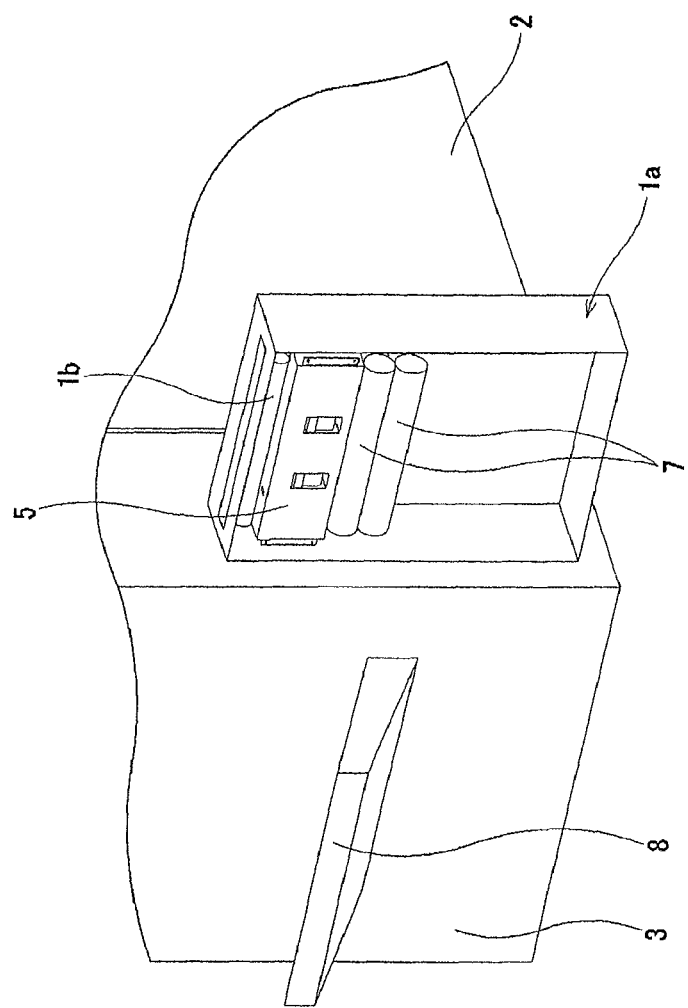
FIG. 3 is a perspective view illustrating a state in which a saddle stitch unit is drawn from the paper processing device.
Figure 4:
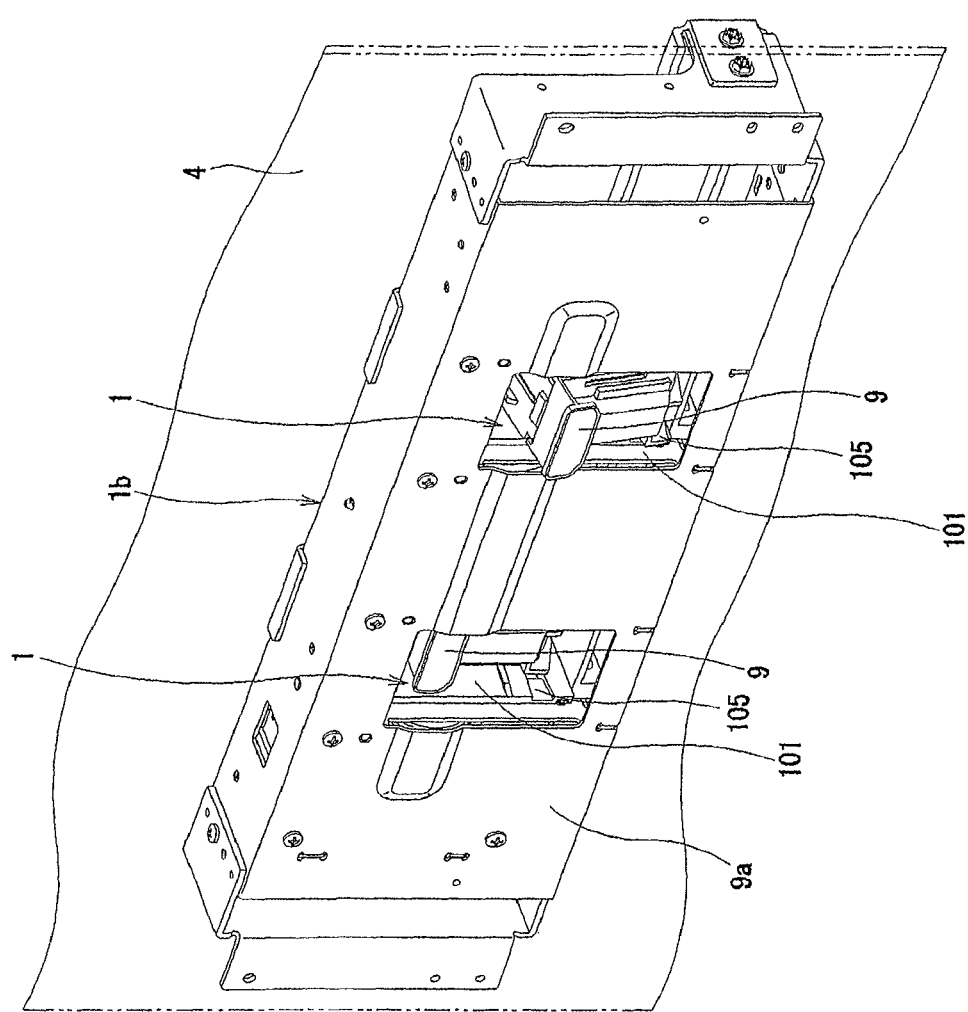
FIG. 4 is a perspective view of a staple unit.
Figure 5:
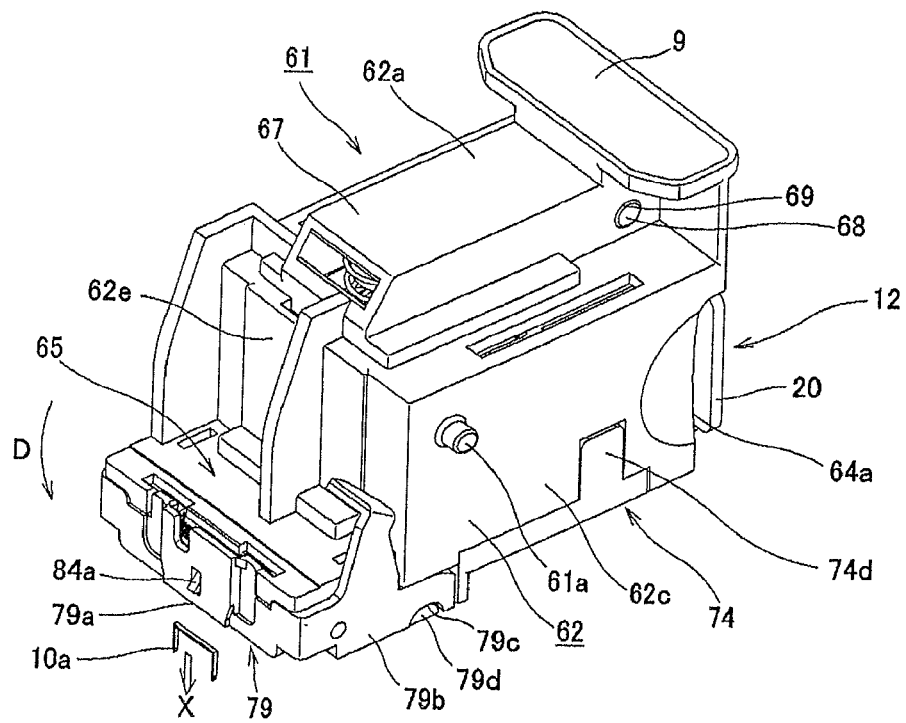
FIG. 5 is a perspective view of a cartridge mounted with a staple-refill, when seen from its front side.
Figure 6:
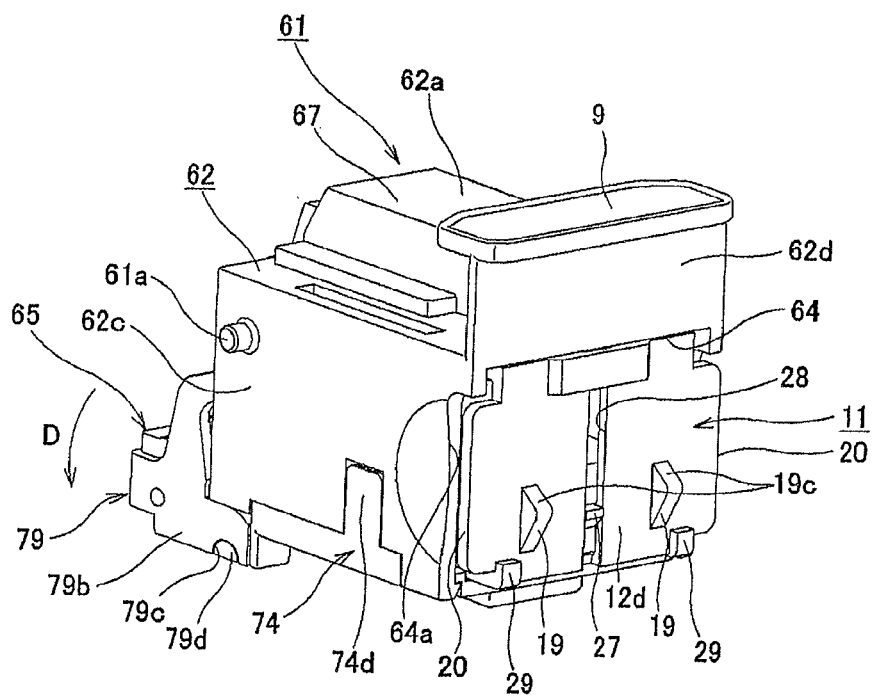
FIG. 6 is a perspective view of the cartridge mounted with the staple-refill, when seen from its rear side.

As illustrated in FIG. 3, when no staple is in the staple-refill and thus the sheet-type connected staples are additionally provided, a saddle stitch unit 1a is pulled out from the paper processing device 3. As illustrated in FIG. 4, the staple unit 1b is provided with two electric stapling machines 1 and 1 to bind the sheets of paper 4 at plural positions, for example, two positions. Each of the electric stapling machines 1 can be pulled out from a frame 9a configuring an outer housing by holding a tap 9 with a hand and pivoting it outward. In the pulled state, the empty staple-refill in which the sheet-type connected staple is completely consumed can be replaced by a staple-refill charged with the sheet-type connected staples. Specifically, exchanging operation of the staple-refill is performed in the electric stapling machine 1 by mounting the cartridge additionally provided with the sheet-type connected staples in a magazine 105 of the stapling-machine main-body. Meanwhile, FIG. 4 illustrates the state in which the right electric stapling machine 1 is pulling out outwardly. After that, as illustrated in FIG. 3, the electric stapling machine 1 is returned into the frame 9a, and the saddle stitch unit 1a is returned into the paper processing device 3, thereby completing the exchanging operation of the staple-refill. Also, when carrying out jam cleaning to remove and clean a staple clogged at the rear of a faceplate. In this way, the paper processing device 3 can manipulate the electric stapling machine 1 to carry out the exchanging operation of the staple-refill in the state in which the saddle stitch unit 1a is pulled out.

<2. Summary of Electric Stapling Machine (FIGS. 5 to 10)>

Figure 7:
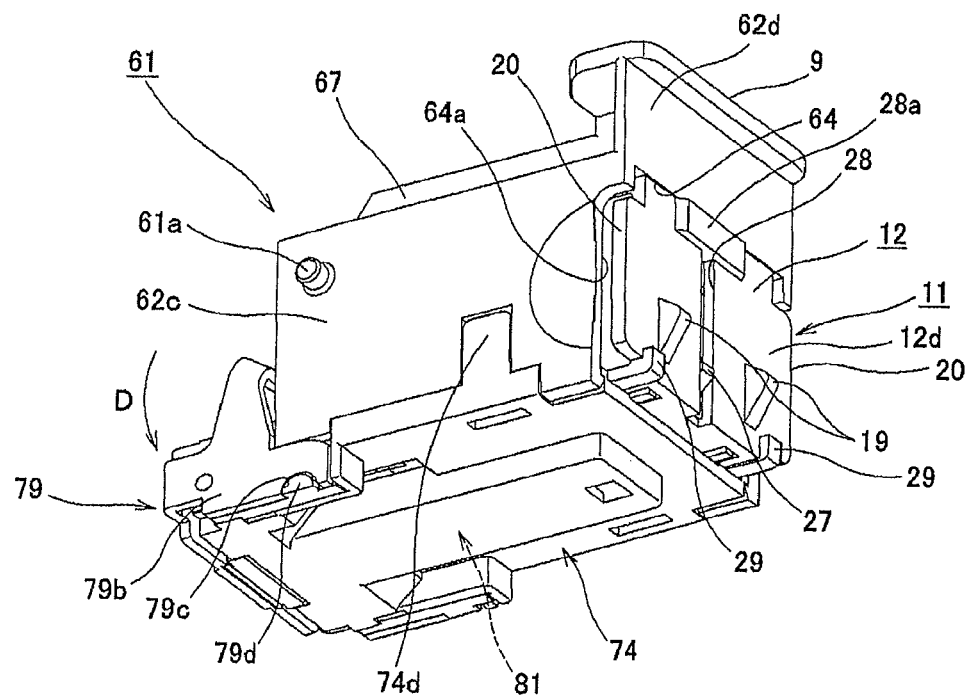
FIG. 7 is a perspective view of the cartridge mounted with the staple-refill, when seen from its bottom side.
Figure 8:
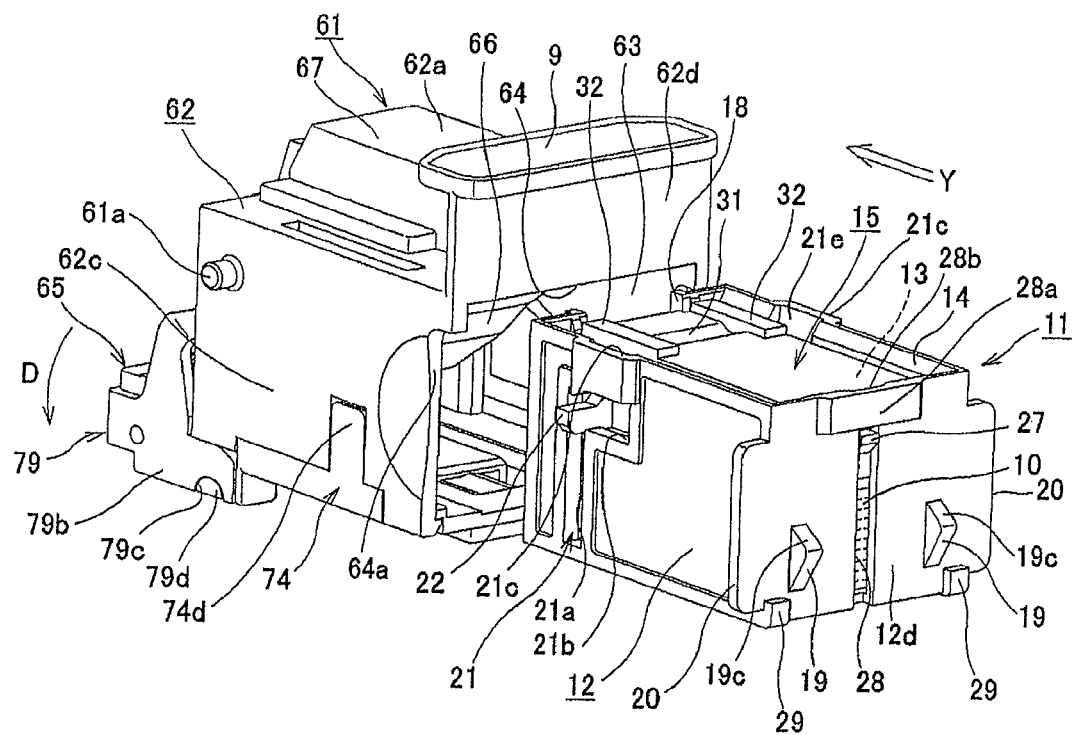
FIG. 8 is a perspective view of a state before the staple-refill loaded with the maximum amount of sheet-type connected staples is mounted in the cartridge, when seen from its rear side.
Figure 9:
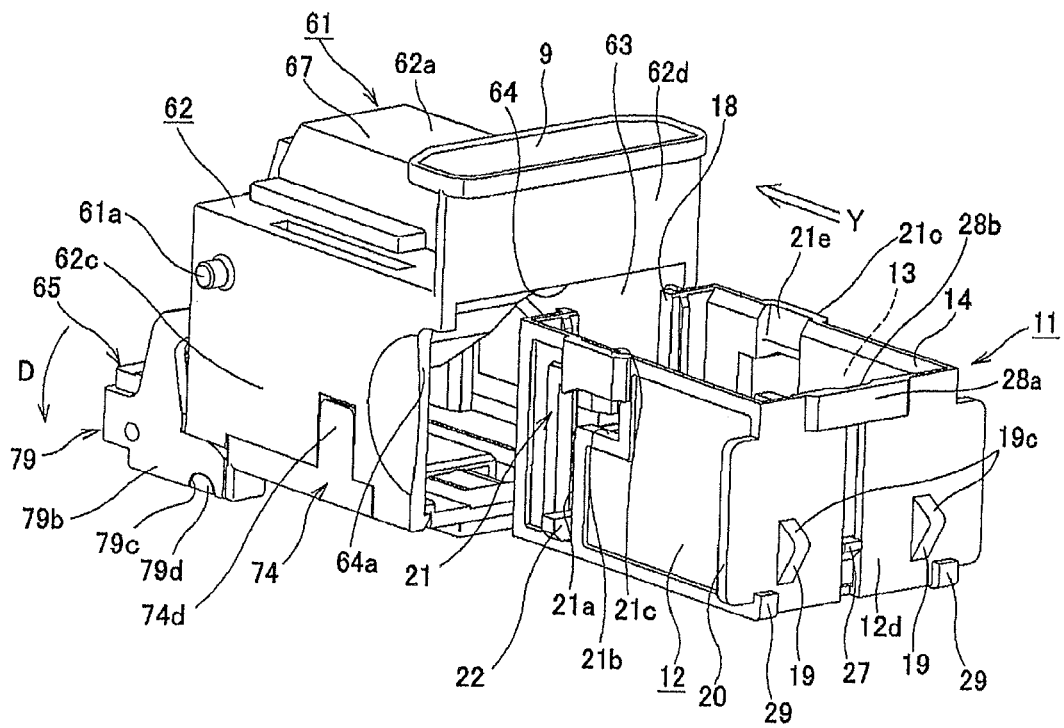
FIG. 9 is a perspective view of a state after the staple-refill with the sheet-type connected staples completely consumed is detached from the cartridge, when seen from its rear side.

As illustrated in FIGS. 5 to 10, the electric stapling machine includes a staple-refill in which sheet-type connected staples 10 with a plurality of straight-shaped staples arranged in parallel with each other and connected to each other in a sheet shape are stacked and accommodated, and a cartridge 61 in which the staple-refill 1 is mounted in the magazine of the stapling-machine main-body of the electric stapling machine 1. The cartridge 61 is provided with a striking section 65 for the sheet-type connected staple 10. In the striking section 65, the sheet-type connected staples sent from the staple-refill 11 is formed one by one by the forming plate driven by a driving mechanism at the side of the stapling-machine main-body, and the formed staples are struck one by one in a direction of the arrow X in FIG. 5 by a driver plate driven by the driving mechanism at the side of the stapling-machine main-body. The staple-refill 11 is detachable from the cartridge 61. As illustrated in FIG. 8, the staple-refill is mounted in the cartridge 61 from a direction of the arrow Y in FIG. 8 in the state in which the staple-refill is loaded with the maximum amount of the sheet-type connected staples 10, while, as illustrated in FIG. 9, when the sheet-type connected staple 10 is completely consumed, the staple-refill is pulled out from the cartridge 61 in a direction opposite to a direction of the arrow Y in FIG. 9, so that the staple-refill is replaced by a new staple-refill 11 loaded with the maximum amount of the sheet-type connected staples 10.

<3. Description of Fundamental Configuration of Staple-Refill (FIGS. 10 to 15)>

<3-1. Description of Casing>

The casing 11 is formed from, for example, plastic by injection molding, and has a rectangular parallelepiped casing 12, as illustrated in FIGS. 10 to 15. The casing 12 is provided a staple accommodating portion 13 in which the sheet-type connected staples 10 are stacked and accommodated therein. The casing 12 has a staple inserting opening 14 opened in the whole top surface and extending to the staple accommodating portion 13. The staple accommodating portion 13 is provided with a cover member 15 for closing the staple inserting opening 14 in the state in which several sheets of sheet-type connected staples 10 are stacked and accommodated.

The front surface of the casing 12 is provided with a staple discharging port 16 of a slit shape formed along a bottom surface thereof, and the staple discharging port 16 has a size set to be equal to, for example, one sheet to five sheets of the sheet-type connected staples 10. The staple discharging port 16 serves as a staple discharging portion for discharging the sheet-type connected staple 10. A front surface 12a of casing 12 is provided with a staple fall-out preventing piece 17 immediately above the staple discharging port 16. The fall-out preventing piece 17 protrudes more than the front surface 12a, and is positioned in a concave portion 17a of the front surface 12a which extends to the staple discharging port 16. The fall-out preventing piece 17 is pivotally displaced along a plane parallel to the front surface 12a via a thin hinge 17b protruding more than the front surface 12a, thereby opening and closing the staple discharging port 16. Specifically, the fall-out preventing piece 17 is provided with the hinge 17b at a substantially center portion thereof, and has at one end thereof a boss portion 17c for preventing the sheet-type connected staples 10 being falling. At the time of non-use of the staple-refill 11 or the like, the sheet-type connected staples 10 in the staple accommodating portion 13 should not fall out from the staple discharging port 16 by mistake. Therefore, at the time of non-use, the boss portion 17c is positioned at a position overlapped with the staple discharging port 16, and when the staple-refill 11 is used, the fall-out preventing piece 17 is pivotally displaced around the hinge 17b to withdraw the boss portion 17c from the staple discharging port 16. In this way, the sheet-type connected staples 10 can be discharged through the staple discharging port 16. The projection 17d formed on the front surface of the casing 12 including the fall-out preventing piece 17 functions as a first positioning projection when the staple-refill 11 is mounted in a mounting object such as a package. Meanwhile, FIGS. 10 to 15 illustrate the state in which the boss portion 17c is overlapped with the staple discharging portion 16, so that the sheet-type connected staples 10 do not fall out from the staple discharging port 16.

Figure 10:
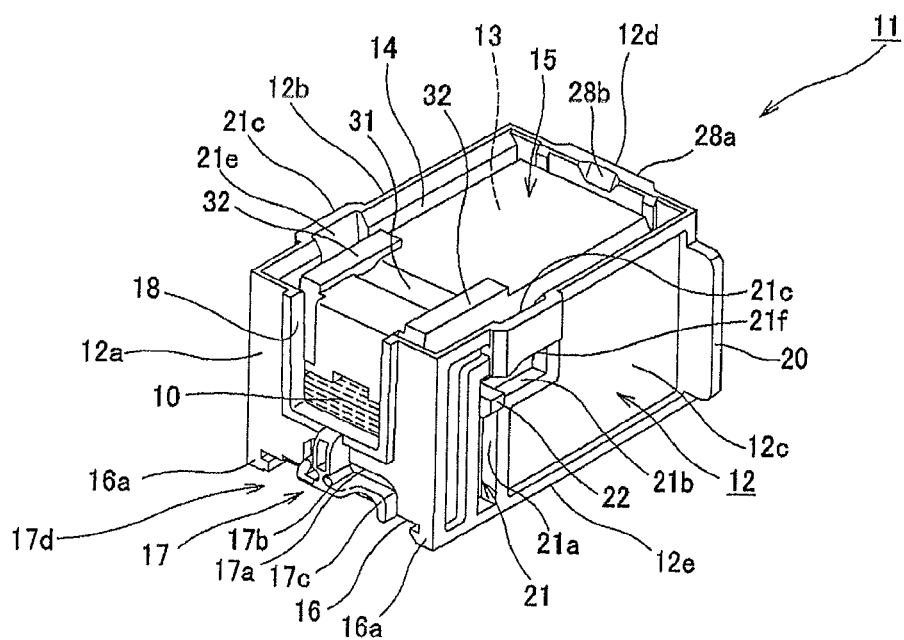
FIG. 10 is a perspective view of the staple-refill, when seen from its front upper side.
Figure 12:
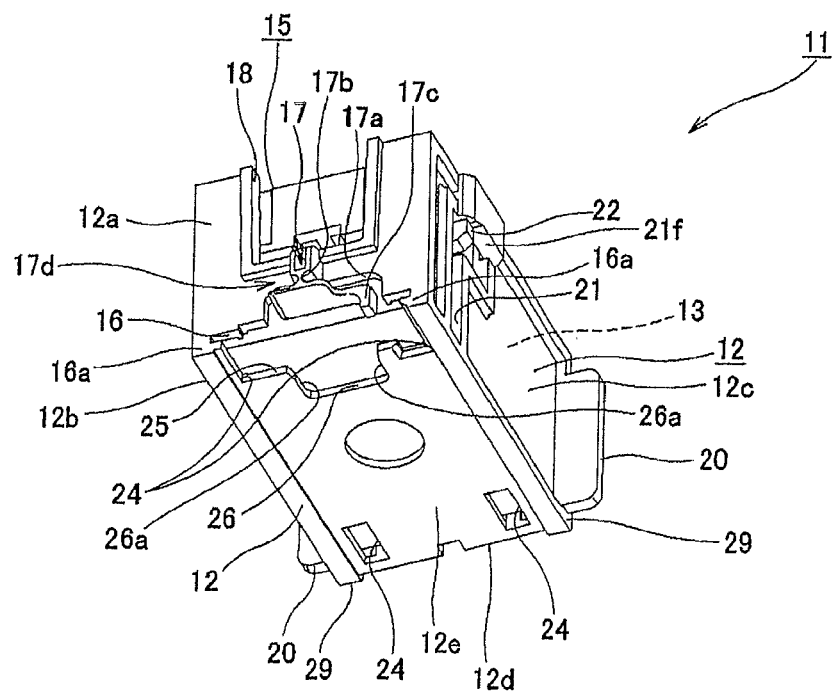
FIG. 12 is a perspective view of the staple-refill, when seen from its front lower side.
Figure 13:
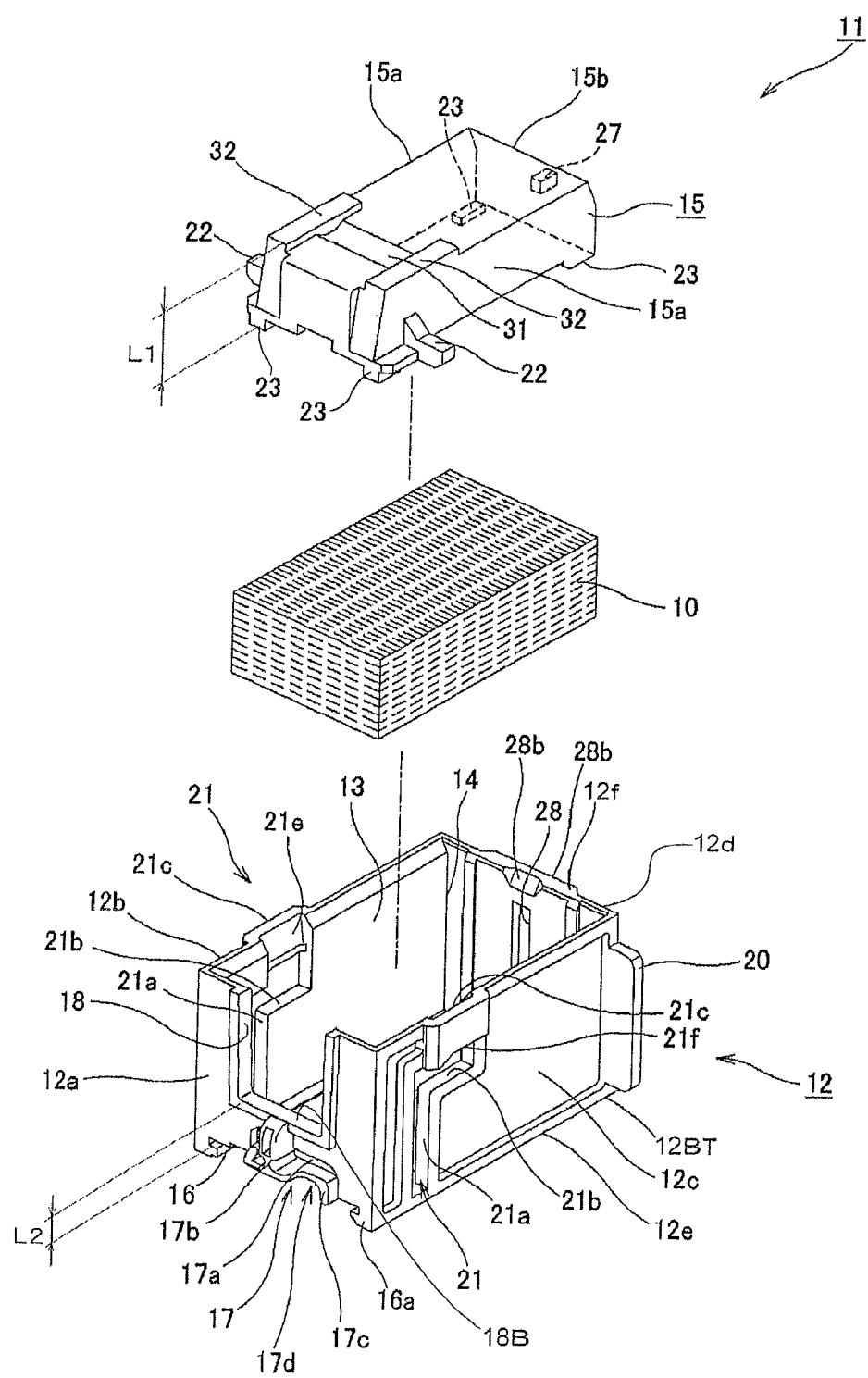
FIG. 13 is an exploded perspective view of the staple-refill.
Figure 14:
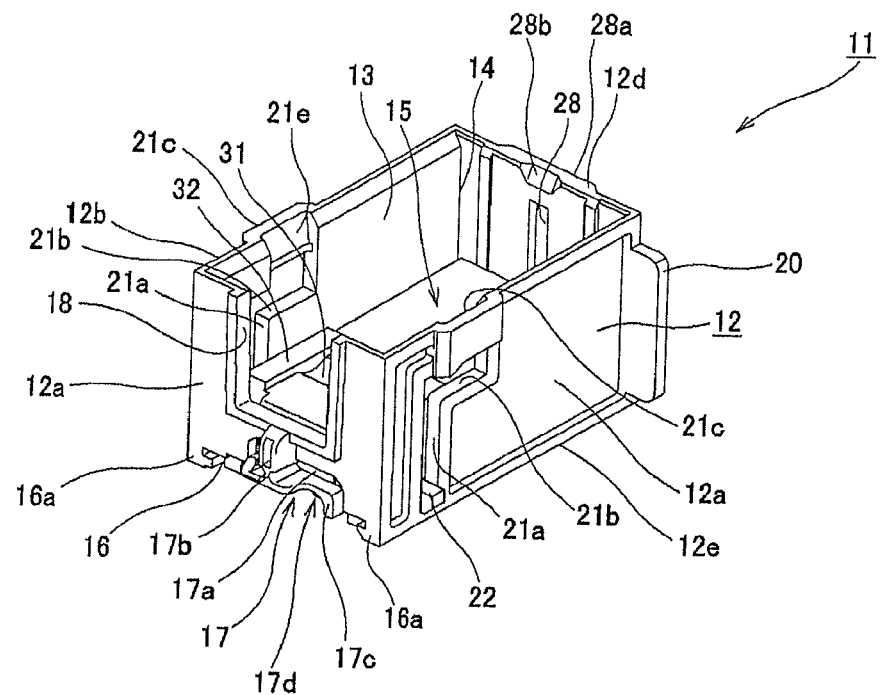
FIG. 14 is a perspective view of a state after the empty staple-refill with the sheet-type connected staples completely consumed is detached from the cartridge, when seen from its front upper side.

As illustrated in FIGS. 10, 12 and 13, the front surface 12a of the casing 12 is provided with a notch portion 18 of a concave shape which is continuous with the staple inserting port 14, above the staple discharging port 16 or the fall-out preventing piece 17. The notch portion 18 is formed in a substantially rectangular shape, and is notched extending from an edge of the staple inserting port 14 to an insertion direction of the sheet-type connected staples 10 to have a depth equal to or higher than, for example, a half of height dimension of the front surface 12a. (Further, the insertion direction corresponds to a height direction of the staple refill 10 and also corresponds to a stacking direction in which the sheet-type connected staples 10 are stacked in the casing 12.) The notch portion 18 is formed such that a pair of opposite lateral surfaces 12b and 12c of the casing 12 are bent in a width enlarging direction to enlarge the staple inserting port 14. In this way, since the casing 12 is provided with the notch portion 18, the pair of lateral surfaces 12b and 12c is flexibly displaced so that the staple inserting port 14 is enlarged. As a result, it is possible to easily insert the sheet-type connected staples 10 or attach the cover member 15. Also, in order to bend the lateral surfaces 12b and 12c, it is not necessary that the lateral surfaces 12b and 12c are made thin in thickness. Therefore, it is possible to prevent formability of the component being deteriorated. Also, when the staple-refill is detached from the cartridge 61, the notch portion 18 becomes a region through which the push lever 66 of the cartridge 61 passes, and functions as a guide portion when the push lever 66 passes.

Figure 11:
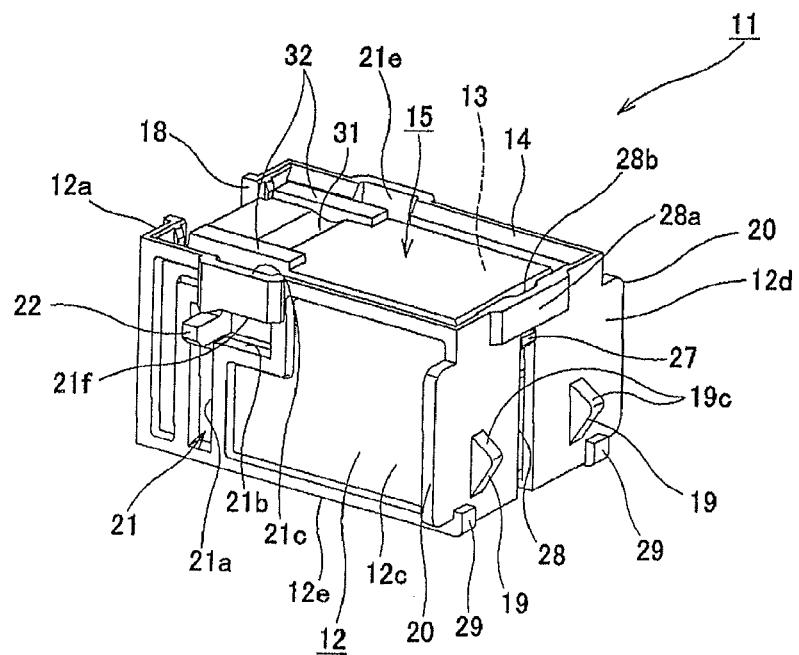
FIG. 11 is a perspective view of the staple-refill, when seen from its rear upper side.

The rear surface 12d of the casing 12 is provided with a pair of second positioning projections 19 and 19, as illustrated in FIG. 11. The pair of second positioning projections 19 and 19 protrudes in a triangular shape at positions at a regular interval from a center line of the rear surface 12d in a width direction of the casing 12. (Further, the width direction of the staple-refill is perpendicular to the insertion direction.) When the staple-refill 11 is mounted in the mounting object, such as a magazine of the stapling-machine main-body, the staple-refill 11 is mounted in the state in which the staple-refill is positioned by one position of the projection 17d on the front surface of the casing 12 including the fall-out preventing piece 17 which is the first positioning projection as described above, and two positions of the second positioning projections 19 and 19 on the rear surface. When the casing 12 is mounted in the magazine 101 of the stapling-machine main-body, there is a case where the projection 17d is not used for positioning of the casing 12. Also, the second positioning projections 19 and 19 have an end face 19c which is inclined downward to face the direction of the bottom surface 12e and the front surface 12a of the casing 12 at the side of the top surface thereof. When the inclined portion is pressed, the casing 12 is pressed toward the bottom surface and the front surface of the mounting object such as the package. The number of the second positioning projections 19 and 19 is not specifically limited, and three or more second positioning projections may be provided. Also, when the projections 17d are provided in plural on the front surface 12a, one second positioning projection 19 may be provided on the rear surface 12d.

Figure 16:
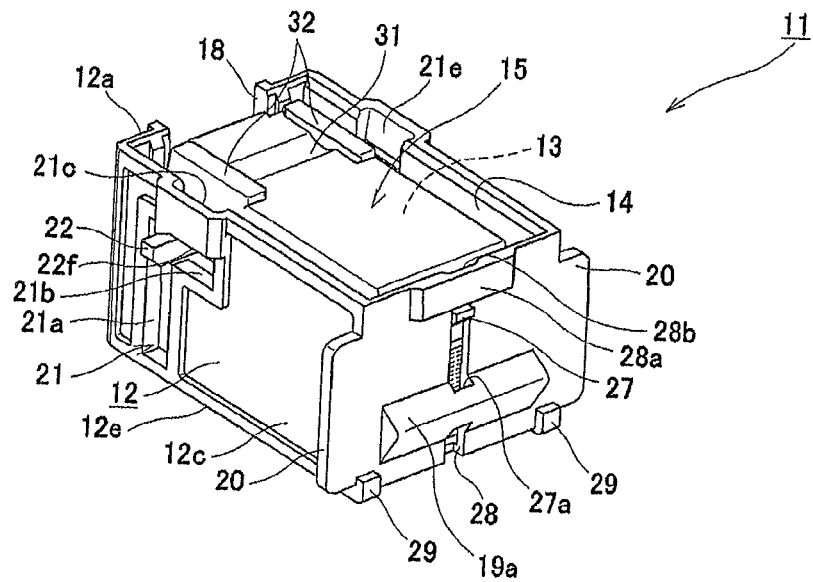
FIG. 16 is a perspective view of a modification including one first positioning projection for the staple-refill, when seen from its rear side.

For example, in FIG. 16, the rear surface 12d of the casing 12 is provided with one second positioning projection 19a which protrudes consecutively in a width direction. The second positioning projection 19a is formed over the guide hole 28, and is provided with a recessed portion 27a at a portion intersecting with the guide hole 28, through which a guide boss 27 protruding from the rear-side end face 15b of the cover member 15 is escaped. The second position projection 19a has a triangular cross section, and a surface of the casing 12 at the top surface thereof is inclined downward to face the direction of the bottom surface 12e and the front surface 12a. When the inclined portion is pressed, the casing 12 is pressed toward the bottom surface and the front surface of the mounting object such as the package.

Figure 17:
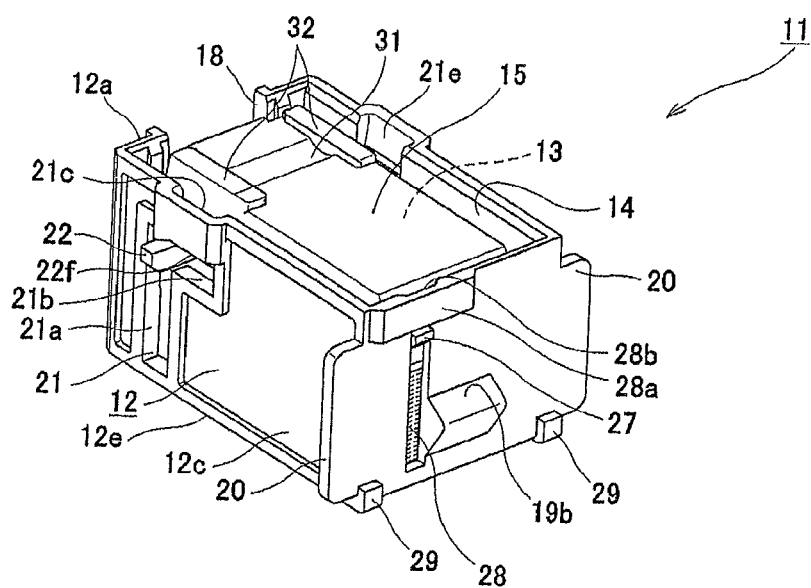
FIG. 17 is a perspective view of another modification including one first positioning projection for the staple-refill, when seen from its rear side.

In an example illustrated in FIG. 17, the rear surface 12d of the casing 12 is provided with one second positioning projection 19a which protrudes consecutively in a width direction, but does not intersect with the guide hole 28. In this example, the guide hole 28 is formed to be biased to one side of the rear surface 12d of the casing in the width direction, and one second positioning projection 19b protrudes consecutively from the rear surface adjacent the guide hole 28. The second positioning projection 19b is formed to have a length shorter than that of the second positioning projection 19a of FIG. 16. The second position projection 19b also has a triangular cross section, and a surface of the casing 12 at the side of the top surface thereof is inclined downward to face the direction of the bottom surface 12e and the front surface 12a. When the inclined portion is pressed, the casing 12 is pressed toward the bottom surface and the front surface of the mounting object such as the package. Of course, the guide hole 29 may be formed at the center of the rear surface 12d in the width direction thereof, and the second positioning projection 19b may be provided at a biased position.

The rear surface 12d of the casing 12 is provided with handle portions 20 and 20 formed by projections protruding from the lateral surfaces 12b and 12c, and the handle portion 20 has the same height as the rear surface 12d. The handle portions 20 and 20 function as portions by which a finger is caught when the staple-refill 11 is detached from the cartridge 61. When the staple-refill is mounted in the cartridge 61, the handle portions 20 and 20 are positioned at an opening end of a staple-refill insertion port 64 of the cartridge, more specifically, at an attaching/detaching operation recessed portion 64a which will be described later. When the staple-refill 11 is pulled out from the cartridge 61, the handle portions 20 and 20 exposed through the attaching/detaching operation recessed portion 64a is caught by the finger or the like so that the staple-refill 11 is easily pulled out from the cartridge 61. Also, when the staple-refill is mounted in the mounting object such as the package, the handle portions 20 and 20 function as a third positioning projection together with the projection on the front surface of the casing 12 including the fall-out preventing piece 17 which is the first positioning projection, or the second positioning projections 19 and 19 on the rear surface.

Also, the rear surface 12d of the casing 12 is provided with pushed portions 29 and 29 which protrude from corner portions of the bottom surface 12e to have the same height. When the cartridge 61 incorporated with the staple-refill 11 is mounted in the magazine 101 of the stapling-machine main-body, the pushed portions 29 and 29 are pressed against a mounting lever 104 which is a pressing portion of the magazine 101, or rear-surface positioning concave portions 114 and 134 which are pressing portions of mounting objects 111 and 131, so that the cartridge is positioned in the magazine 101 or the mounting objects 111 and 131. The pushed portions 29 and 29 are not limited to any position if their positions are on the rear surface 12d, but it is preferable that the pushed portions are formed at a position near a region in which the bottom surface 12e with high strength intersects with the lateral surfaces 12b and 12c and the rear surface 12d to improve its positioning accuracy. Also, the number of the pushed portion 29 is preferably one, or three or more, but it is preferable that the pushed portion is disposed to evenly apply a pushing force.

The positioning of the sheet-type connected staples 10 of the staple-refill 11 in a refill receiving section 63 in a transfer direction thereof is performed as follows. (Further, the transfer direction is perpendicular to both the insertion direction and the width direction.) As illustrated in FIGS. 6 to 9, the casing 12 of the staple-refill 11 is provided with the pushed portions 29 and 29, which protrude at the same height, at both corners of the bottom surface 12e of the rear surface 12d, that is, the portion with high strength. When the cartridge 61 incorporated with the staple-refill 11 is mounted in the magazine 101 of the stapling-machine main-body, the pushed portions 29 and 29 are pressed against pushing portions 102 and 102 of the magazine 101. As described later, both lateral portions 16a and 16a of the staple discharging port 16 abut against first abutting portions 91 and 91 of the staple guide section 75.

The pair of lateral surfaces 12b and 12c of the casing 12 are provided with guide holes 21 and 21 (a first guide part 21 and a second guide part 21) for guiding the cover member 15 when the cover member gradually moves down in accordance with the decreased sheet-type connected staples 10 in the thickness direction. (Further, the thickness direction corresponds to the stacking direction that is the insertion direction.) The guide holes 21 and 21 functioning as the guide portion of the cover member 15 are L-shaped throughholes, and are formed consecutively with vertical guide portions 21a and 21a for guiding lift of the cover member 15, and horizontal guide portions 21b and 21b at the side of the staple inserting port 14. Also, joint portions 21c and 21c are formed between the horizontal guide portions 21b and 21b and the staple inserting port 14. If the guide holes 21 and 21 have at least vertical guide portions 21a and 21a, other configuration is not always required.

<3-2. Description of Cover Member>

The casing 12 is provided with the cover member 15 to cover the uppermost layer of the sheet-type connected staples 10 received in the staple accommodating portion 13, as illustrated in FIGS. 10, 11 and 13. The cover member 15 is formed to have a size substantially equal to the staple inserting port 14. The cover member 15 is provided with guide bosses 22 and 22 (a first boss 22 and a second boss 22) at opposite lateral ends 15a and 15a. The guide bosses 22 and 22 are engaged with the guide holes 21 and 21. The joint portions 21c and 21c of the guide holes 21 and 21 of the casing 12 have tapered inner surfaces 21e of which the thickness is gradually thickened from an opening end of the staple inserting port 14 to the lower portion, thereby forming an insertion guide surface of the guide bosses 22 and 22, and a vertical surface 21f is formed to be released from a boundary between the horizontal guide portions 21b and 21b. Also, the joint portions 21c and 21c slightly protrude outward. If the stacked sheet-type connected staples 10 are received in the staple accommodating portion 13, one guide boss 22 of the cover member 15 is inserted into one horizontal guide portion 21b from the inside, and the other guide boss 22 is inserted into the other horizontal guide portion 21b, with sitting on the joint portion 21c. Then, the guide bosses 22 and 22 move the horizontal guide portions 21b and 21b in the direction of the vertical guide portions 21a and 21a, so that the cover member 15 closes the staple inserting port 14. The leading ends of the guide bosses 22 and 22 protrude outward rather than the lateral surfaces 12b and 12c of the casing 12, when being engaged with the guide holes 21 and 21. Although described in detail hereinafter, when the staple-refill is mounted in the cartridge 61, the guide bosses 22 and 22 are engaged with an engaging portion 73 formed on the lateral surface of the cartridge 61. Further, since the guide bosses 22 and 22 protrude outward rather than the lateral surfaces 12b and 12c of the casing 12, the guide bosses function as a fourth positioning projection when the staple-refill 11 is mounted in the mounting object such as the package.

The rear-side end face 15b neighboring on the lateral end faces 15a and 15a of the cover member 15 is provided with a further guide boss 27. The guide boss 27 is engaged with the guide hole 28 formed in the height direction in the rear surface 12d of the casing 12 at a substantially middle position thereof in the width direction. Accordingly, the cover member 15 is guided when moving down in the staple accommodating portion 13, as the guide boss 27 of the rear-side end face 15b is engaged with the guide hole 28. The joint portion 28a of the guide hole 28 of the casing 12 has a tapered inner surface 28b of which the thickness is gradually thickened from an opening end of the staple inserting port 14 to the lower portion, thereby forming an insertion guide surface of the guide boss 27. The joint portion 28a is formed to slightly protrude outward.

Figure 15:
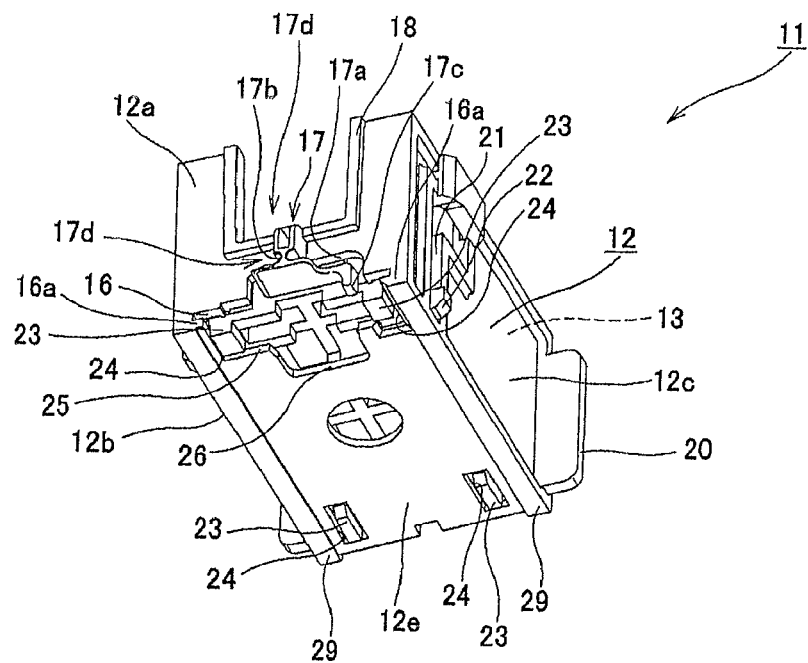
FIG. 15 is a perspective view of a state after the empty staple-refill with the sheet-type connected staples completely consumed is detached from the cartridge, when seen from its front lower side.

The cover member 15 is provided with boss portions 23, 23, 23 and 23 protruding downward from each corner, as illustrated in FIG. 13. These boss portions 23, 23, 23 and 23 are contact portions which are brought into contact with the uppermost layer of the sheet-type connected staples 10 received in the staple accommodating portion 13. When the sheet-type connected staples 10 are completely consumed, these boss portions are engaged with escape portions 24, 24, 24 and 24 formed on four corners of the bottom surface 12e of the casing 12, as illustrated in FIG. 15. The number of the boss portions 23 is not specifically limited.

The bottom surface 12e of the casing 12 is provided with a notch recessed portion 25 which is continuous with the staple discharging port 16, as illustrated in FIGS. 12 and 15. The notch recessed portion 25 of the bottom surface 12e is provided at a substantially center thereof with a positioning concave portion 26 which is further recessed toward the rear surface 12d. The positioning concave portion 26 is engaged with a positioning convex portion formed on the bottom surface of the cartridge to which the staple-refill 11 is mounted, which will be described later. The above-described boss portions 23, 23, 23 and 23 of the cover member 15 are engaged with the escape portions 24, 24, 24 and 24 of the respective corner portions of the bottom surface 12e of the casing 12. The escape portions 24 and 24 at the side of the staple inserting port 14 are formed on a portion of the corner portion of the notch recessed portion 25, and the escape portions 24 and 24 at the side of the rear surface 12d are formed by the through-hole of the corner portion at the side of the rear surface 12d.

When the cover member 15 is mounted to the cartridge 61, the cover member 15 is pressed by the push lever 66 of the cartridge 61. To this end, the top surface of the cover member 15 is provided with a concave-shaped engaging portion 31 to which a push portion 70 of the push lever 66 is engaged, as illustrated in FIG. 13. The concave-shaped engaging portion 31 is formed in the width direction of the cover member 15. After the staple-refill 11 is mounted in the cartridge 61 and the sheet-type connected staples 10 are completely consumed, as will be described hereinafter, the engaging portion 31 is engaged with the push portion 70 of the push lever 66 at the side of the cartridge 61. When the staple-refill 11 is detached from the cartridge 61, the push portion 70 of the push lever 66 is moved while coming into contact with the top surface of the cover member 15. Thus, the top surface of the cover member 15 is provided with guide walls 32 and 32 along a sliding direction of the push portion 70 of the push lever 66 so that the push lever 66 can move linearly. The guide walls 32 and 32 are spaced apart from each other by the substantially width of the push portion 70. As a result, when the staple-refill 11 is mounted in the cartridge 61, the push portion of the push lever 66 enters the cover member 15 through the notch portion 18, and is guided by the guide walls 32 and 32. When the number of the sheet-type connected staples 10 is reduced, the push portion of the push lever 66 is engaged with the concave-shaped engaging portion 31. When the staple-refill 11 is used while being mounted in the cartridge 61, the push portion 70 of the push lever 66 is gradually moved toward the engaging portion 31 between the guide walls 32 and 32.

The casing 12 includes a bottom wall 12BT defining the bottom surface 12e. As shown in FIG. 13, a dimension L1 of the cover member 15 in the insertion direction is substantially the same with or larger than a length L2 between an upper face of the bottom wall 12BT and a bottom end 18B of the notch portion 18 in the insertion direction.

In the state in which the staple-refill 11 is mounted in the cartridge 61, as illustrated in FIG. 7, the handle portions 20 and 20 formed at the rear surface 12d of the casing 12 are positioned to protrude outward from the attaching/detaching operation recessed portion 64a of the cartridge body 62. A user can easily replace the staple-refill 11 by gripping the handle portions 20 and 20 with a finger, when the staple-refill 11 is replaced.

Figure 18:
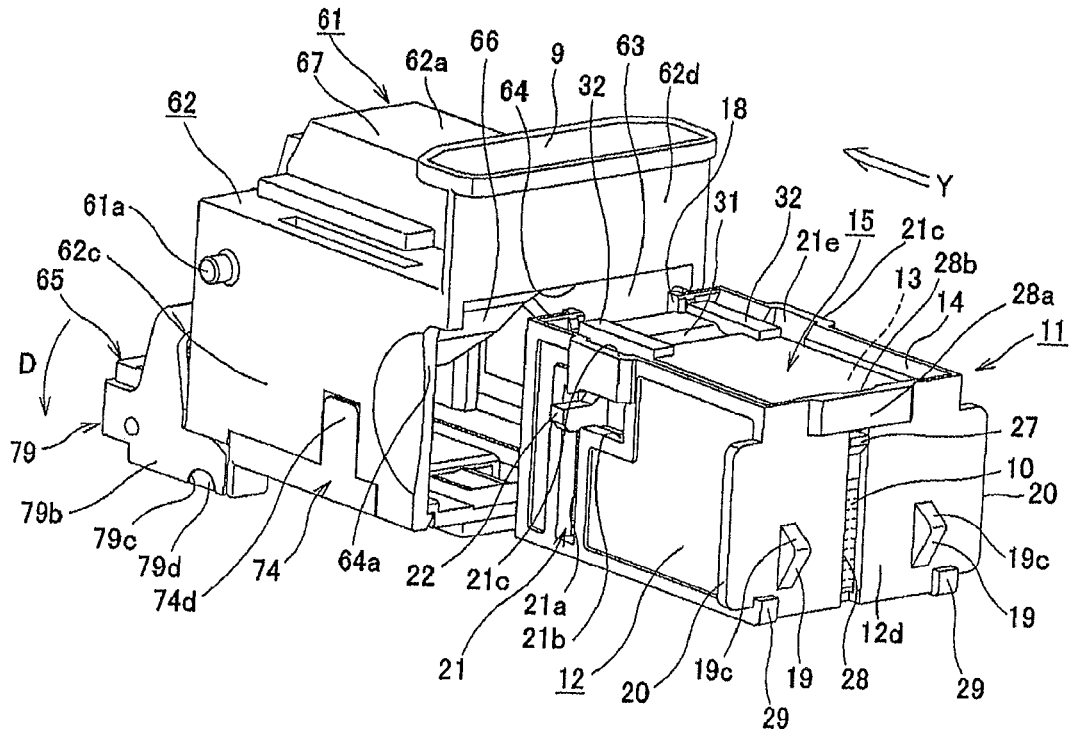
FIG. 18 is a perspective view of a state when a staple-refill according to a modification is mounted in a cartridge, in which a handle portion provided on a rear surface of a casing is formed in a circular through-hole, when seen from its rear side.
Figure 19:
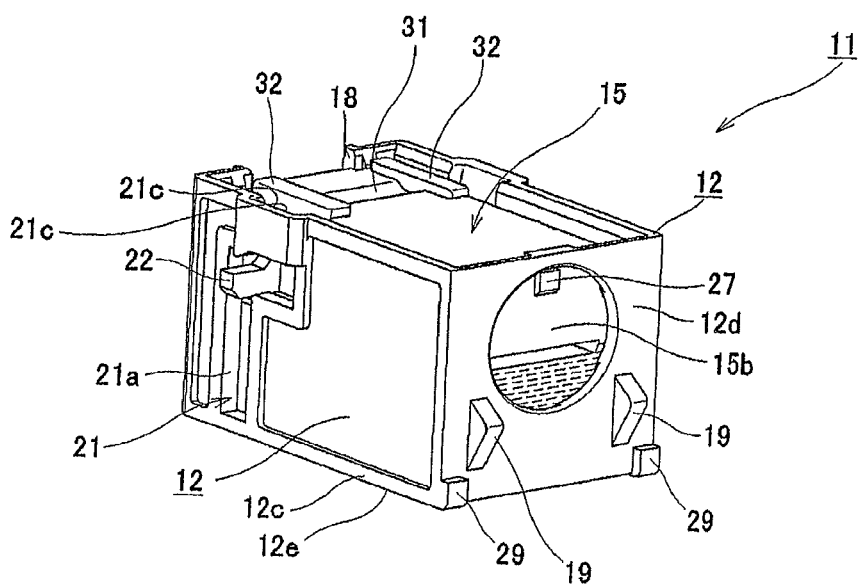
FIG. 19 is a perspective view of the staple-refill according to a modification, in which the handle portion is formed in the circular through-hole, when seen from its rear side.
Figure 20:
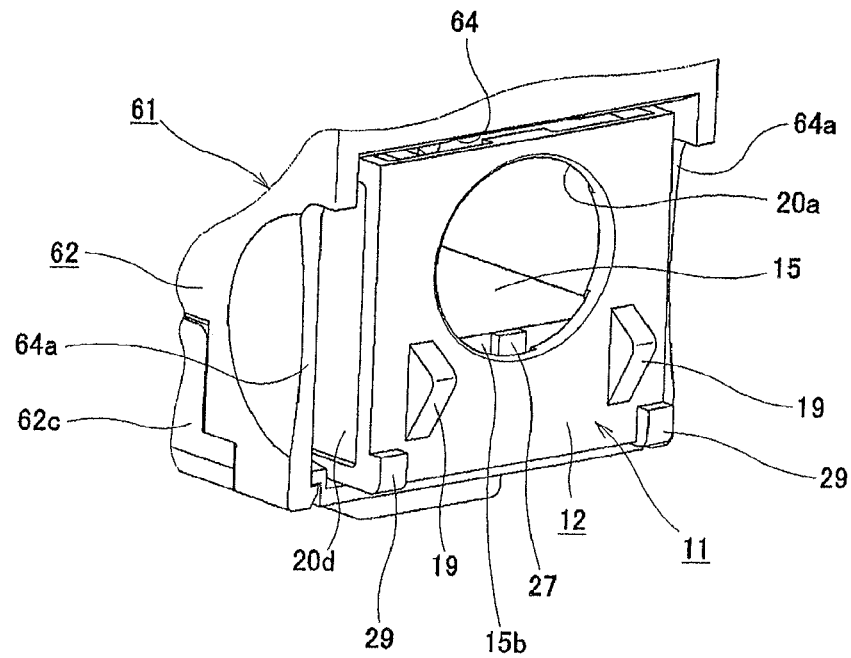
FIG. 20 is a perspective view illustrating a state in which the empty staple-refill with no sheet-type connected stapes is mounted in the cartridge, when seen from its rear side.

As the configuration of the handle portion 20, as illustrated in FIGS. 18 to 20, the rear surface 12d of the casing 12 may be provided with a through-hole 20a which functions as a finger gripping portion (handle portion) on which the finger grips. Although the circular through-hole 20a is illustrated, a through-hole may be formed in a polygonal shape such as oval, triangle, quadrangle, or pentagon, or a plurality of through-holes having a size to grip a finger may be formed. Also, it is preferable that a position in which the through-hole 20a is formed is a height of the top surface of the cover member 15 facing an outside through the through-hole 20a, when the sheet-type connected staples 10 are completely consumed. In the case where the through-hole 20a is formed, the handle portion 20 formed by the protruding piece may not be provided, and concave and convex portions may be reduced to simplify its shape. Further, pulling the staple-refill 11 out from the cartridge 61 is when the sheet-type connected staples 10 are completely consumed. When the sheet-type connected staples 10 are completely consumed, as illustrated in FIG. 20, the cover member 15 is positioned under the staple accommodating portion 13. Accordingly, the staple-refill 11 can be pulled out from the cartridge 61 by inserting the finger into the staple accommodating portion 13 through the through-hole 20a and gripping a perimeter of the through-hole 20a. Moreover, the guide boss 27 formed on the rear-side end face 15b of the cover member 15 is engaged with the through-hole 20a to function as a fall-out preventing boss for preventing the cover member 15 from falling from the staple accommodating portion 13.

Figure 21:
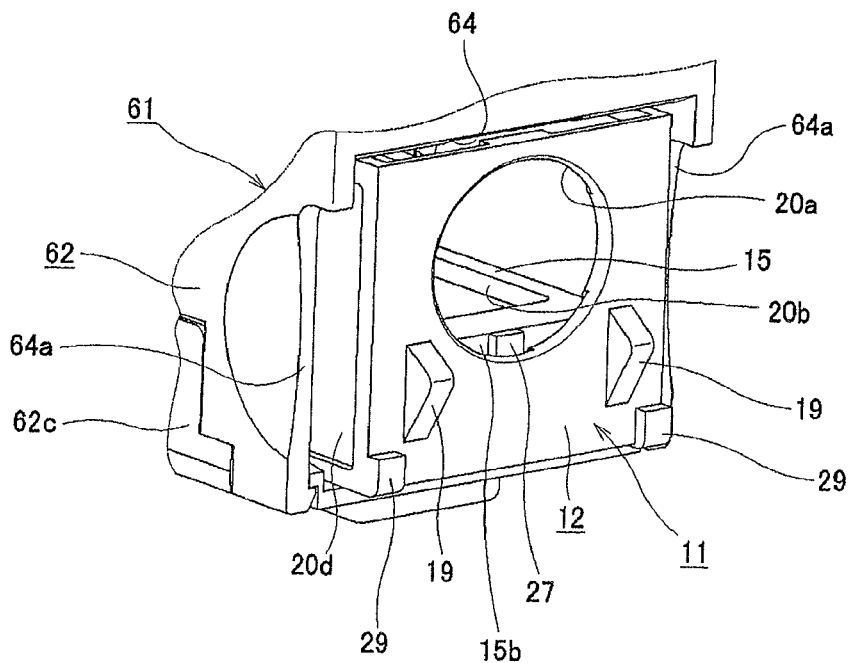
FIG. 21 is a perspective view of a staple-refill according to a modification, in which a concave portion is formed in a top surface of the cover member, when seen from its rear side.

As illustrated in FIG. 21, when the through-hole 20a is formed, the top surface of the cover member 15 in the staple accommodating portion 13 facing the outside through the through-hole 20a may be provided with a recessed portion 20b. The recessed portion 20b may be provided on the substantially overall top surface of the cover member 15, but it is preferably formed at least on the top surface of the cover member 15, which comes into contact with the finger inserted through the through-hole 20a, adjacent to the rear surface. In this instance, the fingertip inserted in the staple accommodating portion 13 through the through-hole 20a can grip the recessed portion 20b to more easily pull out the staple-refill 11 from the cartridge 61. Also, in this example, since the staple-refill 11 is sufficiently easily pulled out by use of the through-hole 20a, the cartridge body 62 configuring the cartridge 61 may not be provided with the staple fall-out preventing piece 64a.

Figure 22:
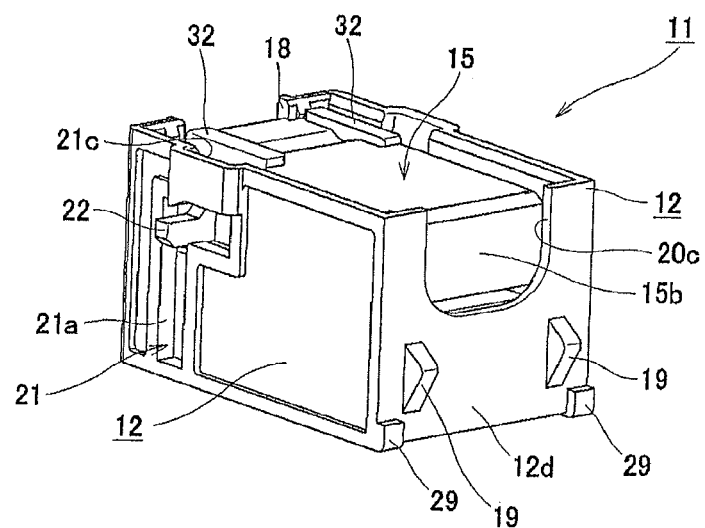
FIG. 22 is a perspective view of a staple-refill according to a modification, in which a handle portion is formed in a U-shaped notch portion, when seen from its rear side.
Figure 23:
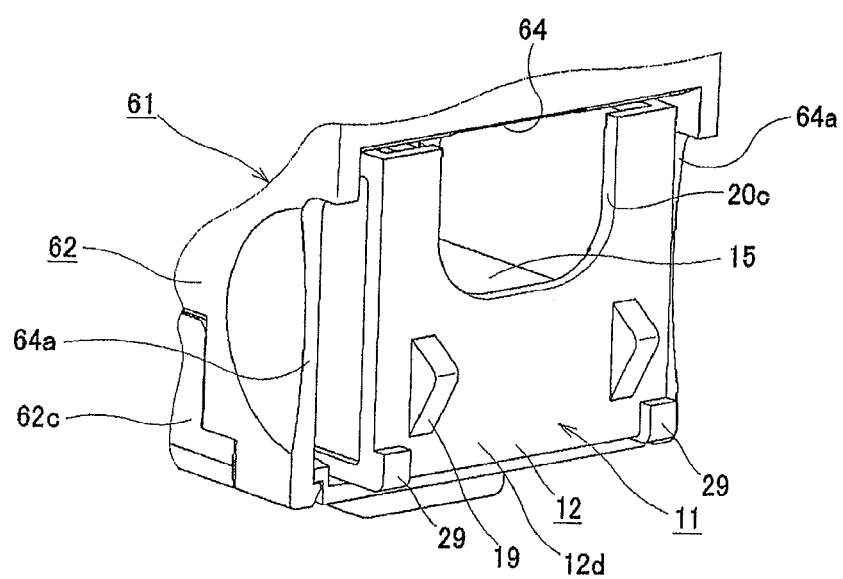
FIG. 23 is a perspective view of a state in which the empty staple-refill with no sheet-type connected stapes is mounted in the cartridge, when seen from its rear side.

As the configuration of the handle portion 20, as illustrated in FIGS. 22 and 23, the rear surface 12d of the casing 12 may be provided with a notch portion 20c which functions as the finger gripping portion (handle portion) on which the finger grips. The notch portion 20c is illustrated to have a U-shape, but it is not limited to the shape. Also, the notch portion 20c is formed to have an about half depth from the top of the rear surface 12d of the casing 12. When the staple-refill 11 is pulled out from the cartridge 61, the staple-refill 11 can be pulled out from the cartridge 61 by inserting the finger into the notch portion 20c and gripping a perimeter of the notch portion 20c.

Figure 24:
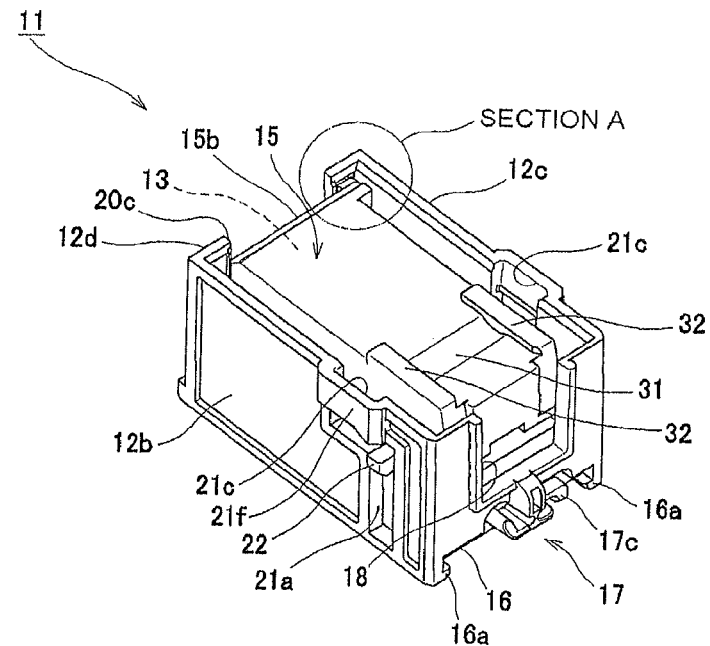
FIG. 24 is a perspective view of a staple-refill in which a guide boss formed on a rear surface of the cover member is engaged to a horizontal guide groove formed in a notch portion of the rear surface of the casing, when seen from its front upper side.
Figure 25:
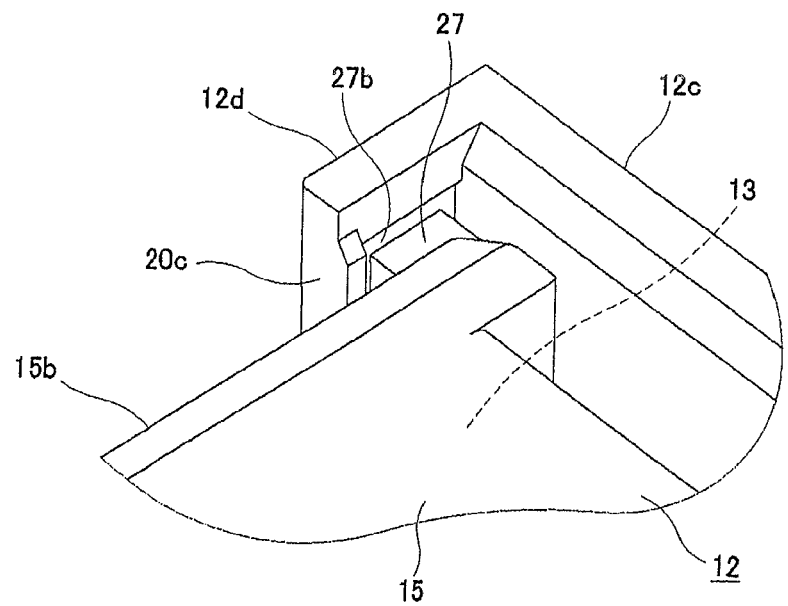
FIG. 25 is an enlarged perspective view of the portion A in FIG. 24.

In this example illustrated in FIGS. 22 and 23, the notch portion 20c which is continuous with the staple inserting port 14 is formed on the rear surface 12d of the casing 12, the casing 12 is not provided with the portion, to which the guide boss 27 of the cover member 15 is engaged. As illustrated in FIGS. 24 and 25, the rear surface 12d of the casing 12 may be provided with a guide groove 27b, to which the guide boss 27 is engaged, on one side of the notch portion 20c. That is, the rear-side end face 15b of the cover member 15 is provided with the guide boss 27 at a position which is biased in the width direction. In correspondence to the position of the guide boss 27, the rear surface 12d of the casing 12 is provided on an inner surface thereof with the guide groove 27b, to which the guide boss 27 is engaged, on one side of the notch portion 20c in the height direction.

The guide groove 27b may be a through-hole penetrating the rear surface 12d, or may be a concave-shaped groove having a bottom. When the guide groove 27b is the through-hole, the guide boss 27 penetrates the through-hole, thereby preventing the cover member 15 from falling from the casing.

Figure 26:
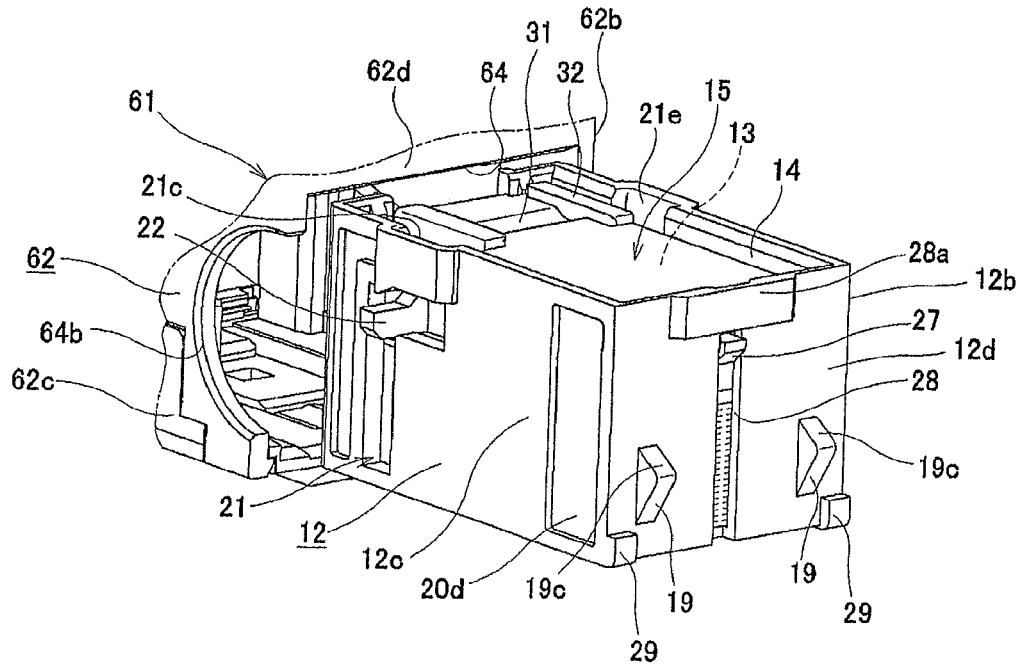
FIG. 26 is a perspective view of a state before the staple-refill provided with a concave portion serving as the handle portion at the time of drawing out a cartridge body is mounted in the cartridge, when seen from its rear side.
Figure 27:
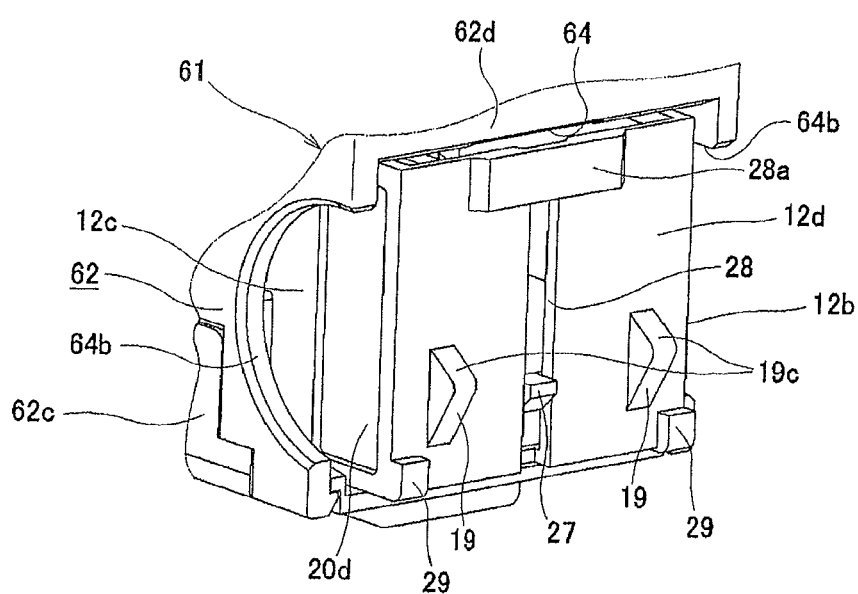
FIG. 27 is a perspective view illustrating a relationship between a detaching manipulation concave portion of the cartridge and the concave portion of the casing, in the state in which the staple-refill in FIG. 26 is mounted in the cartridge.
Figure 28:
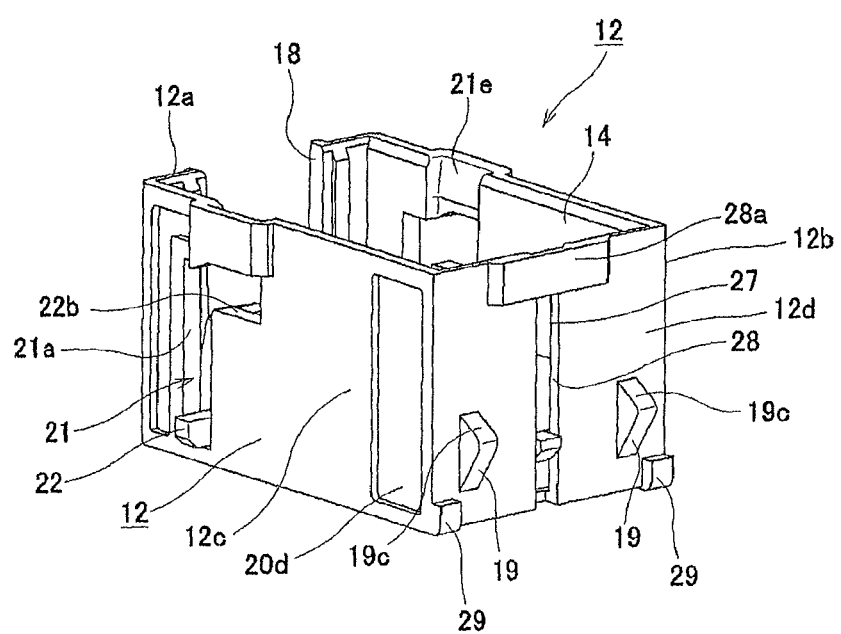
FIG. 28 is a perspective view of the staple-refill in FIG. 26, when seen from its rear side.

As the finger gripping portion (handle portion), to which the finger grips, when the empty staple-refill 11 with no sheet-type connected staple 10 is pulled out from the cartridge body 61, as illustrated in FIGS. 26 to 28, the lateral surfaces 12b and 12c of the casing 12 adjacent to the rear surface 12d may be provided with one. Specifically, the lateral surfaces 12b and 12c of the casing 12 adjacent to the rear surface 12d are respectively provided with recessed portions 20d and 20d of a concave shape. The recessed portions 20d and 20d are formed in a rectangular shape in a longitudinal direction which is the height direction of the casing 12. Both lateral surfaces 62b and 62c of the cartridge body 62 are provided with notch recessed portions 64b and 64b for operating attachment and detachment which are formed to be continuous with the refill inserting port 64, when these recessed portions 20d and 20d are mounted in the refill accommodating portion 63 of the cartridge body 62. The recessed portions 20d and 20d are exposed outward through the notch recessed portions 64b and 64b of the cartridge body 62, when these recessed portions 20d and 20d are mounted in the refill accommodating portion 63 of the cartridge body 62. In this way, the user can easily pull out the empty staple-refill 11 with no sheet-type connected staple 10 from the refill accommodating portion 63 by gripping the recessed portions 20*d* and 20*d*, which face the outside through the notch recessed portions 64*b* and 64*b*, with the finger.

If the recessed portions 20*d* and 20*d* of the casing 12 have the shape suitable for being gripped by the finger of the user, an oval or other shapes other than the rectangular shape is preferable, and a hole having a bottom or a through-hole is preferable. Also, the recessed portion 20*d* and 20*d* may be configured by a plurality of concave and convex portions formed on a desired region, or an antiskid portion attached with a rubber sheet or the like.

<4. Description of Fundamental Configuration of Cartridge (FIGS. 5 to 9, FIGS. 29 to 38, and so forth)>

As described above, the staple-refill 11 is mounted in the cartridge 61 which is mounted in the magazine of the stapling-machine main-body of the electric stapling machine 1, as illustrated in FIGS. 5 to 9. The cartridge 61 is one example of the mounting object accommodating the casing 12 therein. The cartridge 61 is configured by engaging a base plate member 74 with the cartridge body 62 which is provided with the refill accommodating portion 63 accommodated with the staple-refill 11 therein. As one example, the base plate member 74 is formed integrally with the cartridge body 62 by engaging the pair of engaging pieces 74*d* and 74*d* with the engaging recessed portion 74*e* formed on the bottom side of the cartridge body 62. Also, as illustrated in FIGS. 5 to 9, the rear surface 62*d* of the cartridge body 62 is provided with the refill inserting port 64 which is continuous with the refill accommodating portion 63. Both lateral surfaces 62*b* and 62*c* of the cartridge body 62 are provided with the attaching/detaching operation recessed portions 64*a* and 64*a* which are continuous with the refill inserting port 64. When the staple-refill 11 is mounted in the refill accommodating portion 63, the handle portions 20 and 20 of the staple-refill 11 are positioned to protrude outward through the refill inserting portion 64. Since the attaching/detaching operation recessed portions 64*a* and 64*a* are formed to be continuous with the refill inserting port 64, the user can easily perform the attaching and detaching operation of the staple-refill 11 by gripping the handle portions 20 and 20 with the finger. The shape of the attaching/detaching operation recessed portions 64*a* and 64*a* is not specifically limited, if the handle portions 20 and 20 can protrude outward in the state in which the staple-refill 11 is accommodated in the refill accommodating portion 63.

The front surface 62*e* of the cartridge 61 is provided with a striking section 65 which is continuous with the bottom surface. The striking section 65 is provided with a staple guide section 75 for guiding the lowermost layer of the sheet-type connected staples 10 in the staple-refill 11 accommodated in the refill accommodating portion 63, which will be described later. The striking section 65 functions as a portion for striking the staple.

Both lateral surfaces 62*b* and 62*c* of the cartridge body 62 are provided with pivot bosses 61*a* and 61*a*. The pivot bosses 61*a* and 61*a* are engaged with pivot support portions 105 and 105 of the magazine 101 at the side of the stapling-machine main-body, as illustrated in FIGS. 3 and 4, thereby guiding the cartridge 61 along a pivot trace when the cartridge 61 is attached to or detached from the magazine 101. In this way, when the staple-refill 11 is changed from the magazine 101 or the jam cleaning is carried out, the cartridge 61 is pivoted to be pulled out from the frame 9*a* configuring the outer housing. The top surface of the cartridge body 62 is provided with a tab 9 which is positioned above the refill inserting port 64. The pivot operation of the cartridge 61 is carried out by use of the tab 9.

<4-1. Description of Push Lever>

Figure 29:
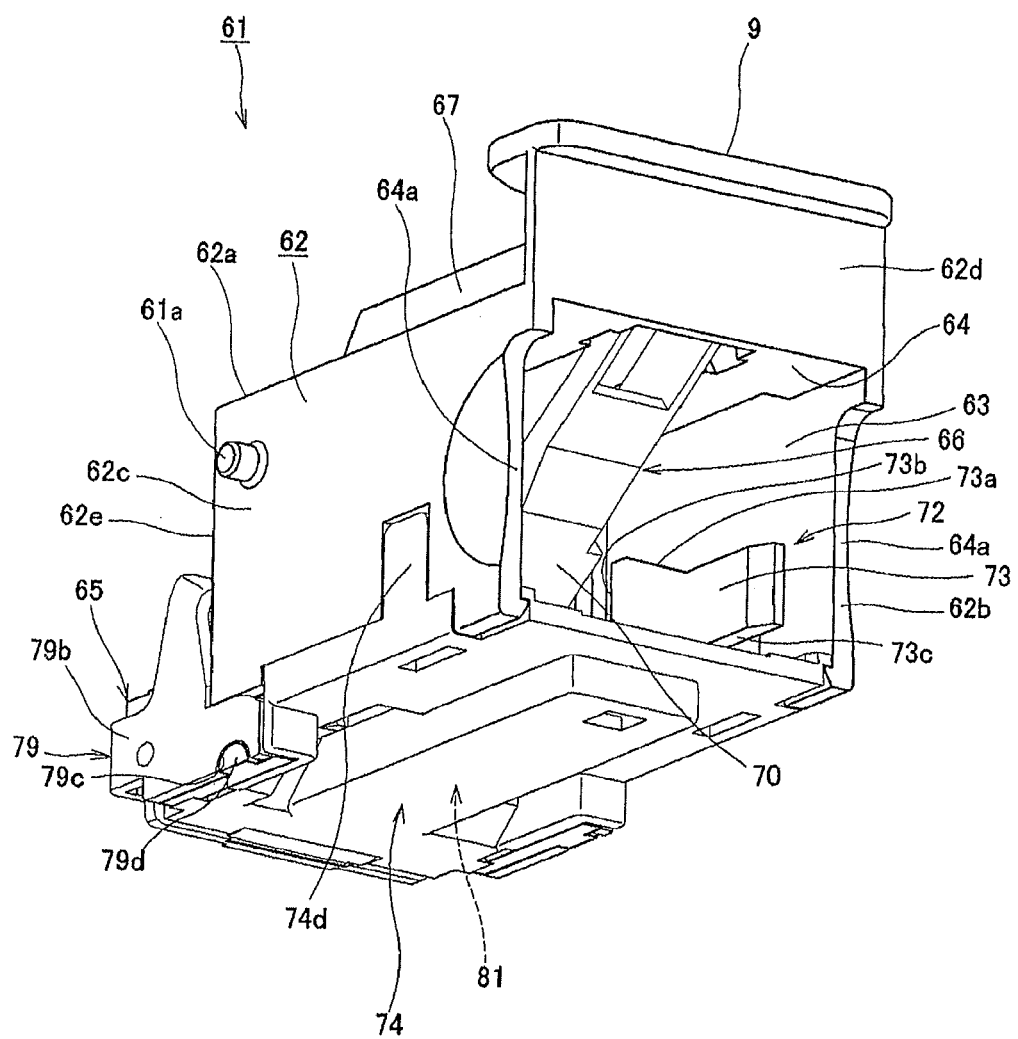
FIG. 29 is a perspective view of the cartridge, when seen from its rear side.
Figure 30:
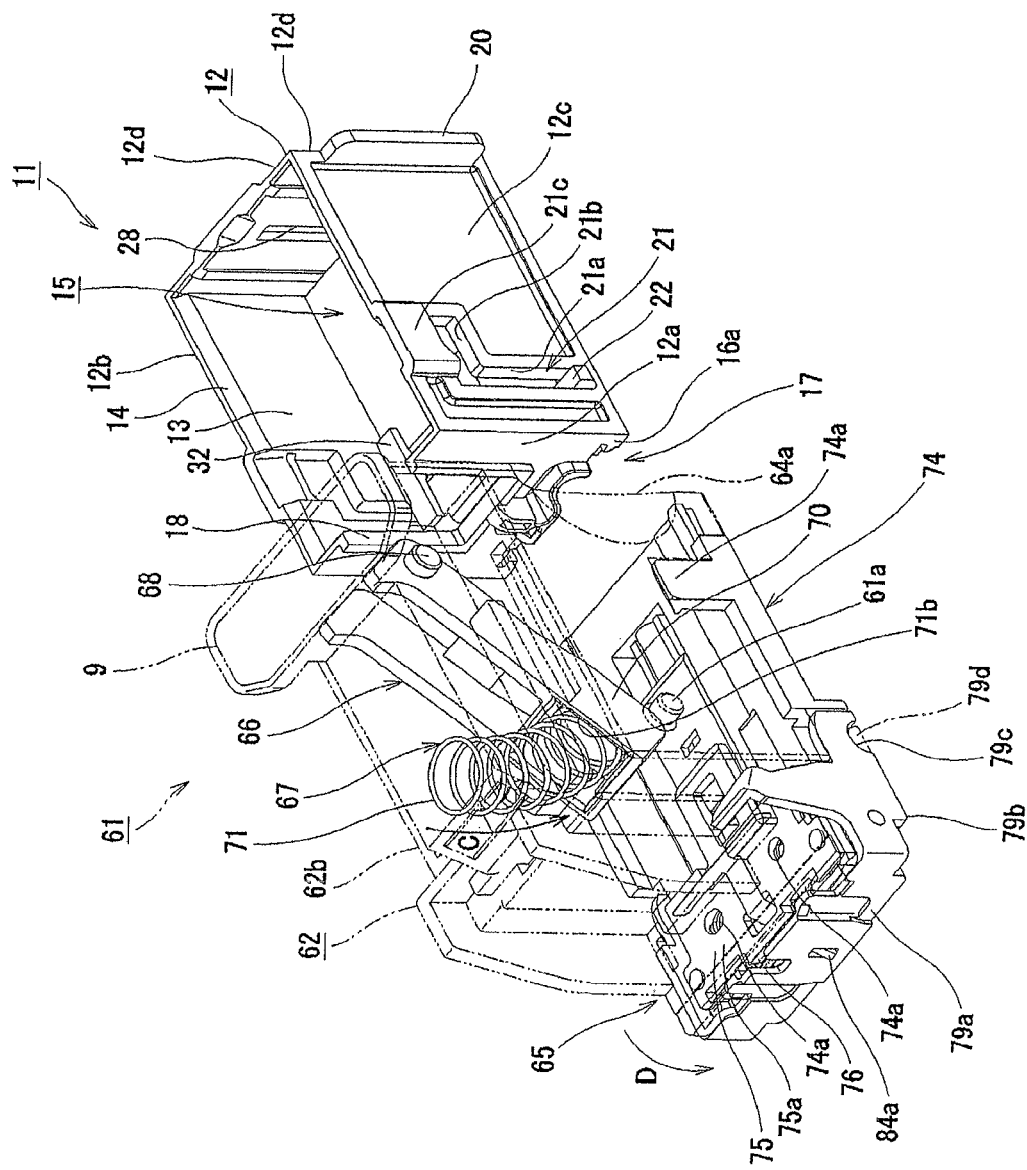
FIG. 30 is a perspective view of a push lever before the staple-refill is mounted in the cartridge.
Figure 31:
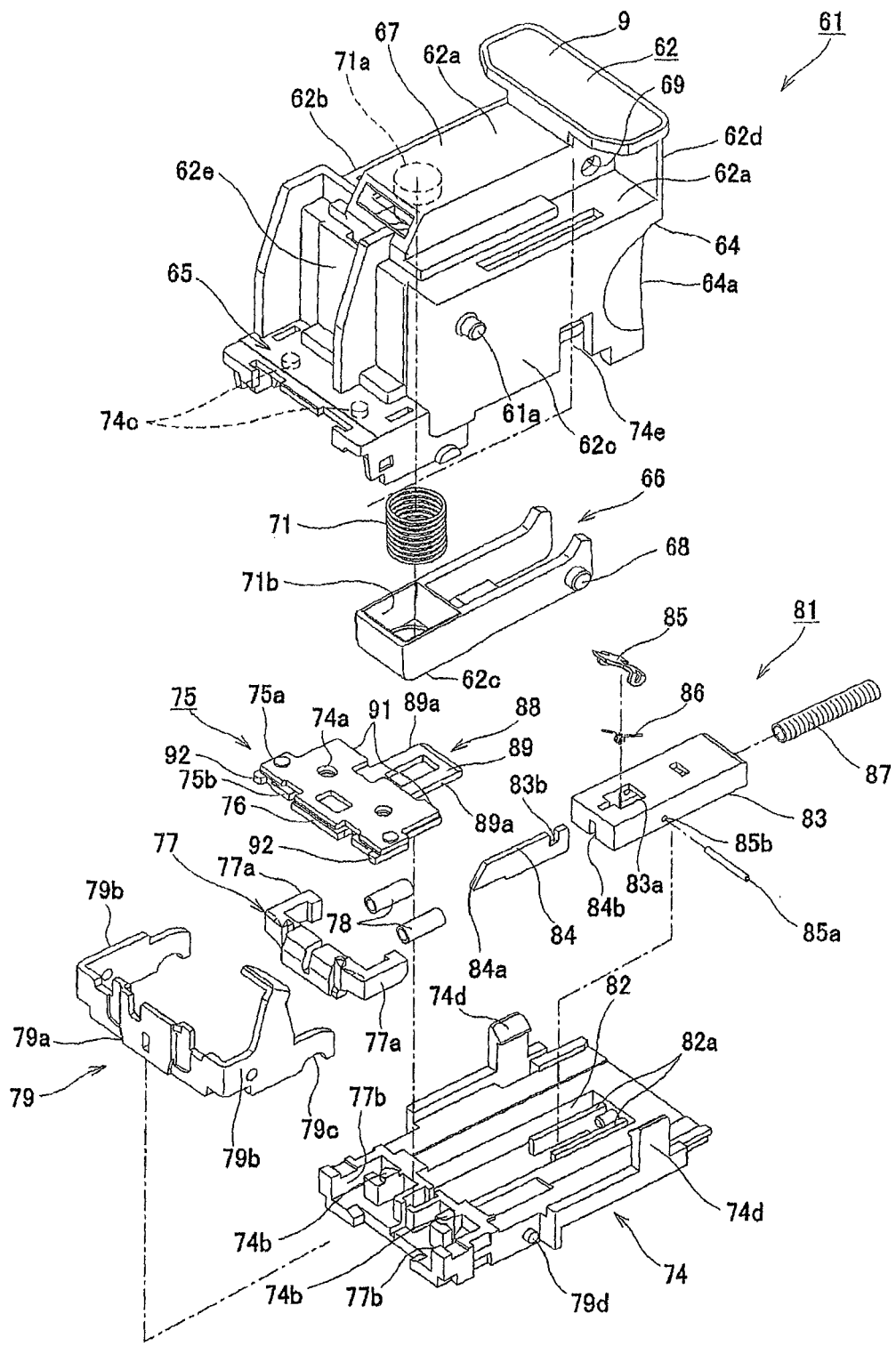
FIG. 31 is an exploded perspective view of the cartridge.

As illustrated in FIGS. 29 and 30, the refill accommodating portion 63 is provided therein with the push lever 66 for pushing the sheet-type connected staples 10 stacked in the staple accommodating portion 13 via the cover member 15 of the accommodated staple-refill 11. On the top surface 62*a* of the cartridge body 62, the push lever 66 is provided on a convex-shaped lever installing portion 67 extending from the rear side formed with the refill inserting port 64 to the front surface formed with the striking section 65. Specifically, the push lever 66 is provided on the lever installing portion 67, in the state in which its base end faces the refill inserting port 64, while its proximal end faces the inside of the refill accommodating portion 63. As illustrated in FIG. 31, the push lever 66 has pivot shafts 68 and 68 protruding from the distal end, and the pivot shafts 68 and 68 are engaged with pivot holes 69 and 69 formed in the lateral surface of the lever installing portion 67. In this way, the push lever 66 is pivotally supported in a direction of the arrow C in FIG. 30 and in a direction opposite to the arrow C. The push lever 66 functions as the push portion 70 of which its leading end portion comes into contact with the cover member 15 of the staple-refill 11 accommodated in the refill accommodating portion 63.

The push lever 66 is provided therein with a coil spring 71 functioning as a resilient biasing member, as illustrated in FIGS. 30 and 31. The coil spring 71 has one end portion which is locked to a locking convex portion 71*a* formed in the lever installing portion 67, and the other end portion which is locked to a locking concave portion 71*b* at the rear side of the push portion 70 of the push lever 66. As a result, the push lever 66 is pivotally biased by the coil spring 71 in the direction of the arrow C in FIG. 30 to always push the cover member 15 of the staple-refill 11. As illustrated in FIG. 30, when the staple-refill 11 is inserted in the refill accommodating portion 63 via the refill inserting port 64, it enters via the notch portion 18 of the front surface 12*a* of the casing 12 functioning as an insertion surface, and is sited on the cover member 15 while being guided by the guide walls 32 and 32. The push portion 70 coming into contact with the cover member 15 is guided by the guide walls 32 and 32, when the sheet-type connected staples 10 are decreased, and then is engaged with the engaging portion 31 of the concave shape. In this way, the push lever 66 can reliably push the sheet-type connected staples 10 stacked in the staple accommodating portion 13 via the cover member 15. When the staple-refill is pulled out from the refill accommodating portion 63, the push portion 70 is guided by the guide walls 32 and 32, and the push lever 66 is released from the staple-refill 11 via the notch portion 18. Also, since the push portion 70 is engaged with the engaging portion of the concave shape, the cover member 15 prevents the staple-refill 11 from falling down from the refill accommodating portion 63 by mistake. Further, since the release of the push lever 66 is automatically performed during pull-out operation of the staple-refill 11, the releasing operation of the push lever 66 or the like is not necessary, thereby achieving the improvement in operability.

Although it is described the case where the push lever 66 is directly biased by the coil spring 71, the configuration of the push lever 66 is not specifically limited. For example, the push lever may push the sheet-type connected staples 10 stacked in the staple-refill 11 via a link mechanism, while utilizing the resilient force of the spring or the like.

<4-2. Description of Locking Mechanism (Engaging Portion)>

As illustrated in FIG. 32, the cartridge 61 is provided with a locking mechanism 72 for preventing the staple-refill 11 from falling out from the refill accommodating portion 63 in use. The locking mechanism 72 is provided with engaging portions 73 and 73 which are engaged with the guide bosses 22 and 22 protruding outward rather than the guide holes 21 and 21 of the lateral surfaces 12b and 12c of the casing 12 on the inner surface of the lateral surfaces 62b and 62c of the cartridge body 62. The engaging portions 73 and 73 protrude from the refill accommodating portion 63, and thus are engaged with the guide bosses 22 and 22 of the staple-refill 11.

Figure 32A:
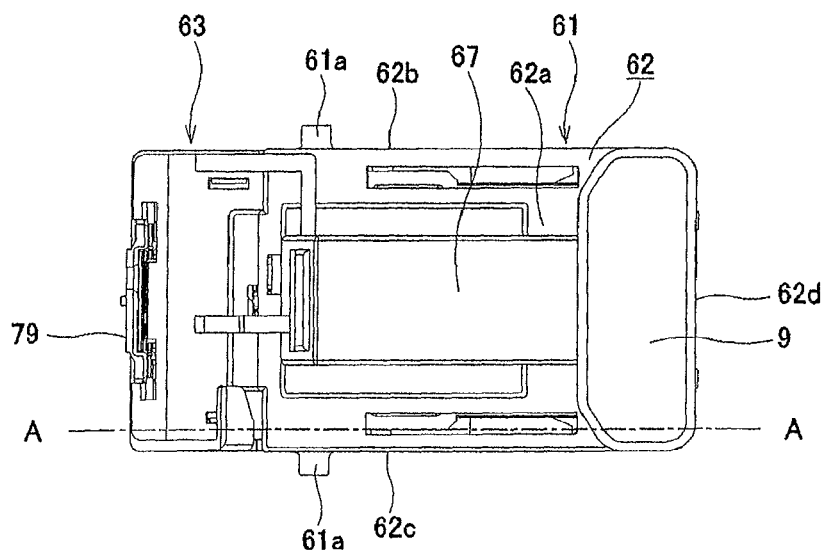
Figure 32B:
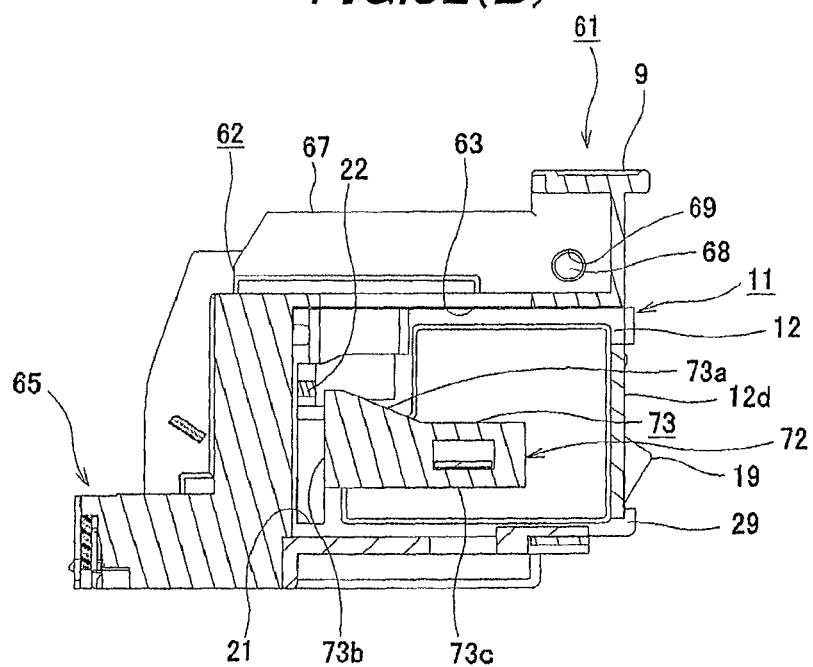

As illustrated in FIGS. 32(A) and 32(B), when the staple-refill loaded with the maximum amount of sheet-type connected staples 10 is inserted, the engaging portions 73 and 73 have pick-up portions 73a and 73a for picking up the guide bosses 22 and 22 of the staple-refill 11, separation restricting portions 73b and 73b formed in parallel with the vertical guide portions 21a and 21a of the guide holes 21 and 21 of the staple-refill 11 to restrict separation of the staple-refill 11, and disengaging portions 73c and 73c for allowing the engaging portions from being separated from the refill accommodating portion 63 when the sheet-type connected staples 10 in the staple-refill 11 are completely consumed. The pick-up portions 73a and 73a are formed at the upper portion, while the disengaging portions 73c and 73c are formed at the lower portion. The separation restricting portions 73b and 73b are vertically formed. The pick-up portions 73a and 73a can reliably pick up the guide bosses 22 and 22 of the staple-refill 11 loaded with the maximum amount of the sheet-type connected staples 10. Since the refill inserting port 64 is formed at a lower position, the pick-up portions 73 and 73a are formed to gradually rise as it goes inside. Also, the disengaging portions 73c and 73c are formed to position upward rather than the height position of the guide bosses 22 and 22 when the sheet-type connected staples 10 of the staple-refill 11 is completely consumed. That is, with the guide bosses 22 and 22 of the cover member 15, the boss portions 23, 23, 23 and 23 formed on the rear surface of the cover member 15 are engaged with the escape portions 24, 24, 24 and 24 formed at four corners of the bottom surface 12e of the casing 12. In this way, the height position of the guide bosses 22 and 22 is placed below the disengaging portions 73c and 73c (see FIG. 15).

Figure 33:
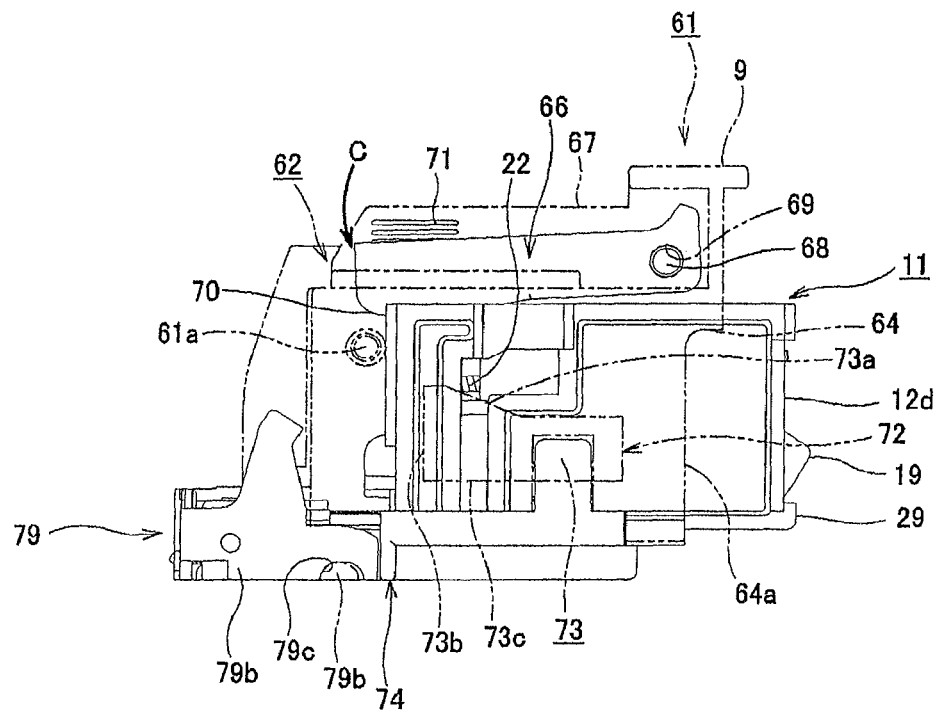
FIG. 33 is a side view illustrating a positional relationship between an engaging portion of the cartridge and the guide boss of the cover member, when the staple-refill is inserted in the cartridge.
Figure 34:
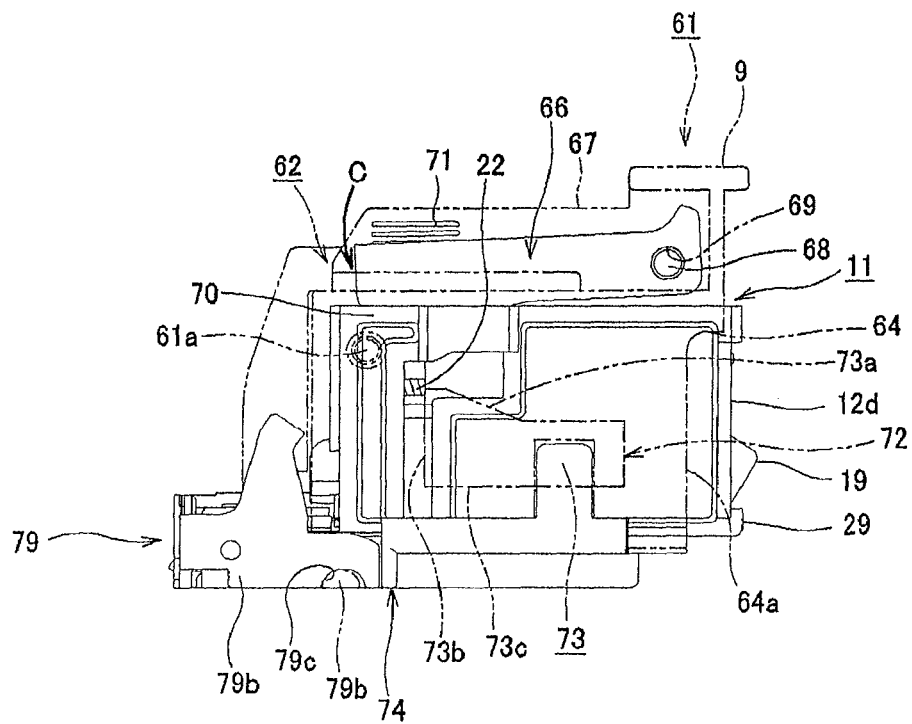
FIG. 34 is a side view illustrating a positional relationship between an engaging portion of the cartridge and the guide boss of the cover member, when the staple-refill has been inserted in the cartridge.

As illustrated in FIG. 33, when the staple-refill 11 is accommodated in the refill accommodating portion 63 through the refill inserting port 64 of the cartridge 61, the guide bosses 22 and 22 of the cover member 15 are first engaged with the pick-up portions 73a and 73a. As the staple-refill 11 is accommodated in the refill accommodating portion 63, the guide bosses 22 and 22 of the cover member 15 pushed by the push lever 66 in the direction of the arrow C in FIG. 33 are lifted against the resilient biasing force of the coil spring 71 by the inclined surface of the pick-up portions 73a and 73a. If the staple-refill 11 is completely accommodated in the refill accommodating portion 63, as illustrated in FIG. 34, the guide bosses 22 and 22 reach the separation restricting portions 73b and 73b. In this instance, the cover member 15 is slightly moved down by the push lever 66 which is resiliently biased in the direction of the arrow C in FIG. 34, and then is pushed against the uppermost layer of the sheet-type connected staples 10 to generate click feeling, so that it can notify the user of that the staple-refill 11 is reliably mounted in the cartridge 61.

In use, the guide bosses 22 and 22 move gradually the separation restricting portions 73b and 73b as the sheet-type connected staples 10 are decreased. If the sheet-type connected staples 10 of the staple-refill 11 are completely consumed, the boss portions 23, 23, 23 and 23 formed on the rear surface of the cover member 15 are engaged with the escape portions 24, 24, 24 and 24 formed at four corners of the bottom surface 12e of the casing 12. The height position of the guide bosses 22 and 22 is placed below the disengaging portions 73c and 73c. Even though the sheet-type connected staples 10 are completely consumed, since the push lever 66 continuously pushes the cover member 15 in the direction of the arrow C in FIG. 35, the boss portions 23, 23, 23 and 23 formed on the rear surface of the cover member 15 can be reliably engaged with the escape portions 24, 24, 24 and 24 of the bottom surface 12e of the casing 12 (see FIG. 15).

If the boss portions 23, 23, 23 and 23 are reliably engaged with the escape portions 24, 24, 24 and 24, the guide bosses 22 and 22 are moved down by the height of the boss portions 23, 23, 23 and 23, and thus are reliably positioned below the disengaging portions 73c and 73c. That is, the guide bosses 22 and 22 are reliably released from the engaging state with the separation restricting portions 73b and 73b. In this way, when the staple-refill 11 is pulled out from the refill accommodating portion 63, the guide bosses 22 and 22 can reliably pass below the disengaging portions 73c and 73c. The staple-refill 11 can be pulled out from the refill accommodating portion 63.

Figure 39A:
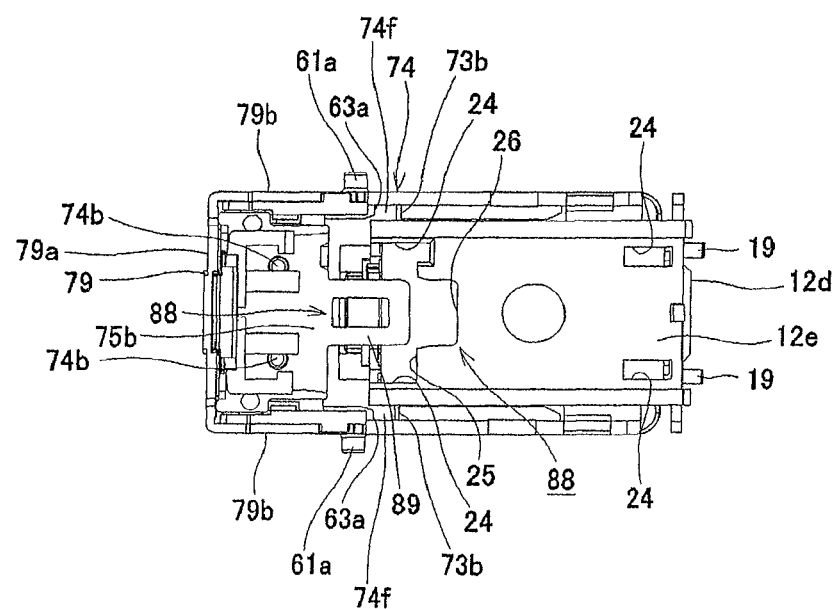
FIG. 39(A) is a bottom view illustrating a positioning mechanism of the staple-refill in the cartridge, before a positioning convex portion of a positioning plate is engaged with a positioning concave portion of the staple-refill.

The locking mechanism 72 prevents that the sheet-type connected staple 10 is detached from the cartridge 61 and thus the sheet-type connected staple 10 already sent to the striking section 65 is separated from the sheet-type connected staples 10 in the staple-refill 11, while the staple-refill 11 is used, and also prevents that the staple-refill 11 is again mounted in the cartridge 61 and thus is failure. Moreover, when the staple-refill 11 is replaced, it is not necessary to carry out the operation such as push release of the push lever 66, thereby improving the operability. Meanwhile, as illustrated in FIG. 39(A), one example of the positioning concave portion 113 is elements 74f and 74f enclosed by an inner wall surface 63a of the refill accommodating portion 63, which accommodates the casing 12 of the cartridge 61, at the side of the striking section, and the separation restricting portions 73b and 73b.

<4-3. Description of Staple Guide Section (Striking Section)>

The front surface of the cartridge body 62 is provided with the striking section 65 for guiding the lowermost layer of the sheet-type connected staples 10 in the staple-refill 11 accommodated in the refill accommodating portion 63, and striking the staple. As illustrated in FIG. 31, the cartridge body 62 is provided with the base plate member 74 configuring the bottom surface of the cartridge 61. The base plate member 74 is provided with the staple guide section 75 at the front surface side thereof. The staple guide 75 abuts against a staple guide cover 75a and a staple guide plate 75b to form therein a passage corresponding to a thickness and a width of the lowermost sheet-type connected staple 10 in the staple-refill 11. The passage guides at least one side of the upper and lower surfaces (flat portion) of the lowermost sheet-type connected staple 10, when the lowermost layer of the sheet-type connected staples 10 of the staple accommodating portion 13 is sent from the staple discharging port 16 to the striking section 65 by the transfer mechanism, and also guides both end portions of the lowermost sheet-type connected staple 10.

The staple guide cover 75a and the staple guide plate 75b configuring the passage are a member for sending the sheet-type connected staples 10 to the striking section 65, and are formed by punching out a metal sheet of high strength or the like so as to accurately position the sheet-type connected staples 10 with respect to the forming plate 80a or the driver plate 80b at the side of the stapling-machine main-body. A leading end portion of the passage for sending the sheet-type connected staples 10 becomes a position in which a straight staple placed at a leading end of the sent sheet-type connected staple 10 is formed in a U-shape by the forming plate, and then is struck toward the paper to be bound by the driver plate. The staple guide plate 75b is provided with a protruding anvil 76 forming the U-shaped staple by the forming plate. The staple guide cover 75a and the staple guide plate 75b are aligned with each position to form positioning holes 74a and 74a, and positioning bosses 74b and 74b protruding from the base plate member 74 and positioning bosses 74c and 74c at the side of the cartridge 61 are engaged with the positioning holes 74a and 74a to achieve the positioning thereof.

The front surface of the striking section 65 is provided with a pusher 77, and the pusher 77 is biased forward by biasing members 78 and 78 such as a coil spring. The pusher 77 is formed in a U-shape, and leg portions 77a and 77a parallel to each are engaged with guide recessed portion 77b and 77b of the base plate member 74, so that the pusher is guided forward. Also, the front surface of the striking section 65 is provided with a faceplate 79 at a further forward of the pusher 77.

Figure 37:
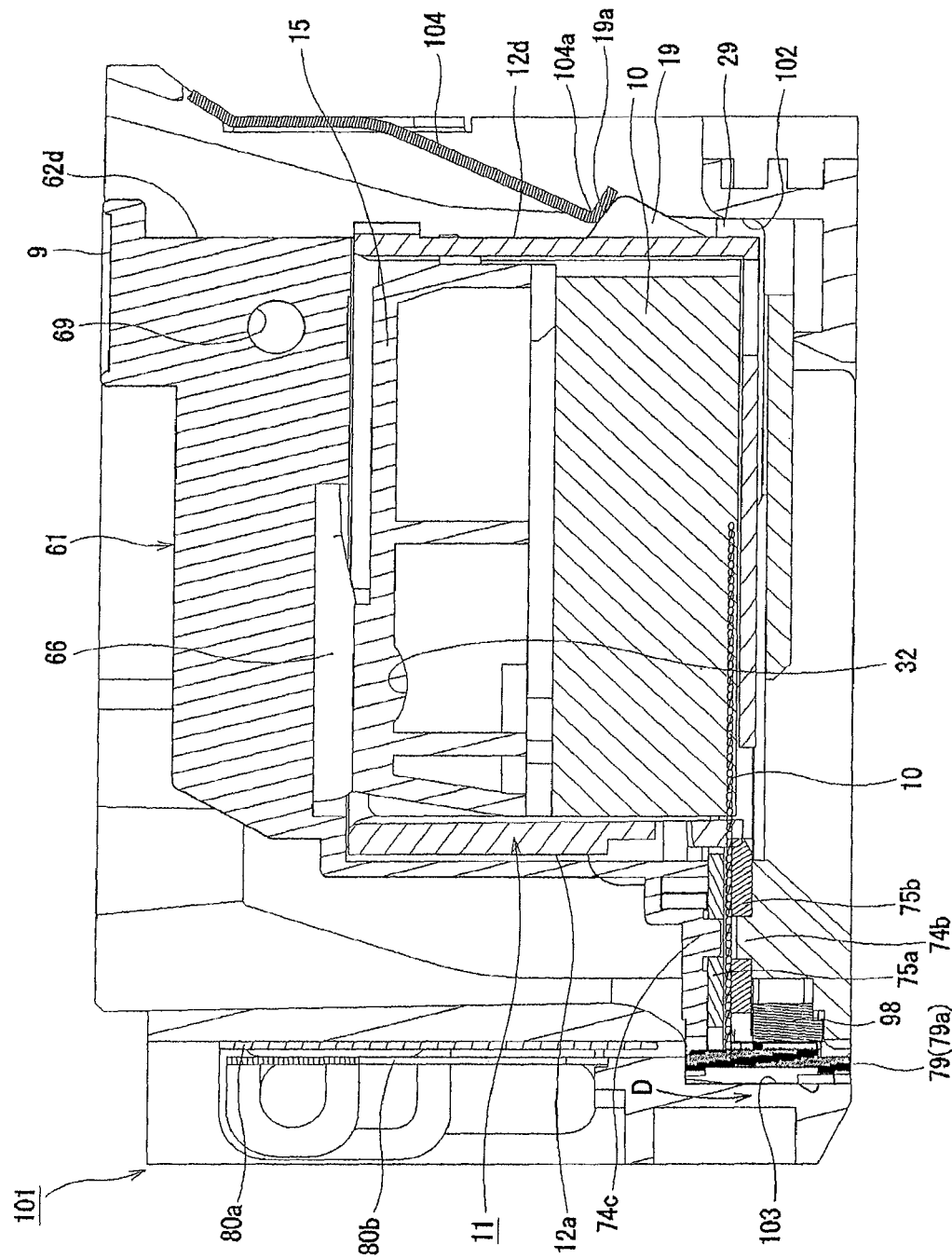
FIG. 37 is a cross-sectional view taken along the line A-A in FIG. 36.
Figure 38:
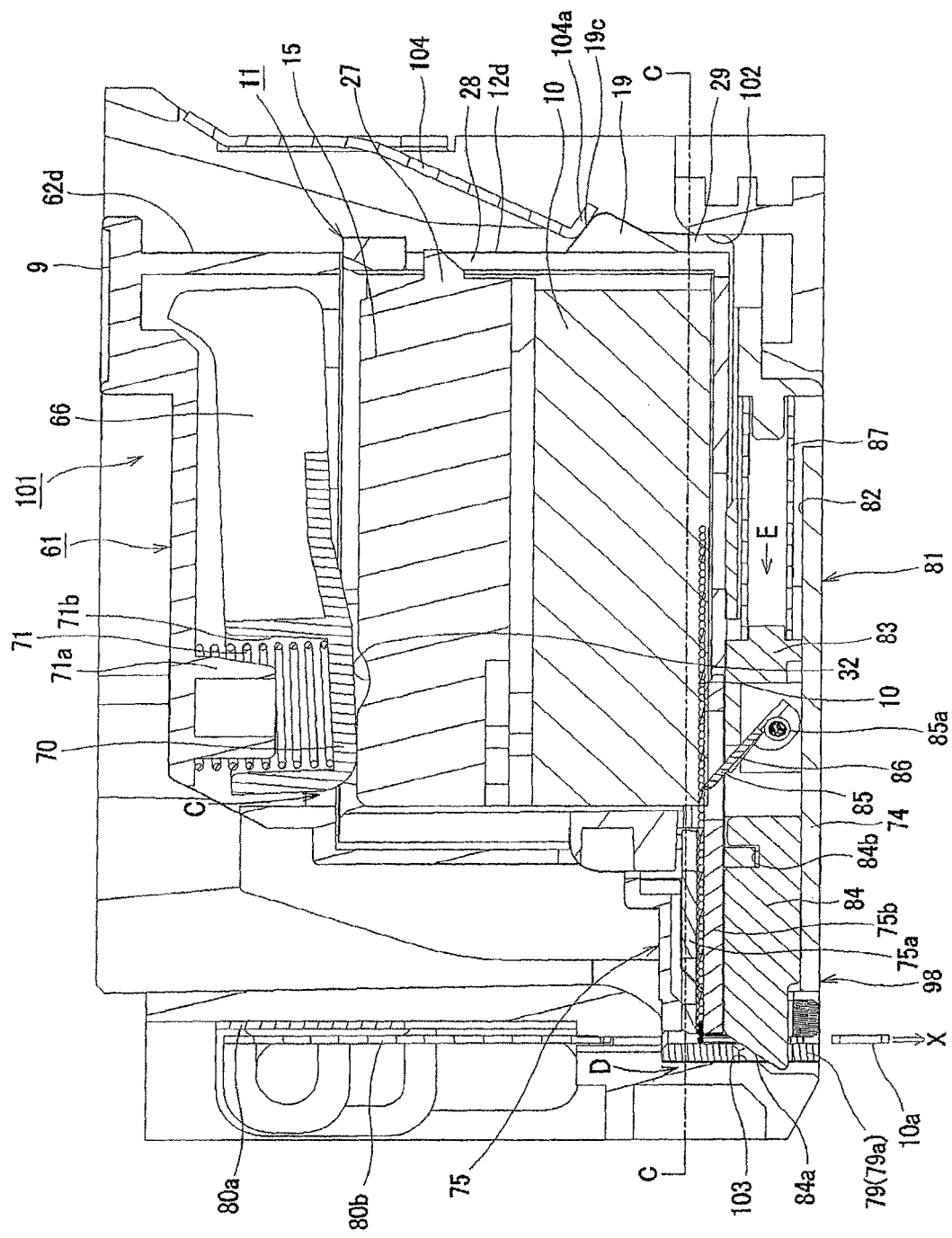
FIG. 38 is a cross-sectional view taken along the line B-B in FIG. 36.

The cartridge 61 is made from, for example, plastic by injection molding, as illustrated in FIG. 31, and the faceplate 79 is formed by bending, for example, metal of strength higher than that. The faceplate 79 has a face portion 79a covering the pusher 77, and arm portions 79b and 79b at both sides of the face portion 79a. The arm portions 79b and 79b have support recessed portions 79c and 79c, and the support recessed portions 79c and 79c are engaged with pivot support bosses 79d and 79d formed on both sides of the base plate member 74, so that the arm portions is pivotally supported in a direction of the arrow D in FIG. 30 and in a direction opposite to the arrow D. The face portion 79a closes the front surface of the pusher 77, as illustrated in FIGS. 37 and 38. A gap is formed between the face portion 79a and the staple guide plate 75b, and the forming plate 80a and the driver plate 80b which are driven by the drive mechanism of the stapling-machine main-body enter the gap. Also, the forming plate 80a and the driver plate 80b are provided to move forward and backward with respect to the gap. Some straight staples from the leading end of the sheet-type connected staples 10 sent through the passage formed between the staple guide cover 75a and the staple guide plate 75b of the staple guide section 75 are formed in the U-shape by the forming plate 80a entering the gap between the face portion 79a and the staple guide plate 75b. When the straight staple is formed in the U-shape, the staple bent by the forming plate 80a is bent by the anvil 76 and the pusher 77. The bent staple is struck along the faceplate 79 by the driver plate 80b. Meanwhile, the faceplate 79 is pivoted in the direction opposite to the direction of the arrow D in FIG. 30, and thus closes the front surface of the striking section 65. When jam or the like occurs, the faceplate is pivoted in the direction of the arrow D in FIG. 30, and thus opens the front surface of the striking section 65 to remove the clogged staple.

<4-4. Description of Transfer Mechanism>

The base plate member 74 is provided with a transfer mechanism 81 for transferring the lowermost sheet-type connected staple 10 from the staple-refill 11 mounted in the refill accommodating portion 63 of the cartridge 61 to the striking section 65. The transfer mechanism 81 includes, as illustrated in FIGS. 31 and 38, a guide member 83 moving in the transfer direction of the sheet-type connected staple 10, a transfer plate 84 having an inclined portion 84a engaging with the driver plate 80b, a transfer claw 85 engaging with the sheet-type connected staple 10 to be sent, a torsion coil spring functioning as a biasing member for biasing the transfer claw 95 in a direction to engage with the sheet-type connected staple 10, and a coil spring 87 functioning as a resilient biasing member for resiliently biasing the guide member 83 in the transfer direction of the sheet-type connected staple 10, in the guide recessed portion 82 provided at the widthwise center of the base plate member 74 in the longitudinal direction thereof.

The guide member 83 is provided with the transfer claw 85 pivotally supported by a support shaft 85a which penetrates in a shaft hole 85b formed in opposite lateral sides of the guide member 83. The transfer claw 85 is pivotally biased in a direction to expose outward through an opening portion 83a of the guide member 83 by the torsion coil spring 86 having one end locked to the transfer claw 85 and the other end locked to the guide member 83. The transfer claw 85 is engaged with the fine concave portion formed between the straight staples adjacent to each other of the lowermost sheet-type connected staples 10 in the staple-refill 11. Also, one end portion of the guide member 83 at the side of the striking section 65 is attached by the transfer plate 84 by engaging the concave portions 83b and 84b. The transfer plate 84 is provided with the inclined portion 84a at its leading end, and the inclined portion 84a is exposed between the face portion 79a of the faceplate 79 and the pusher 77. The coil spring 87 is provided in the guided state by guide walls 82a and 82a in the guide recessed portion 82 between the lateral surface of the guide recessed portion 82 at the side the refill inserting port 64 and the guide member 83. The coil spring 87 biases the guide member 83 in a direction of the striking section 65, that is, a direction of the arrow E in FIG. 38.

With the transfer mechanism 81, if the inclined portion 84a of the transfer plate 84 is pushed by the driver plate 80b entering between the face portion 79a of the faceplate 79 and the pusher 77 to strike the staple, the guide member 83 is moved in a direction opposite to the direction of the arrow E in FIG. 38, with being against the biasing force of the coil spring 87. In this way, the transfer claw 85 of the guide member 83 is moved in the direction opposite to the direction of the arrow D by one straight staple of the lowermost sheet-type connected staples 10 in the staple-refill 11, and then is engaged with a next fine concave portion from the fine concave portion between the straight staples engaged until now. After that, the guide member 83 is returned to its original position by the biasing force of the coil spring 87, that is, is moved in the direction of the arrow E in FIG. 38. In this instance, the transfer claw 85 of the guide member 83 sends out one straight staple 1 toward the striking section 65.

<4-5. Description of Positioning Mechanism>

Figure 39B:
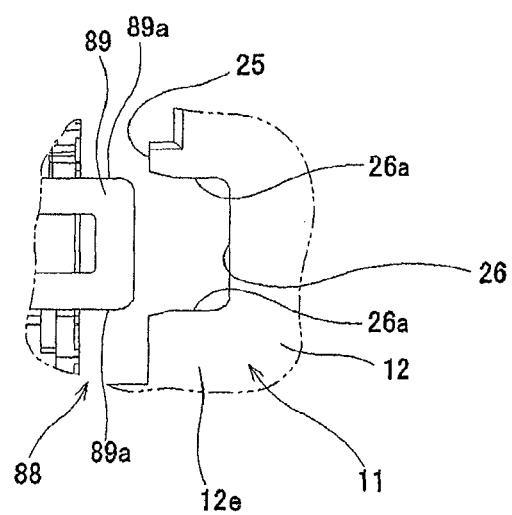
FIG. 39(B) is an enlarged view.
Figure 40A:
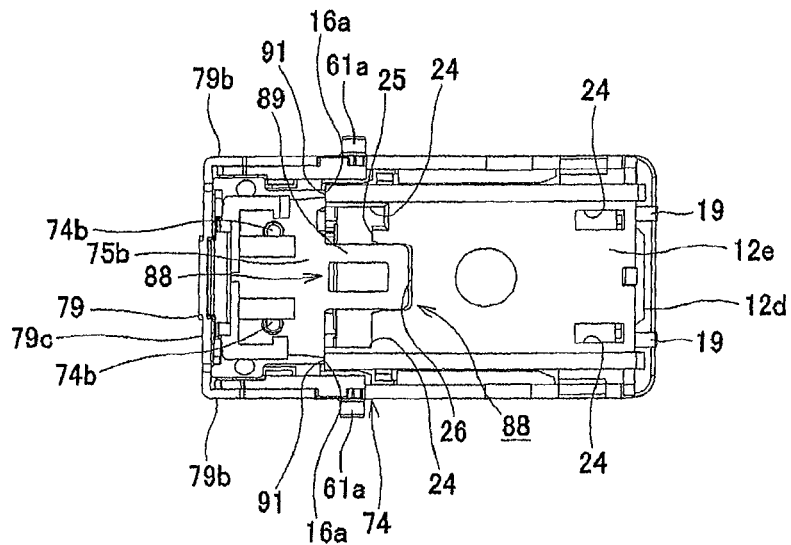
FIG. 40(A) is a bottom view illustrating the positioning mechanism of the staple-refill in the cartridge, in a state in which the positioning convex portion of the positioning plate is engaged with the positioning concave portion of the staple-refill.
Figure 40B:
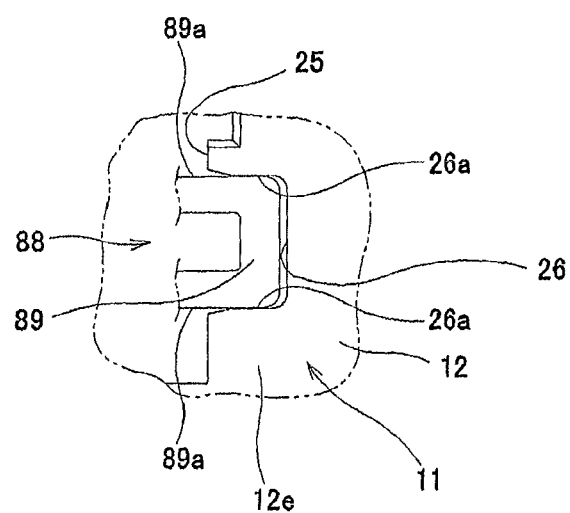
FIG. 40(B) is an enlarged view.

As illustrated in FIGS. 31, 39 and 40, the staple guide plate 75b which overlaps with the staple guide cover 75a to configure the staple guide section 75 is provided with a positioning convex portion 89 protruding toward the refill inserting port 64 when it is attached to the base plate member 74. The positioning convex portion 89 functions as the positioning portion, and, when the staple-refill 11 is mounted in the refill accommodating portion 63, is fitted into the positioning concave portion 26 formed on the bottom surface 12e of the casing 12 functioning as a positioned portion. That is, the positioning convex portion 89 has faces 89a and 89a parallel to the insertion direction of the staple-refill 11, and, when the staple-refill 11 is inserted in the refill accommodating portion 63, is fitted into the positioning concave portion 26 formed on the bottom surface 12e of the casing 12. In this instance, the faces 89a and 89a, which are parallel to the insertion direction of the staple-refill 11, of the positioning convex portion 89 are brought into contact with fitting surfaces 26a and 26a of the positioning concave portion 26. The positioning mechanism 88 of the staple-refill 11 configured as described above performs the positioning of the sheet-type connected staples 10 accommodated in the staple accommodated portion 13 of the casing 12 in the width direction of the staple-refill which is an extension direction of the sheet-type connected staple 10, that is, the positioning convex portion 89 performs the positioning of the sheet-type connected staples 10 in a direction perpendicular to the transfer direction. In this way, the lowermost sheet-type connected staple 10 in the staple accommodating portion 13 is transferred to the passage formed between the staple guide cover 75a of the staple guide section 75 and the staple guide plate 75b through the staple discharging port 16 of the staple-refill 11. Moreover, the positioning of the sheet-type connected staples 10 in the transfer direction can be performed by abutting the leading end of the positioning convex portion 89 against the end portion of the positioning concave portion 26 opposite to the leading end.

The positioning of the sheet-type connected staples 10 of the staple-refill 11 in the transfer direction in the refill accommodating portion 63 is performed as follows. As illustrated in FIGS. 6 to 9, the casing 12 of the staple-refill 11 is provided with the pushed portions 29 and 29 which protrude from both corner portions of the bottom surface 12e to have the same height. When the cartridge 61 incorporated with the staple-refill 11 is mounted in the magazine 101 of the stapling-machine main-body, the pushed portions 29 and 29 are pressed against the pushing portions 102 and 102 of the magazine 101.

In the cartridge 61, as illustrated in FIGS. 24, 25 and 28, both lateral portions 16a and 16a of the staple discharging port 16 of the casing 12 abut against the first abutting portions 91 and 91 of the staple guide section 75, which is fixed to the cartridge 61 and the base plate member 74, at both sides of the positioning convex portion 89. Also, second abutting portions 92 and 92 are formed at the staple guide section 75 at the side of the face portion 79a of the faceplate 79. When the cartridge 61 is mounted in the magazine 101, the second abutting portions 92 and 92 abut against the inner surface of the face portion 79a of the faceplate 79. The outer surface of the faceplate 79 which is opposite to the inner surface abutting against the second abutting portions 92 and 92 abuts against mounting reference portions 103 and 103 of the magazine 101. Meanwhile, the first and second abutting portions 91, 91, 92 and 92 are formed on the staple guide plate 75b in this example, but may be formed on the staple guide cover 75a.

That is, when the cartridge 61 incorporated with the staple-refill 11 is mounted in the magazine 101 of the stapling-machine main-body, the pushed portions 29 and 29 of the staple-refill 11 are pushed by the pushing portions 102 and 102 of the magazine 101, and both laterals portions 16a and 16a of the staple discharging port 16 abut against the first abutting portions 91 and 91 of the staple guide section 75 and are in close contact with them. Also, the second abutting portions 92 and 92 of the staple guide section 75 abut against the face portion 79a of the faceplate 79, and the face portion 79a abuts against the mounting reference portions 103 and 103 of the magazine 101. That is, the positioning of the staple-refill 11, which functions as the supply source of the sheet-type connected staples 10, in the magazine 101 is performed by abutment of the mounting reference portions 103 and 103 via the staple guide section 75 and the faceplate 79.

In this way, it is not necessary to provide the cartridge 61 with the portion to be pushed by the pushing portions 102 and 102, thereby simplifying the configuration of the cartridge 61 and downsizing the appearance of the cartridge 61. Moreover, the staple-refill 11 having the rear surface provided with the pushed portions 29 and 29 to be pushed by the pushing portions 102 and 102 is a consumable supply which is replaced by new one if the sheet-type connected staples 10 are completely consumed. Accordingly, the pushed portions 29 and 29 to be pushed by the pushing portions 102 and 102 are changed by the appearance of new one whenever the staple-refill 11 is replaced, so that the staple-refill 11 can be positioned accurately.

Figure 41:
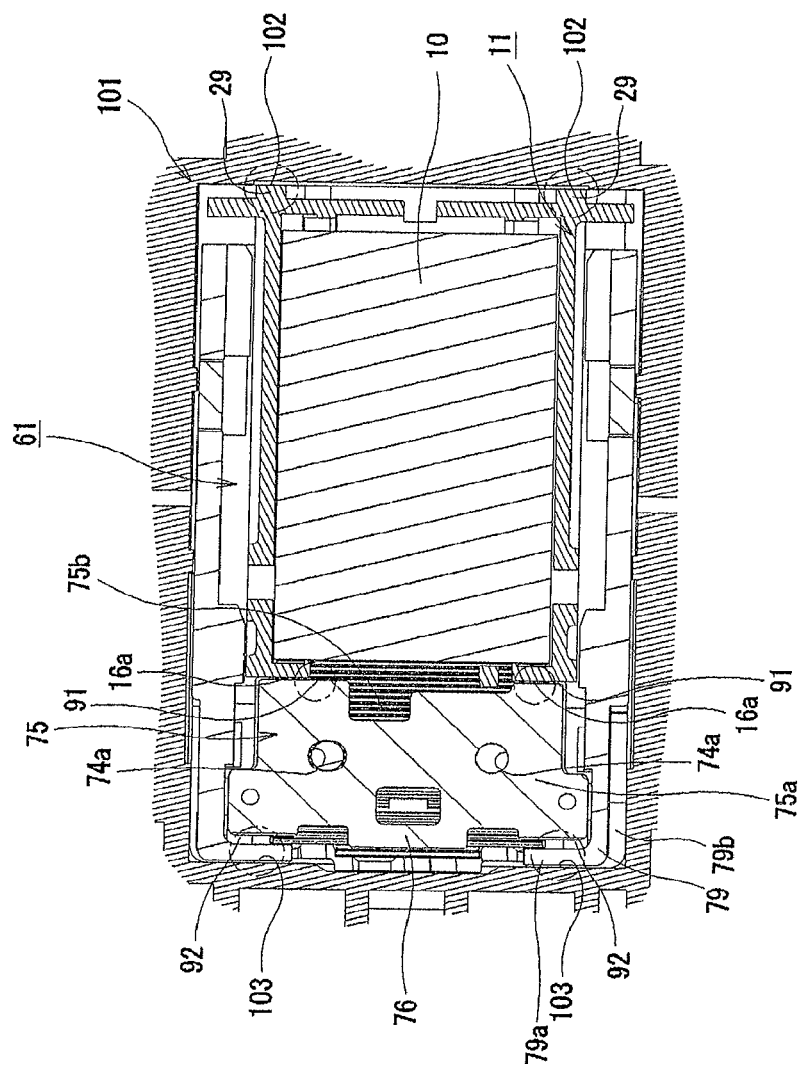
FIG. 41 is a horizontal cross-sectional view (cross-sectional view taken along the line C-C in FIG. 38) illustrating a transfer mechanism of the cartridge mounted with the staple-refill.

In general, the staple-refill 11 is not accurately positioned in the cartridge 61, and thus rattling occurs. For this reason, since the rattling of the sheet-type connected staples 10 in the cartridge 61 is increased, the slope of the inclined portion 84a of the transfer plate 84 is decreased to absorb the rattling, so that the inclined surface is gently inclined. Therefore, operation stroke of the guide member 83 or the transfer plate 84 of the transfer mechanism 81 is extended. In the example of FIGS. 37, 38 and 41, the staple-refill is pushed by the pushing portions 102 and 103 of the magazine 101, and then is pressed by the mounting reference portions 103 and 103 via the staple guide section 75 and the faceplate 79, so that the staple-refill in the magazine 101 can be accurately positioned. As a result, since the operation stroke of the guide member 83 or the transfer plate 84 of the transfer mechanism 81 can be shortened, the downsizing of the cartridge 61 can be achieved. Also, since the staple-refill 11 abuts against the mounting reference portions 103 and 103 of the magazine 101 via the staple guide section 75 and the faceplate 79 which are made from metal of high strength, more accurate positioning can be performed. Further, since the casing 12 is brought into close contact with the staple guide section 75 to make the staple guide section 75 in contact with the faceplate 79, the dimension of the gap through which the staple passes can be reliably maintained.

Figure 43:
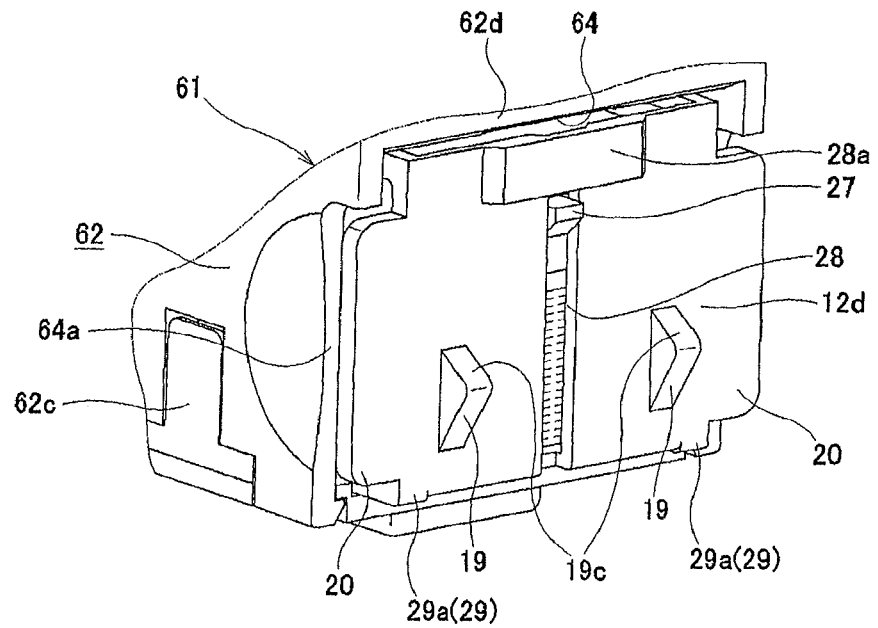
FIG. 43 is a perspective view of major parts to illustrate a modification in which a pushed portion formed on a rear surface of the casing is configured to have the same height.
Figure 44:
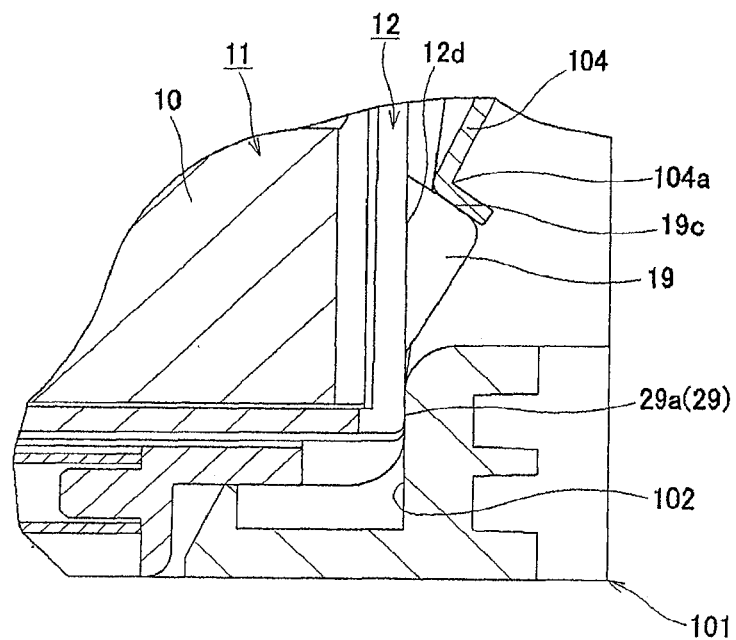
FIG. 44 is a perspective view of major parts to illustrate a state in which the staple-refill in FIG. 43 is mounted in a magazine.

In the above example, although it has been described the case where the pushed portions 29 and 29 protruding in the same height from the rear surface 12d of the casing 12 are pushed by the pushing portions 102 and 102 of the magazine 101 and thus the staple-refill 11 abuts against the mounting reference portions 103 and 103 of the magazine 101 to perform the accurate positioning, but the configuration in FIGS. 43 to 46 may be provided. In the example in FIGS. 43 and 44, the rear surface 12d of the casing 12 is formed in the same height, and the pushed portions 29 and 29 are not provided with a convex portion, but provided with planar portions 29a and 29a which are identical to other region of the rear surface 12d. In this instance, as illustrated in FIG. 44, the flat pushed portions 29 and 29 are pushed by the pushing portions 102 and 102 of the magazine 101. Since there is not recess and convex portion on the pushed portions 29 and 29, the appearance of the staple-refill 11 can be simplified.

Figure 45:
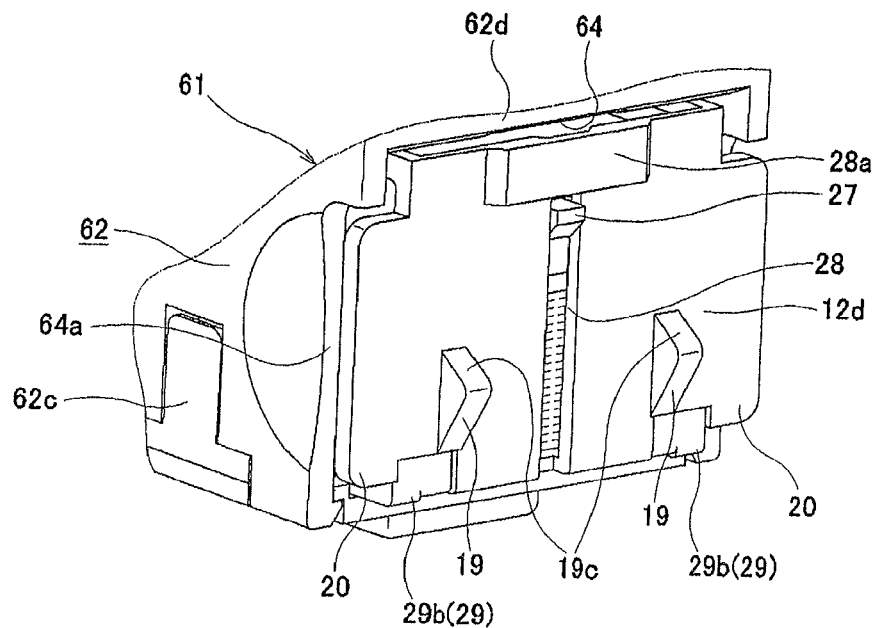
FIG. 45 is a perspective view of major parts to illustrate a modification in which a pushed portion formed on the rear surface of the casing is configured as a concave portion.
Figure 46:
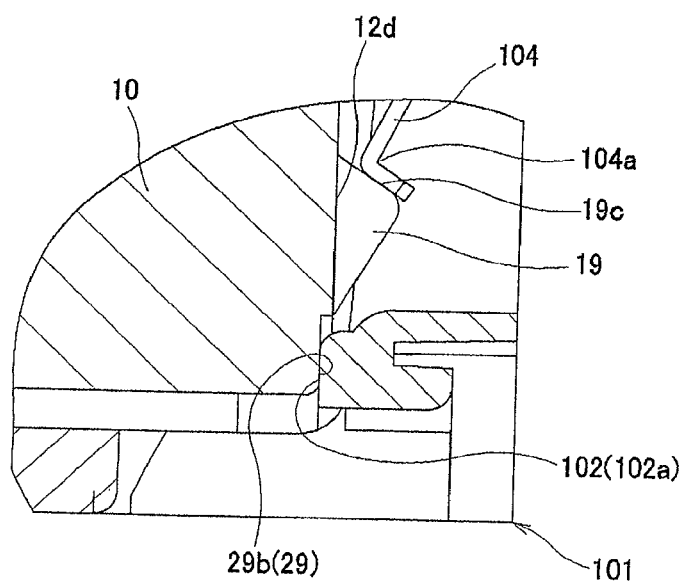
FIG. 46 is a perspective view of major parts to illustrate a state in which the staple-refill in FIG. 45 is mounted in the magazine.

The pushed portions 29 and 29 formed on the rear surface 12d of the casing 12 may be provided with concave portions 29*b* and 29*b*, as illustrated in FIGS. 45 and 46. In this instance, the pushing portions 102 and 102 of the magazine 101 pushing the concave portions 29*b* and 29*b* are provided with convex portions 102*a* and 102*a* which are engaged with the concave portions 29*b* and 29*b* to push the casing 12. Since the convex portions 102*a* and 102*a* are engaged with the concave portions 29*b* and 29*b*, the pushed portions 29 and 29 of the concave shape are accurately aligned with the pushing portions 102 and 102, and then are pushed by the pushing portions 102 and 102 of the convex shape of the magazine 101.

Figure 47A:
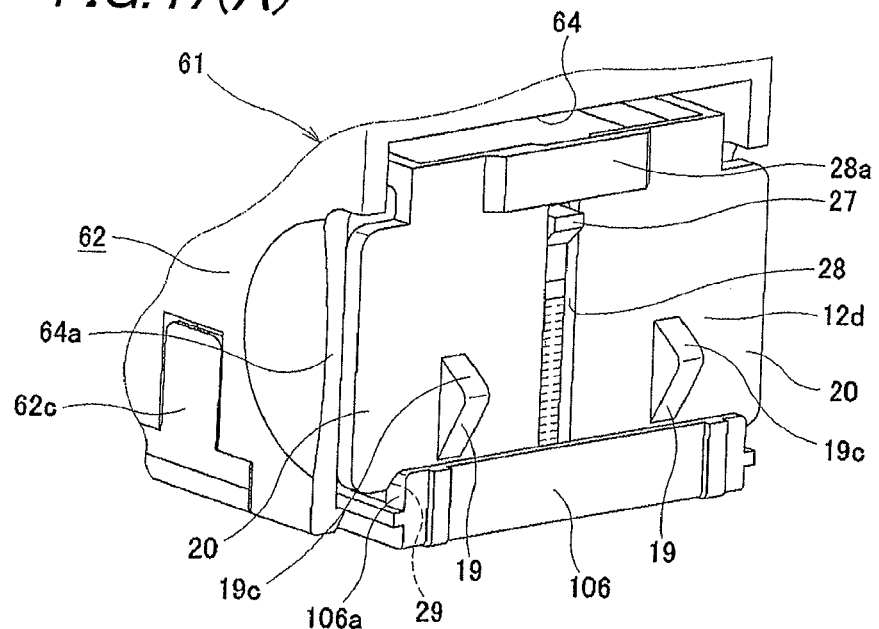
FIG. 47(A) is a bottom view of major parts to illustrate a modification in which the staple-refill is pushed down by the push member provided in the cartridge.
Figure 47B:
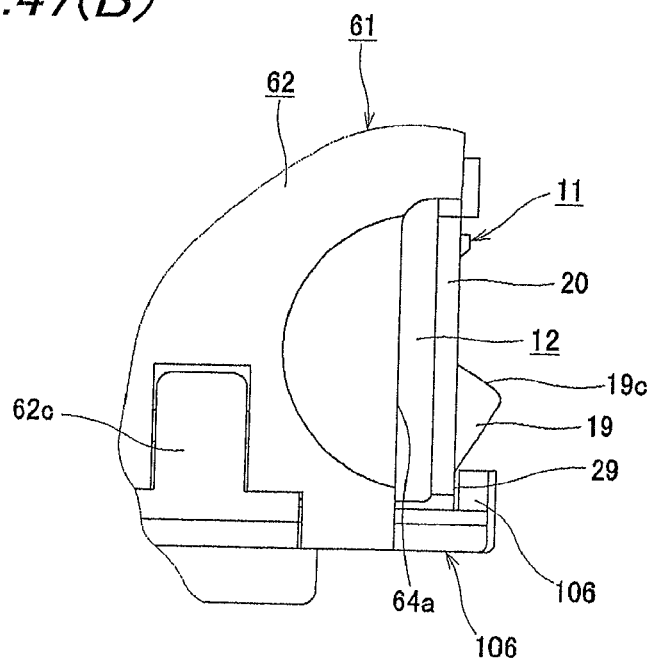
FIG. 47(B) is an enlarged view of its major ports.

As described above, the positioning of the staple-refill 11 in the magazine 101 requires that the staple-refill 11 is pushed against the mounting reference portions 103 and 103 via the staple guide section 75 and the faceplate 79. In the example in FIGS. 47(A) and 47(B), the cartridge 61 is provided with a pushing member 106. The pushing member 106 is a member replacing the pushing portions 102 and 102 provided on the magazine 101. The pushing member 106 is provided to be continuous with the bottom surface of the refill accommodating portion 63 at the side of the refill inserting port 64 of the cartridge body 62. The leading end portion of the pushing member 106 is provided with pushing portions 106*a* and 106*a* pushing the pushed portions 29 and 29 of the casing 12. In the example in FIGS. 47(A) and 47(B), the staple-refill 11 may be pushed against the mounting reference portions 103 and 103 by the pushing portions 106*a* and 106*a* of the pushing member 106 of the cartridge body 62 via the staple guide section 75 and the faceplate 79 which are provided at the front side of the cartridge body 62. However, in the example in FIGS. 47(A) and 47(B), since the cartridge body 62 is provided with the pushing member 106, the cartridge body 62 is increased in size by the pushing member 106. By contrast, the cartridge 61 illustrated in the example in FIGS. 37 and 38 can be downsized by the pushing member 106, since the cartridge body 62 is not necessarily provided with the pushing member 106.

Figure 48A:
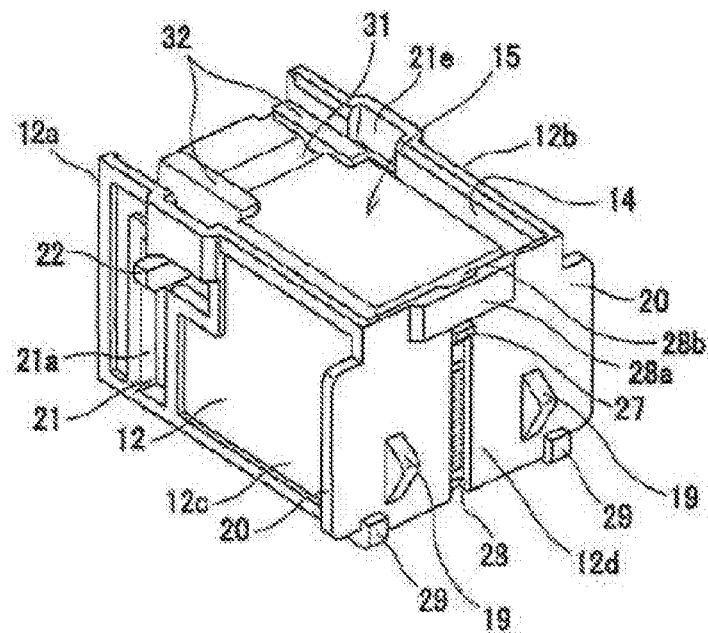
FIG. 48(A) is a perspective view illustrating a staple-refill with no front wall according to a modification, when seen from its rear side.
Figure 48B:
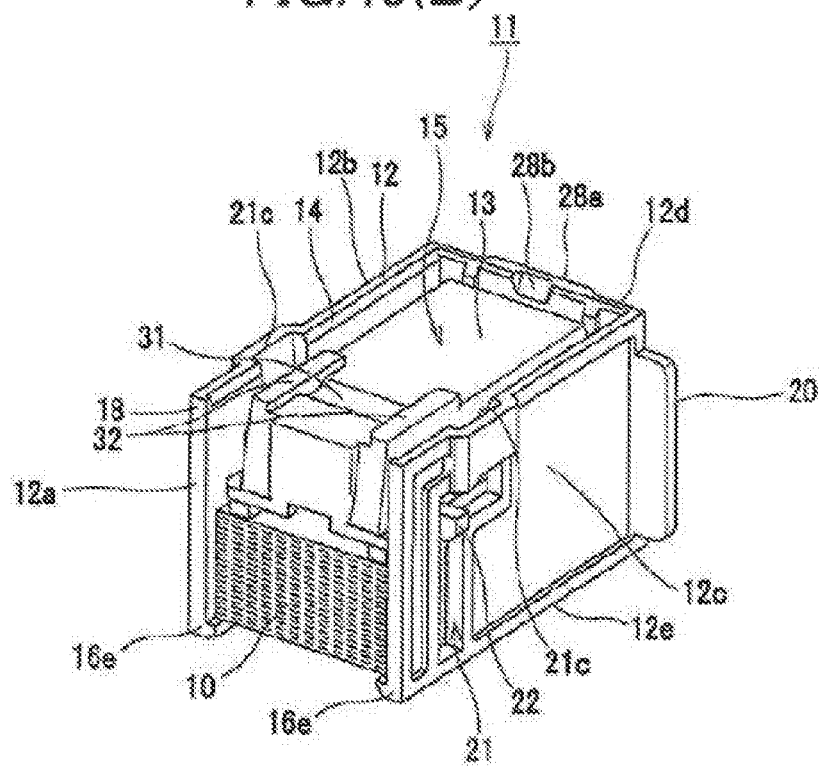
FIG. 48(B) is a perspective view illustrating a staple-refill with no front wall according to a modification, when seen from its front side.

With the staple-refill 11 accommodated in the refill accommodating portion 63 of the cartridge 61, as illustrated in FIGS. 37, 38 and 41, the pushed portions 29 and 29 are pushed by the pushing portions 102 and 102 of the magazine 101, and both lateral portions 16*a* and 16*a* of the staple discharging port 16 abut against the first abutting portions 91 and 91 of the staple guide section 75 by the pushing force, and then are in close contact with the first abutting portions. Also, the second abutting portions 92 and 92 of the staple guide section 75 abut against the face portion 79*a* of the faceplate 79, and the face portion 79*a* abuts against the mounting reference portions 103 and 103 of the magazine 101. Accordingly, to achieve the function, as illustrated in FIGS. 48(A) and 48(B), it is not necessary to provide the front surface 12*a* of the casing 12 with the front wall. In this instance, the pushed portions 29 and 29 are pushed by the pushing portions 102 and 102 of the magazine 101, and corner portions 16*e* and 16*e* formed by the bottom surface 12*e* and the lateral surfaces 12*b* and 12*c* at the front surface 12*a* of the casing 12 abut against the first abutting portions 91 and 91 of the staple guide section 75 by the pushing force, thereby obtaining the same effect as the case of the front wall.

<5. Description of Fundamental Configuration of Magazine (FIGS. 36 to 38, FIG. 41, and so forth)>

As illustrated in FIGS. 37 and 38, the magazine 101 includes the mounting reference portions 103 and 103, and is provided with the pushing portions 102 and 102 at the position opposite to the pushed portions 29 and 29 of the rear surface 12*d* of the staple-refill 11 incorporated in the cartridge 61 so as to allow the face portion 79*a* of the faceplate 79 abut against the mounting reference portions 103 and 103. Also, the magazine 101 is provided with the mounting levers 104 and 104 holding the cartridge 61 incorporated with the staple-refill 11, and the mounting levers 104 and 104 push the second positioning projections 19 and 19 protruding from the rear surface 12*d* of the staple-refill 11 in a triangular shape. The mounting levers 104 and 104 are resilient pieces formed by bending, for example, a leaf spring, and have leading end portions bent, for example, at a substantially right angle to form engaging pieces 104*a* and 104*a* which are engaged with the upper-side end face 19*c* forming the inclined portion of the second positioning projections 19 and 19. The bent angle of the leading end portion is not limited to the substantially right angle, and other angle is preferable if the angle can obtain the engaging force suitable for the shape of the second positioning projections 19 and 19. The engaging pieces 104*a* and 104*a* of the mounting levers 104 and 104 are engaged with the upper-side end face 19*c* of the second positioning projections 19 and 19. The mounting levers 104 and 104 press the cartridge 61 towards the bottom surface and the front surface of the magazine 101 via the staple-refill 11 to fix, that is, lock, the magazine, by the fact in that the engaging pieces 104*a* and 104*a* are engaged with the upper-side end face 19*c* of the second positioning projections 19 and 19 to push the second positioning projections 19 and 19 from the upper portion. That is, the second positioning projections 19 and 19 function as an additional pushed portion together with the pushed portions 29 and 29. The mounting levers 104 and 104 are a locking member for locking the cartridge 61 in the state in which the cartridge 61 is mounted in the magazine 101, and the second positioning projections 19 and 19 provided on the rear surface of the staple-refill 11 are a locked portion which is locked to the mounting levers 104 and 104.

The magazine 101 is provided with the forming plate 80*a* and the driver plate 80*b*. As illustrated in FIGS. 37 and 38, the forming plate 80*a* enters between the faceplate 79 and the staple guide plate 75*b* from the top surface of the striking section 65, and moves the straight staple 10*a*, which is positioned at the leading end portion of the lowermost sheet-type connected staple 10 in the staple accommodating portion 13 of the staple-refill 11, along the pusher 77, so that the staple is formed in the U-shape by the anvil 76. The driver plate 80*b* is provided together with the forming plate 80*a* at the side of the faceplate 79 rather than the forming plate 80*a*. The driver plate 80*b* enters between the faceplate 79 and the pusher 77 from the top surface of the striking section 65, and strikes the staple 10*a* bent in the U-shape in the direction of the arrow X in FIG. 38.

As illustrated in FIGS. 6 to 9, 37, 38, or the like, the second positioning projections 19 and 19 formed on the rear surface 12*d* of the casing 12 have the face surface 19*c*, which is inclined downward toward the direction of the bottom surface 12*e* and the front surface 12*a*, at the side of the top surface of the casing 12. When the inclined portion is pushed down, the casing 12 is pressed against the bottom surface and the front surface of the mounting object by the mounting levers 104 and 104. That is, the mounting lever 104 performs a role corresponding to the pushing portion 102, while the second positioning projections 19 and 19 perform a role corresponding to the pushed portions 29 and 29. Accordingly, when the staple-refill 11 mounted in the cartridge 61 abuts against the mounting reference portions 103 and 103 of the magazine 101, it is not positively necessary to provide the casing 12 with the pushed portions 29 and 29, and the magazine 101 with the pushing portions 102 and 102.

Figure 49A:
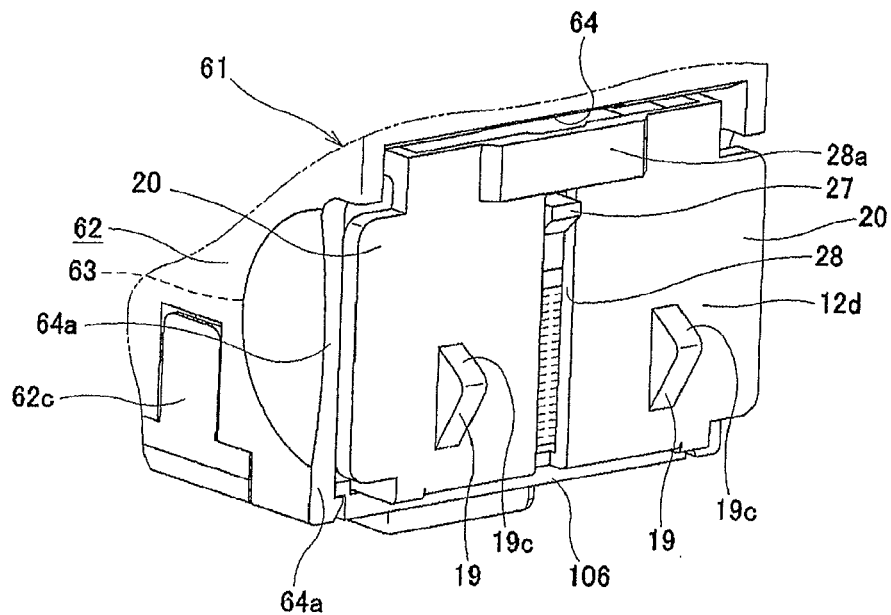
FIG. 49(A) is a perspective view illustrating the staple-refill including a second positioning projection functioning as the pushed portion, when seen from its rear side.
Figure 49B:
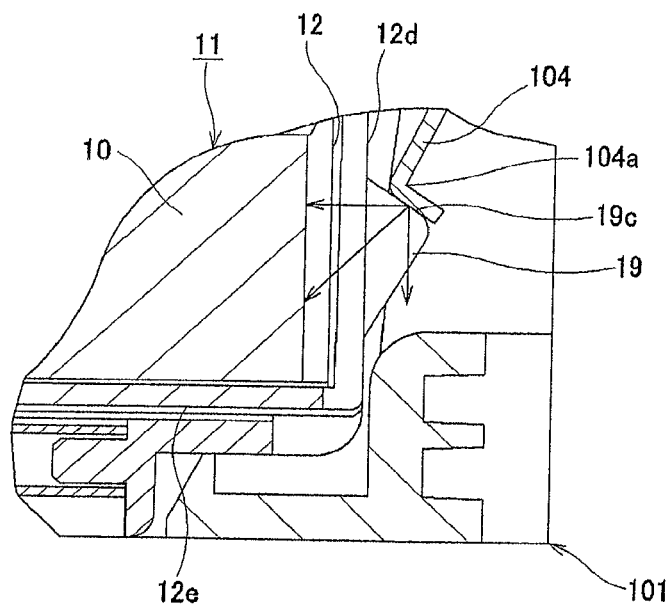
FIG. 49(B) is a cross-sectional view of major parts to illustrate a state in which a mounting lever of the magazine is engaged with the second positioning projection functioning as the pushed portion to push down the staple-refill in two directions of front and bottom surfaces of the refill receiving portion.

That is, as illustrated in FIG. 49(A), the staple-refill 11 used herein is not provided with the pushed portions 29 and 29 at the corner portions of the rear surface 12d of the casing 12 at the side of the bottom surface 12e, but is provided with the second positioning projections 19 and 19 protruding in the triangular shape. The magazine 101, in which the cartridge 61 incorporated with the staple-refill 11 is mounted, is not provided with the pushing portions 102 and 102 for pushing the pushed portions 29 and 29, but is provided with the mounting levers 104 and 104 for pushing the second positioning projections 19 and 19 to hold the cartridge 61 incorporated with the staple-refill 11. The mounting levers 104 and 104 have the leading end portions bent at a substantially right angle to form the engaging pieces 104a and 104a which are engaged with the upper-side end face 19c of the second positioning projections 19 and 19. The mounting levers 104 and 104 function as the pushing portions 102 and 102 to press the staple-refill 11 towards the bottom surface and the front surface of the refill accommodating portion 63 in the cartridge 61. In this way, the staple-refill 11 in the refill accommodating portion 63 is locked in the accommodated state. Herewith, the staple-refill 11 is positioned with respect to the magazine 101, as illustrated in FIG. 49(B), as both lateral portions 16a and 16a of the staple discharging port 16 abut against the first abutting portions 91 and 91 of the staple guide section 7 by the resiliently biasing force of the mounting levers 104 and 104 to be in close contact with the first abutting portions, the second abutting portions 92 and 92 of the staple guide section 75 abut against the face portion 79a of the faceplate 79, and the face portion 79a abuts against the mounting reference portions 103 and 103 of the magazine 101.

Figure 50A:
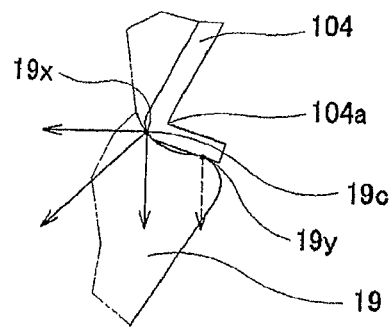
FIG. 50(A) is a side view of major parts to illustrate a modification in which an upper cross section of the second positioning projection functioning as the pushed portion is bent inward.
Figure 50B:
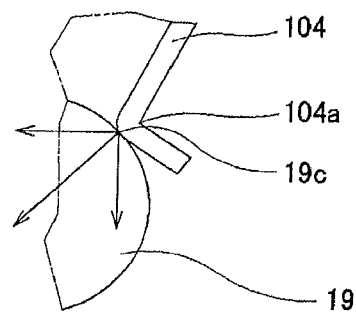
FIG. 50(B) is a cross-sectional view of major parts to illustrate a modification of the second positioning projection which protrudes in an arc-shape.
Figure 50C:
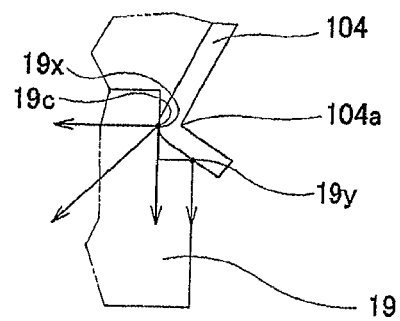
FIG. 50(C) is a side view of major parts to illustrate a modification of the second positioning projection which is configured by a stepped portion.

The shape of the second positioning projections 19 and 19 functioning as the pushed portion is limited to the triangular shape protruding from the rear surface 12d of the casing 12. For example, the second positioning projections 19 and 19 functioning as the pushed portion may be formed in a concave shape which is bent downward when the upper-side end face 19c is inclined downward in the direction of the bottom surface 12e and the front surface 12a, as illustrated in FIG. 50(A). In this instance, as the engaging portions 104a and 104a of the mounting levers 104 and 104 are engaged with the upper-side end face 19c bent downward, the staple-refill 11 is pressed towards the bottom surface and the front surface of the refill accommodating portion 63. At that time, in the case where the second positioning projections 19 and 19 come into contact with the engaging portions 104a and 104a at one point of a first contact portion 19X, the pushing force as illustrated by the solid-line arrow in FIG. 50(A) acts. Also, in the case where the second positioning projections 19 and 19 come into contact with the engaging portions 104a and 104a at two points of the first contact portion 19X and a second contact portion 19Y, the pushing force as illustrated by the dotted-line arrow in FIG. 50(A) further acts. Moreover, as illustrated in FIG. 50(B), the second positioning projections 19 and 19 functioning as the pushed portion may protrude in an arc shape from the rear surface 12d of the casing 12, and the upper-side end face 19c facing the direction of the bottom surface 12e and the front surface 12a may be formed in a convex surface of an arc shape. In this instance, as the engaging portions 104a and 104a of the mounting levers 104 and 104 are engaged with the upper-side end face 19c bent in an arc shape, the staple-refill 11 is pressed towards the bottom surface and the front surface of the refill accommodating portion 63. Also, as illustrated in FIG. 50(C), the second positioning projections 19 and 19 functioning as the pushed portion may be formed of a stepped portion protruding from the rear surface 12d of the casing 12. The stepped portion of this case consists of a surface parallel to the front surface 12a of the casing 12 and a surface parallel to the bottom surface 12e. The bent portions of the engaging portions 104a and 104a of the mounting levers 104 and 104 are engaged with the stepped portion, so that the staple-refill 11 is pressed towards the bottom surface and the front surface of the refill accommodating portion 63. In this instance, in the case where the second positioning projections 19 and 19 come into contact with the engaging portions 104a and 104a at one point of the first contact portion 19X, the pushing force as illustrated by the solid-line arrow in FIG. 50(C) acts. Also, in the case where the second positioning projections 19 and 19 come into contact with the engaging portions 104a and 104a at two points of the first contact portion 19X and a second contact portion 19Y, the pushing force as illustrated by the dotted-line arrow in FIG. 50(C) further acts.

Figure 51A:
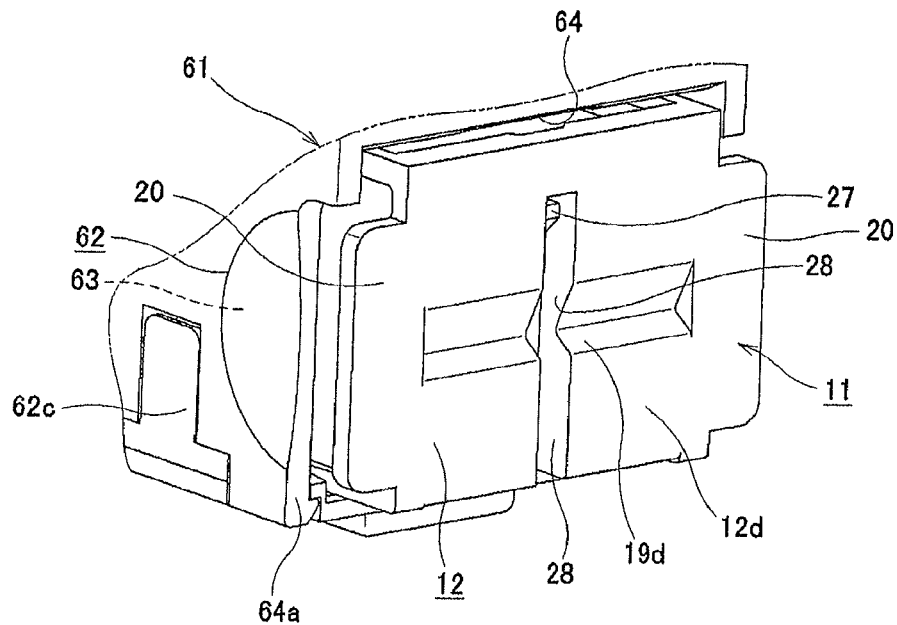
FIG. 51(A) is a perspective view illustrating the staple-refill in which the second positioning projection functioning as the pushed portion is configured by a concave portion, when seen from its rear side.
Figure 51B:
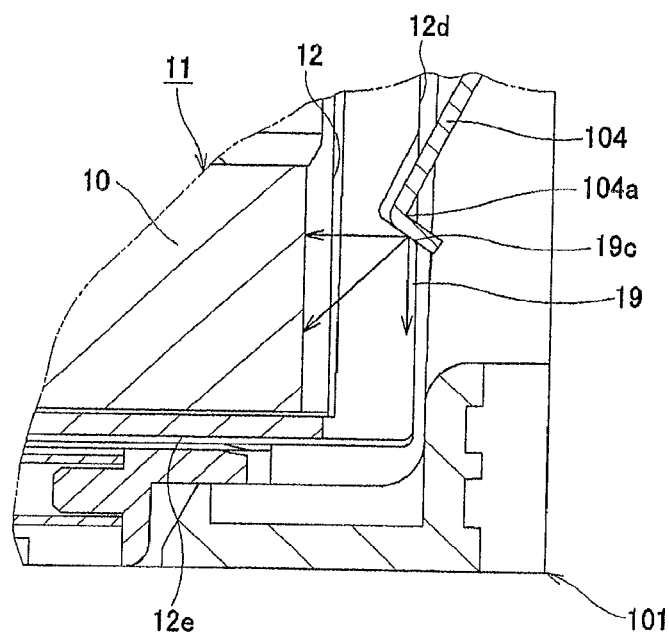
FIG. 51(B) is a cross-sectional view of major parts to illustrate a state in which the mounting lever of the magazine is engaged with the positioning concave portion.

In the above example, the rear surface 12d of the casing 12 is provided with the second positioning projections 19 and 19 protruding therefrom, but the second positioning projections 19 and 19 may be formed not in the projection, but in a concave portion. Specifically, as illustrated in FIGS. 51(A) and 51(B), the rear surface 12d of the casing 12 is provided with a positioning concave portion 19d functioning as the pushed portion. The positioning concave portion 19d is formed in the width direction to cross the guide hole 28 of the rear surface 12d of the casing 12, and the leading end portions of the mounting levers 104 and 104 are formed in a concave portion recessed in a triangular shape corresponding to the engaging pieces 104a and 104a which are bent at a substantially right angle. In this instance, as the engaging portions 104a and 104a of the mounting levers 104 and 104 are engaged with the positioning concave portion 19d, the staple-refill 11 is pressed towards the bottom surface and the front surface of the refill accommodating portion 63. Meanwhile, the concave shape of the positioning concave portion 19d is not limited to the triangular shape, but an arc shape or a stepped shape is preferable. Moreover, the number of the positioning concave portions 19d may be provided in plural, and, for example, the rear surface 12d may be provided with two positioning concave portions (for example, at positions corresponding to the positions of the second positioning projections 19 and 19), with the guide hole 28 being interposed therebetween.

<6. Description of Fundamental Operation Until Staple-Refill is Mounted in Cartridge>

To accommodate the stacked sheet-type connected staples 10 in the staple-refill 11, as illustrated in FIG. 13, the laminated sheet-type connected staples 10 are accommodated in the casing 12, in the state in which the casing is not attached by the cover member 15. After that, in the casing 12, one guide boss 22 of the cover member 15 is inserted into one horizontal guide portion 21b from the inside, and the other guide boss 22 is inserted into the other horizontal guide portion 21b, with sitting on the joint portion 21c. Also, by engaging the guide boss 27 to the guide hole 28, the cover member 15 is provided on the stacked sheet-type connected staple 10 accommodated in the staple accommodating portion 13. In this instance, the front surface 12a of the casing 12 is provided with the notch portion 18. Accordingly, in the casing 12, the staple inserting port 14 of one pair of opposite lateral surfaces 12b and 12c is bent in a direction to enlarge the width thereof, thereby easily inserting the sheet-type connected staples 10 or attaching the cover member 15.

As illustrated in FIGS. 10 and 12, the staple-refill 11 is configured to prevent the lowermost sheet-type connected staple 10 from falling off via the staple discharging port 16 at the position in which the boss portion 17c of the fall-out preventing piece 17 is overlapped with the staple discharging port 16. When the staple-refill 11 is mounted in the cartridge 61, the fall-out preventing piece 17 is pivoted around the hinge 17b, so that the boss portion 17c is retracted through the staple discharging port 16. In this way, the sheet-type connected staple 10 can be discharged through the staple discharging port 16.

Figure 42:
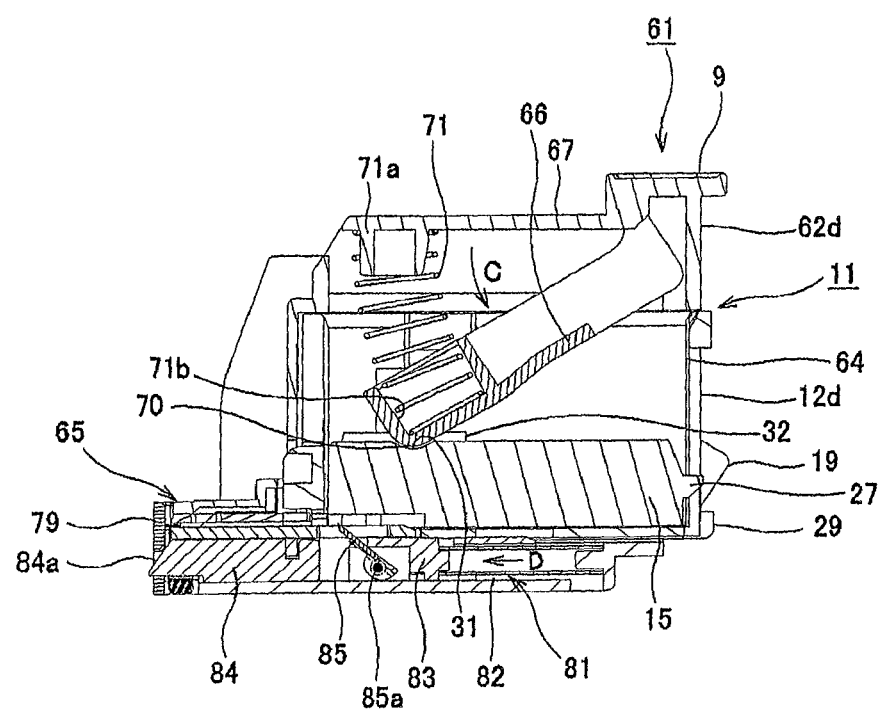
FIG. 42 is a cross-sectional view illustrating a state of the push lever, when the sheet-type connected staple of the staple-refill is completely consumed.

As described above, the staple-refill 11 loaded with the maximum amount of the sheet-type connected staples 10 is inserted into the refill accommodating portion 63 through the refill inserting port 64 of the cartridge 61, as illustrated in FIGS. 8 and 9, in the state in which the front surface 12a functions as the insertion surface. Then, as illustrated in FIGS. 29 and 30, the push lever 66 pivotally biased in the direction of the arrow C in FIG. 30 enters through the notch portion 18 of the front surface 12a of the casing 12, of which the pushing portion 70 of the leading end portion is the insertion surface, and sits on the cover member 15. The pushing portion 70 of the push lever 66 which comes into contact with the cover member 15 is guided by the guide walls 32 and 32, and, if the sheet-type connected staples 10 are decreased, as illustrated in FIG. 42, is engaged with the engaging portion 31 of the concave shape. In this way, the push lever 66 reliably pushes the sheet-type connected staples 10 stacked in the staple accommodating portion 13 via the cover member 15. Further, the staple-refill 11 is prevented from falling off from the refill accommodating portion 63 by engagement of the pushing portion, which comes into contact with the cover member 15, with the engaging portion 31 of the concave shape.

Figure 35:
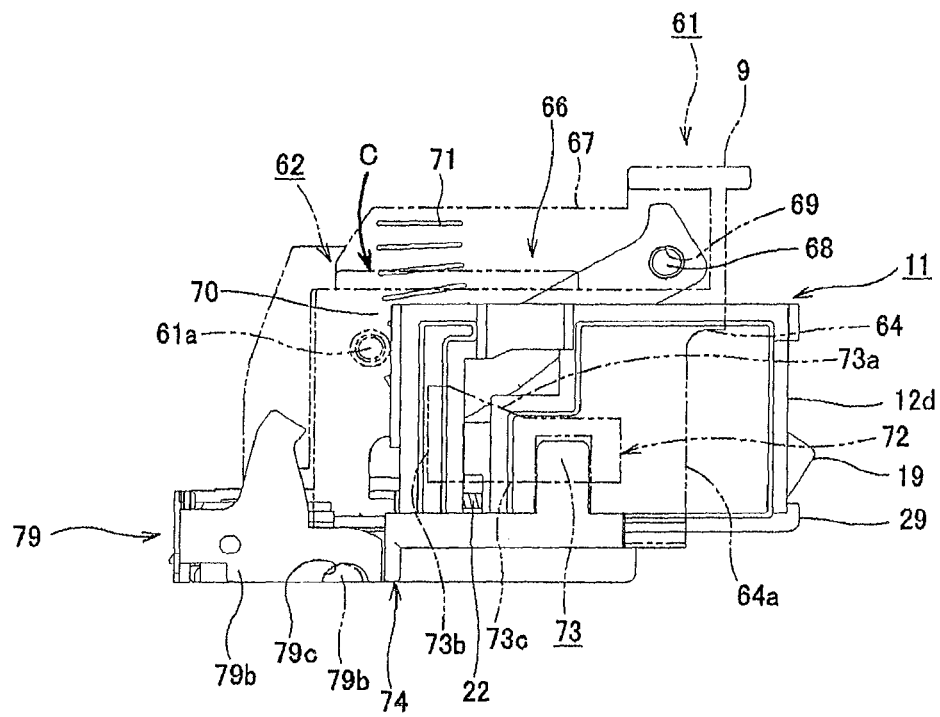
FIG. 35 is a side view illustrating a positional relationship between an engaging portion of the cartridge and the guide boss of the cover member, when the sheet-type connected staple of the staple-refill is completely consumed.
Figure 36:
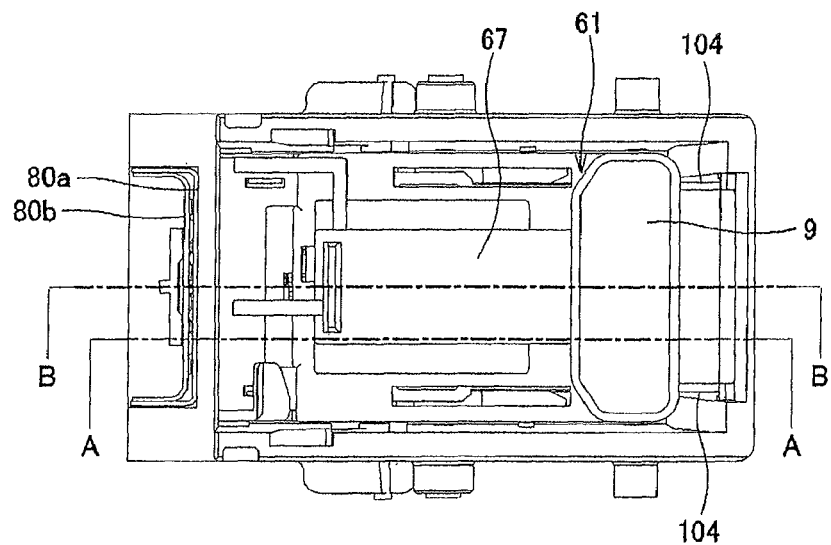
FIG. 36 is a plan view of the cartridge received with the staple-refill.

When the staple-refill 11 is accommodated in the refill accommodating portion 63 of the cartridge 61, as illustrated in FIGS. 33 to 35, the guide bosses 22 and 22 of the cover member 15 are engaged with the pick-up portions 73a and 73a. As the staple-refill 11 is accommodated in the refill accommodating portion 63, the guide bosses 22 and 22 of the cover member 15 pushed by the push lever 66 in the direction of the arrow C in FIG. 33 are lifted by the inclined surface of the pick-up portions 73a and 73a. If the staple-refill 11 is completely accommodated in the refill accommodating portion 63, as illustrated in FIG. 34, the guide bosses 22 and 22 reach the separation restricting portions 73b and 73b. In this instance, the cover member 15 is slightly moved down by the push lever 66 which is resiliently biased in the direction of the arrow C in FIG. 34, and then is pushed against the uppermost layer of the sheet-type connected staples 10 to generate the click feeling, so that it can notify the user of that the staple-refill 11 is reliably mounted in the cartridge 61.

In use, the guide bosses 22 and 22 move gradually the separation restricting portions 73b and 73b as the sheet-type connected staples 10 are decreased. If the sheet-type connected staples 10 of the staple-refill 11 are completely consumed, the boss portions 23, 23, 23 and 23 formed on the rear surface of the cover member 15 are engaged with the escape portions 24, 24, 24 and 24 formed at four corners of the bottom surface 12e of the casing 12. The height position of the guide bosses 22 and 22 is placed below the disengaging portions 73c and 73c. In this way, the guide bosses 22 and 22 pass below the disengaging portions 73c and 73c, so that the staple-refill 11 can be separated from the refill accommodating portion 63.

When the staple-refill is pulled out from the refill accommodating portion 63, the push portion 70 which is in contact with the cover member 15 is guided by the guide walls 32 and 32, and the push lever 66 is released from the staple-refill 11 via the notch portion 18. Also, the staple-refill 11 can be easily pulled out from the cartridge 61 by gripping the handle portions 20 and 20 with the finger or the like. Since the release of the push lever 66 is automatically performed during pull-out operation of the staple-refill 11, the releasing operation of the push lever 66 or the like is not necessary, thereby achieving the improvement in operability.

When the staple-refill 11 is mounted in the cartridge 61, as illustrated in FIGS. 39 and 40, the positioning convex portion 89 of the staple guide plate 75b is fitted into the positioning concave portion 26 formed on the bottom surface 12e of the casing 12. The positioning mechanism 88 of the staple-refill 11 configured as described above performs the positioning of the sheet-type connected staples 10 in the width direction of the staple-refill, that is, the positioning convex portion 89 performs the positioning of the sheet-type connected staples 10 in a direction perpendicular to the transfer direction.

As described above, the cartridge 61 incorporated with the staple-refill 11 is inserted and mounted in the magazine 101 at the side of the stapling-machine main-body, in which the front surface 62e formed with the striking section 65 functions as the insertion surface. As illustrated in FIGS. 36 to 38 and 41, the mounting levers 104 and 104 of the magazine 101 push down the second positioning projections 19 and 19 of the triangular shape from the upper side to press the cartridge 61 towards the bottom surface and the front surface of the magazine 101 via the staple-refill 11. Also, the staple-refill 11 mounted in the cartridge 61 is pushed by the pushed portions 29 and 29 of the rear surface 12d of the staple-refill which faces outward from the rear surface 62d of the cartridge 61 by the pushing portions 102 and 102 of the magazine 101.

And then, as illustrated in FIGS. 37, 38 and 41, both lateral portions 16a and 16a of the staple discharging port 16 of the casing 12 abut against both first abutting portions 91 and 91 of the staple guide section 75 which is fixed to the cartridge body 62 and the base plate member 74, and then are in close contact with the first abutting portions. Also, the second abutting portions 92 and 92 of the face portion 79a of the faceplate 79 of the staple guide section 75 abut against the inner surface of the face portion 79a of the faceplate 79, and the outer surface of the face portion 79a which is opposite to the inner surface abutting against the second abutting portions 92 and 92 abuts against the mounting reference portions 103 and 103 of the magazine 101. Accordingly, in the magazine 101, the staple-refill 11 abuts against the mounting reference portions 103 and 103 via the staple guide section 75 and the faceplate 79, so that the staple-refill is accurately positioned. Also, since the casing 12 is in close contact with the staple guide section 75, so that the staple guide section 75 is brought into contact with the faceplate 79 to stably maintain the dimension of the gap through which the staple passes.

As illustrated in FIGS. 37 and 38, the sheet-type connected staple 10 is sent to the passage corresponding to the thickness and the width of the sheet-type connected staple 10 between the staple guide cover 75a and the staple guide plate 75b which configure the striking section 65, through the staple discharge port 16. In order to staple the paper to be bound, the forming plate 80a first enters between the faceplate 79 and the staple guide plate 75b from the upper side of the striking section 65, and then forms the straight staple, which is positioned at the leading end portion of the lowermost sheet-type connected staples 10 in the staple accommodating portion 13 of the staple-refill 11, in the U-shape by the anvil 76. And then, the driver plate 80*b* enters between faceplate 79 and the staple guide plate 75*b* from the upper side of the striking section 65 to strike the staple 10*a* bent in the U-shape in the direction of the arrow X in FIG. 38.

If the staple is struck, only one lowermost sheet-type connected staple 10 in the staple-refill 11 is sent. Specifically, in the transfer mechanism 81, the inclined portion 84*a* of the transfer plate 84 is pressed by the driver plate 80*b* entering the gap between the face portion 79*a* of the faceplate 79 and the pusher 77. Then, the guide member 83 is moved in the direction opposite to the direction of the arrow E in FIG. 38, with being against the biasing force of the coil spring 87. In this way, the transfer claw 85 of the guide member 83 moves one straight staple of the lowermost sheet-type connected staple 10 in the staple-refill 11 in the direction opposite to the direction of the arrow E, and then is engaged with a next fine concave portion from the fine concave portion between the straight staples engaged until now. After that, the guide member 83 is returned to its original position by the biasing force of the coil spring 87, that is, is moved in the direction of the arrow E in FIG. 38. In this instance, the transfer claw 85 of the guide member 83 sends out one straight staple 1 toward the striking section 65.

In the magazine 101, the staple-refill 11 abuts against the mounting reference portions 103 and 103 via the staple guide section 75 and the faceplate 79 to perform the positioning thereof. In this way, the positioning of the staple-refill 11 to the mounting reference portions 103 and 103 can improve the accuracy in transfer of the sheet-type connected staple 10 to the striking section 65 by the fact that the members effecting to the function of transferring the sheet-type connected staple 10 to the striking section 65 are the minimum necessary members, such as the staple-refill 11, the staple guide section 75, the faceplate 79 and the mounting reference portions 103 and 103. As a result, it is possible to shorten the stroke of the guide member 83 or the transfer plate 84 of the transfer mechanism 81, thereby achieving the miniaturization of the cartridge 61.

<7. Description of Modification of Staple-Refill (FIGS. 54 to 63)>

<7-1. Description of Modification of Notch Portion of Casing>

Figure 54A:
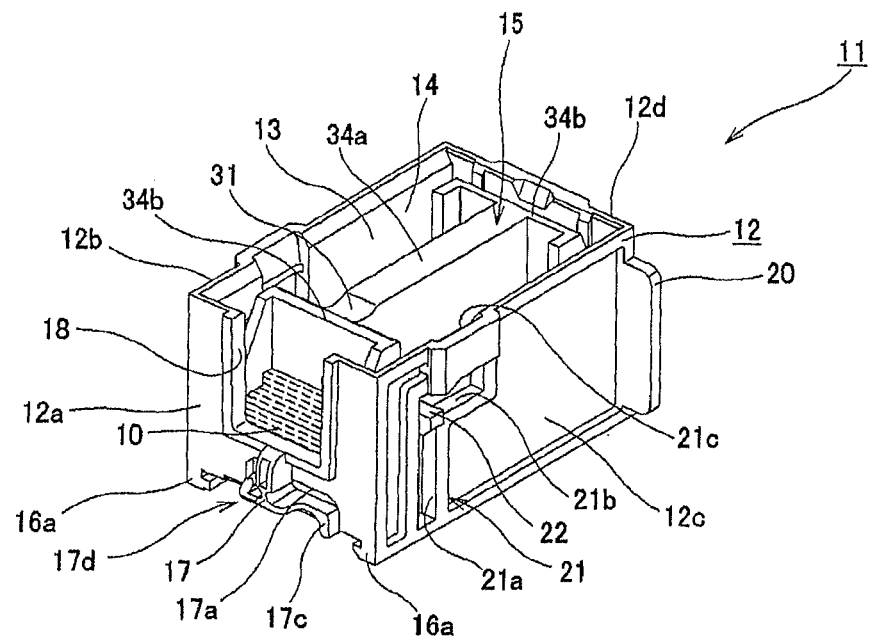
Figure 54B:
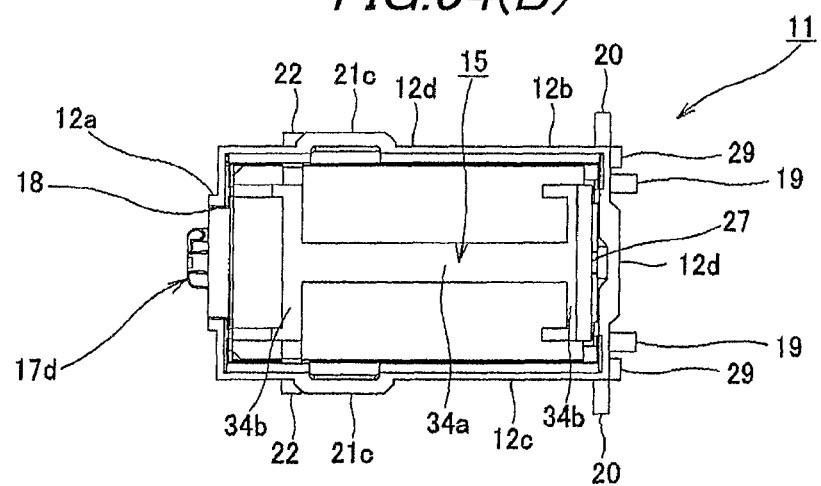

The above-described staple-refill 11 may be configured as follows, like FIG. 54. In the example in FIG. 54, the cover member 15 is not formed in the substantially rectangular shape, but is formed is a substantially H-shape when seen from its front side. The cover member 15 has a vertical portion 34*a* extending in the longitudinal direction at the substantially center of the staple inserting port 12 in the width direction thereof, and horizontal portions 34*b* and 34*b* extending in the width direction of the staple inserting port 12, as illustrated in FIGS. 54(A) and 54(B). The horizontal portion 34*b* positioned at the side of the front surface 12*a* of the casing 12 is provided at its both ends with the guide bosses 22 and 22 which are engaged with the guide holes 21 and 21 of the lateral surfaces 12*b* and 12*c*. Also, the horizontal portion 34*b* positioned at the side of the rear surface 12*d* of the casing 12 is provided at its center portion with the guide boss 27 which is engaged with the guide hole 28 of the rear surface 12*d*, like the casing 12, as illustrated in FIG. 13. Moreover, although not illustrated, each distal portion of the horizontal portions 34*b* and 34*b* is provided with the boss portions 23, 23, 23 and 23 which are engaged with the escape portions 24, 24, 24 and 24 formed on the bottom surface 12*e* of the casing 12. As described above, the cover member 15 illustrated in FIG. 54 is miniaturized, relative to the substantially rectangular cover member 15, and can press uniformly the overall uppermost layer of the sheet-type connected staples 10 accommodated in the staple accommodating portion 13 of the casing 12.

Figure 55A:
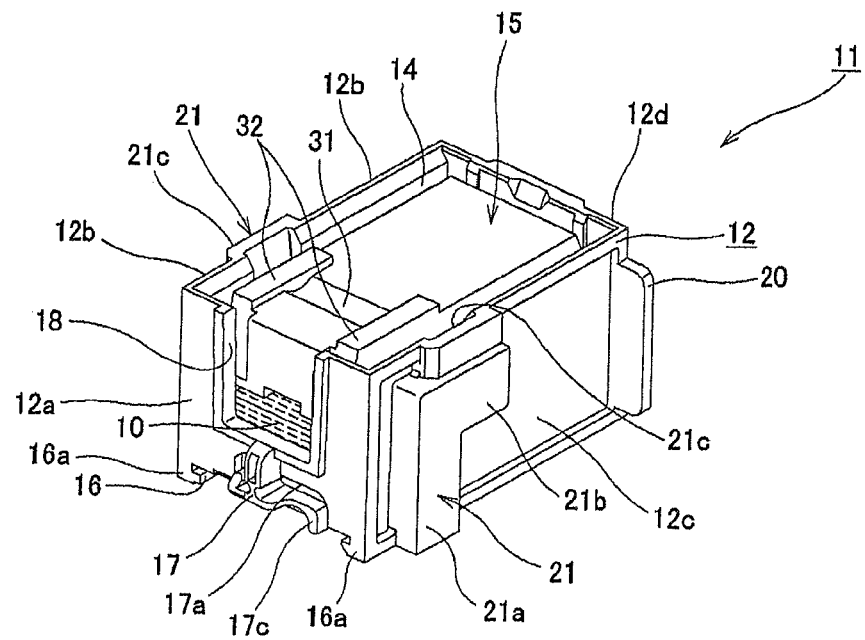
Figure 55B:
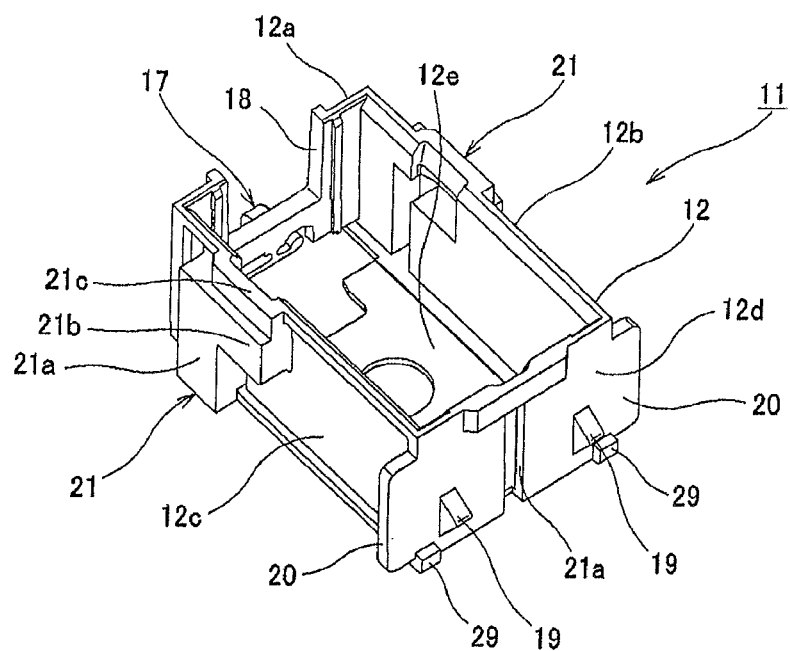

As illustrated in FIGS. 55(A) and 55(B), in the staple-refill 11, the opposite lateral surfaces 12*b* and 12*c* of the casing may be provided with a groove having a bottom at the portion corresponding to the guide holes 21 and 21, instead of being provided with the through-hole.

Figure 56A:
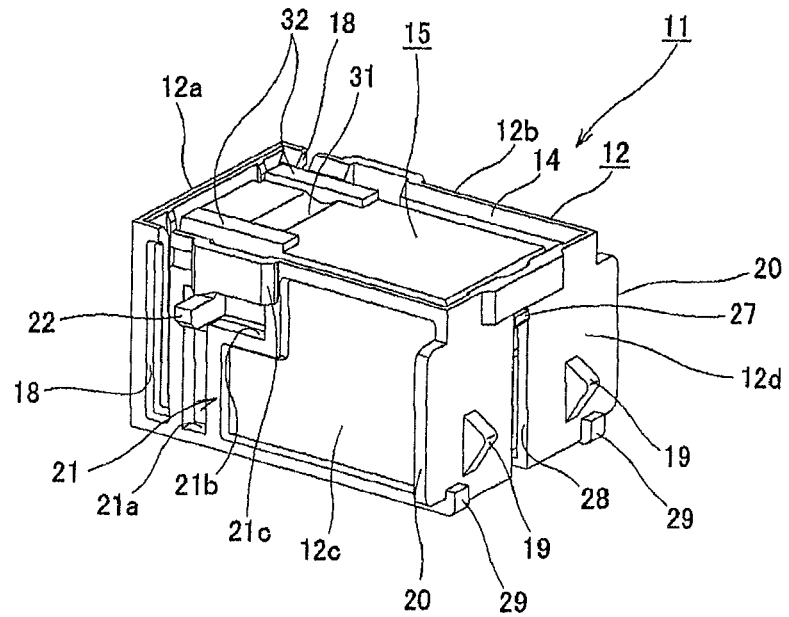
Figure 56B:
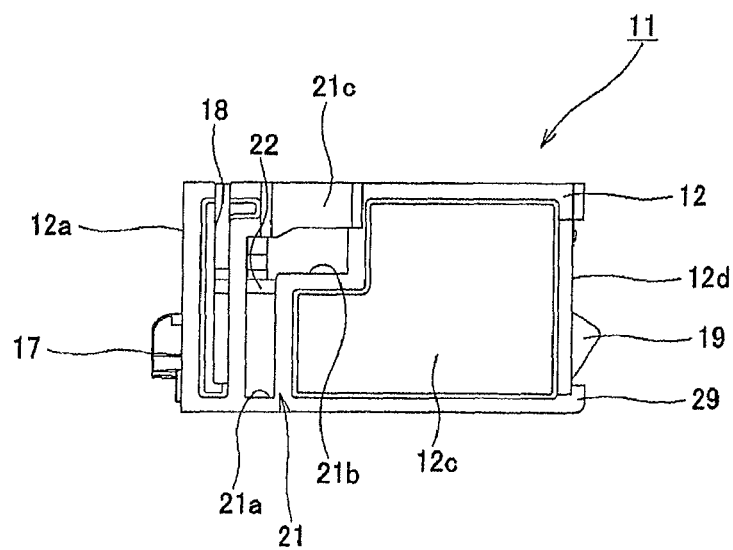

As illustrated in FIGS. 56(A) and 56(B), the notch portion 18 of the staple-refill 11 is not formed on the front surface 12*a* of the casing 12, as illustrated in FIG. 10, but may be formed on the lateral surfaces 12*b* and 12*c* in the shape of a slit along the insertion direction of the sheet-type connected staple 10, that is, parallel to the vertical guide portion 21*a* of the guide hole 21 which guides the cover member 15. Herein, the notches 18 and 18 are formed on the lateral surfaces 12*b* and 12*c* at the side of the front surfaces 12*a*, but may be formed at the side of the rear surface 12*d*. The notches 18 and 18 also open the end portion of the staple inserting port 14. In this way, the staple-refill 11 illustrated in FIG. 56 can be bent in a direction spaced apart from the front surface 12*a* and the rear surface 12*d* of the casing 12, and the opposite lateral surfaces 12*b* and 12*c* can be bent outward at the side of the rear surface 12*d* rather than the notch portions 18 and 18. Accordingly, in the staple-refill 11 illustrated in FIG. 56, the staple inserting port 14 can be enlarged, thereby easily performing the inserting operation of the sheet-type connected staple 10 or the attaching operation of the cover member 15. Also, in order to bend the lateral surfaces 12*b* and 12*c*, it is not necessary to reduce the thickness of the lateral surfaces 12*b* and 12*c*, thereby preventing deterioration in moldability of components. Meanwhile, it is preferable that the notch portion 18 parallel to the vertical guide portion 21*a* of the guide hole 21 is formed on at least any one of the lateral surfaces 12*b* and 12*c*.

Figure 57:
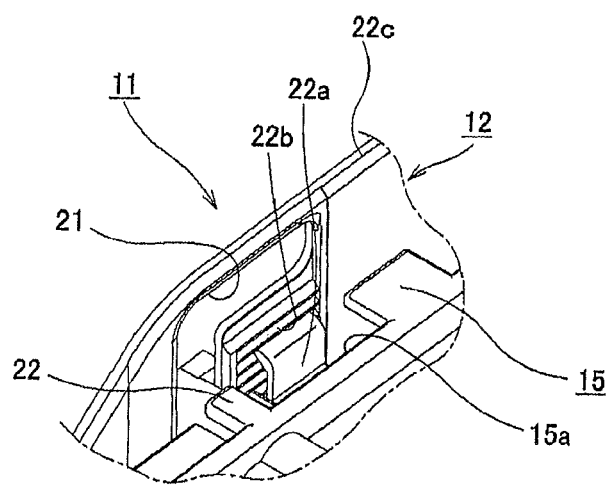
FIG. 57 is an enlarged perspective view of major parts to illustrate the staple-refill including the cover member provided with a check claw, in which an inner surface of the staple-refill is provided with a check groove to be locked with the check claw.

As illustrated in FIG. 57, the staple-refill 11 may be provided with a check claw 22*a* and a check groove 22*b*. Specifically, the opposite lateral end faces 15*a* and 15*a* of the cover member 15 are provided with the check claws 22*a* and 22*a*. In contrast, in the staple-refill 11, the inner surfaces of the lateral surfaces 12*b* and 12*c* of the casing 12 are provided with the check claws 22*b* and 22*b*, which are locked to the check claws 22*a* and 22*a*, along the insertion direction of the sheet-type connected staple 10. Therefore, it is possible to prevent the cover member from falling from the casing 12 when the staple-refill 11 is replaced or the like.

Figure 58A:
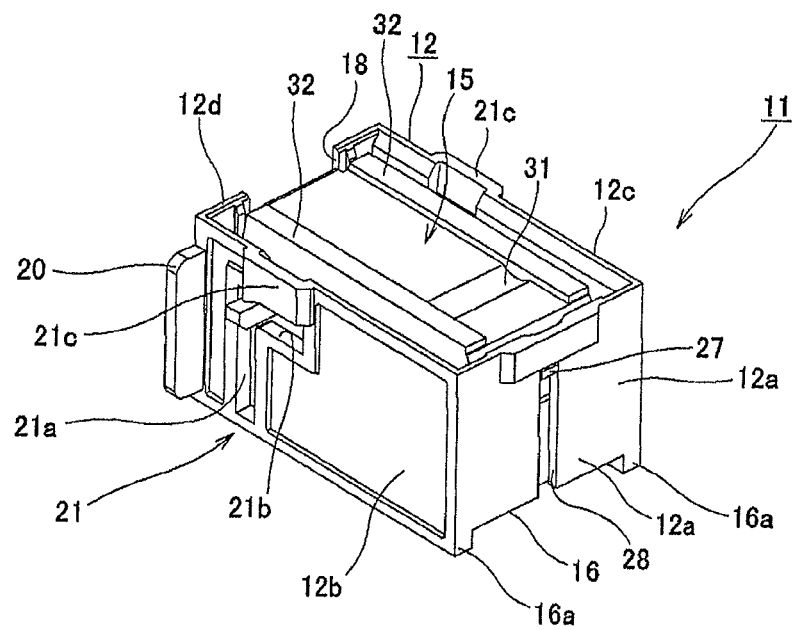
Figure 58B:
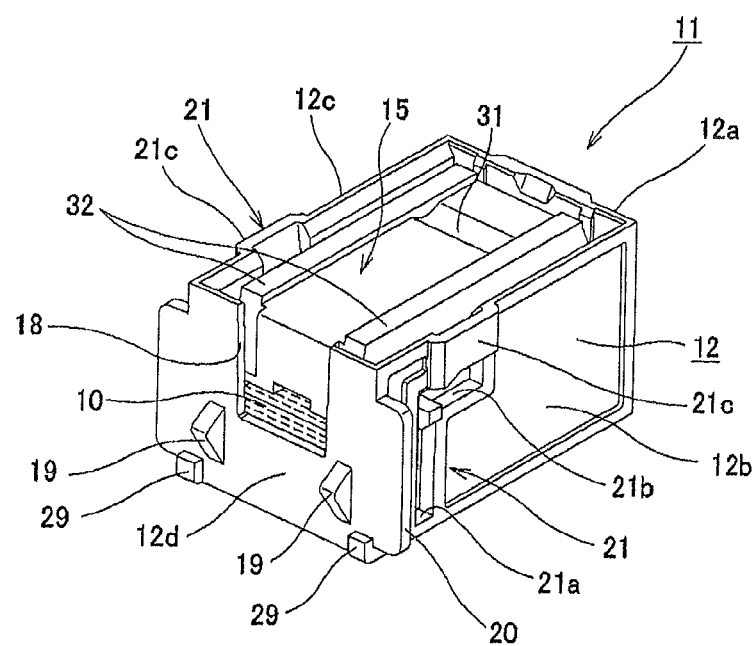

As illustrated in FIGS. 58(A) and 58(B), in the staple-refill 11, even though the guide holes 21 and 21 formed in the opposite lateral surfaces 12*b* and 12*c* of the casing 12 are not provided on the front surface 12*a* of the casing 12, but is provided on the rear surface 12*d*, the same working effect as the case where it is formed on the front surface 12*a* can be obtained. Also, even though the notch portion 18 is not formed on the front surface 12*a* of the casing 12, but is formed on the rear surface 12*d*, the same working effect as the case where it is formed on the front surface 12*a* can be obtained. In this example, since the rear surface 12*d* is provided with the notch portion 18, the guide hole 28 is formed on the front surface 12*a*, and the guide boss 27 of the cover member 15 which is engaged with the guide hole 28 is also formed on the front-side end face.

Figure 59A:
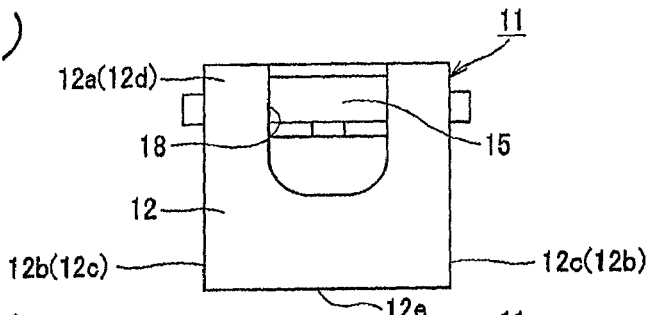
FIGS. 59(A) to 59(E) are a front or rear view illustrating a modification of the notch portion which is formed in the front or rear surface of the casing.
Figure 59B:
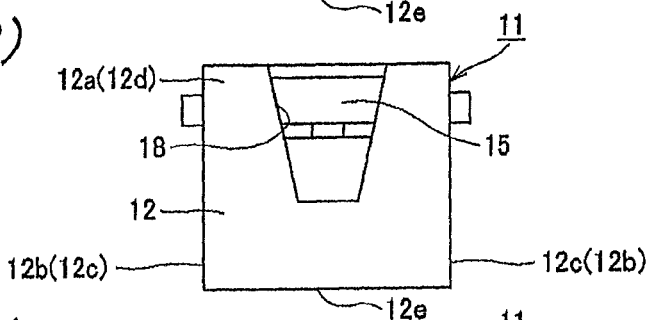
Figure 59C:
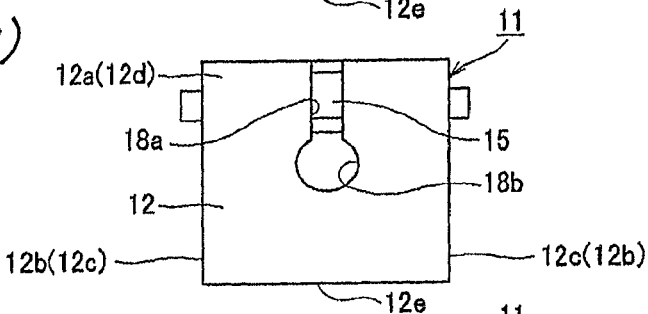
Figure 59D:
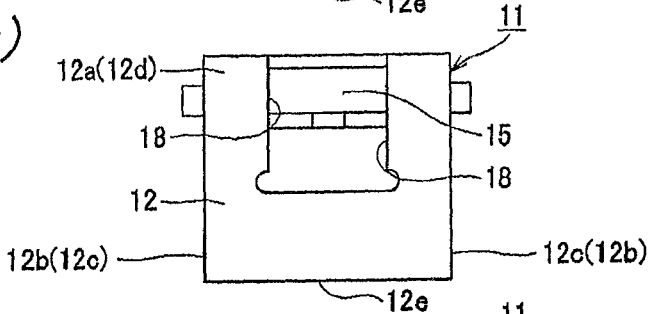
Figure 59E:
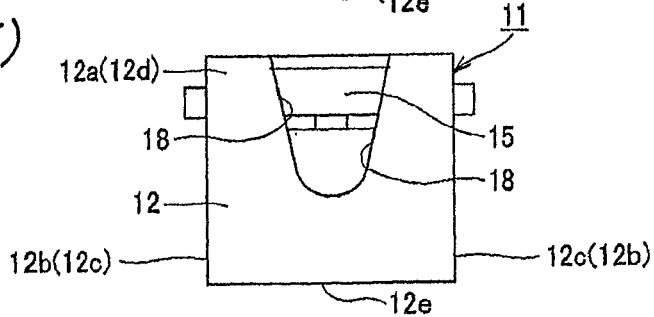

The notch portion 18 may be formed on the front surface 12*a* of the casing 12, as illustrated in FIG. 10 or the like, and may be formed on the rear surface 12*d* of the casing 12, as illustrated in FIG. 58. The notch portion 18 formed on the front surface 12*a* or the rear surface 12*d* of the casing 12 may be formed in the substantially rectangular shape, as illustrated in FIGS. 10, 58 or the like. Otherwise, as illustrated in FIG. 59(A), the notch portion 18 may be generally formed in the substantially rectangular shape, but both corners thereof at the side of the bottom surface 12*e* may be formed in an arc shape. As illustrated in FIG. 59(B), the notch portion 18 may be formed in a reverse trapezoidal shape of which a width of the sides at the bottom surface 12*e* is narrow. In this instance, when the push lever 66 passes, in particular, the push lever enters above the cover member 15, both inclined lateral edges function as a guide portion of the push lever 66. Also, as illustrated in FIG. 59(C), the notch portion 18 may have a slit 18*a* of a height direction formed at the substantial center of the front surface 12*a* or the rear surface 12*d* in the width direction thereof, and a circular portion 18*b* formed at the side of the leading end portion of the bottom surface 12*e*. Also, as illustrated in FIG. 59(D), the notch portion 18 may be generally formed in the substantially rectangular shape, but the portion at the side of the bottom surface 12*e* may be formed to have the wide width. Moreover, as illustrated in FIG. 59(E), the notch portion 18 may be formed to have an arc-shaped end portion at the side of the bottom surface 12*e*. In this way, even though the notch portion 18 is formed in the same shape as that in FIGS. 59(A) to 59(E), the opposite lateral sides 12*b* and 12*c* at the side of the staple inserting port 14 can be bent outward, thereby easily performing the inserting operation of the sheet-type connected staple 10 or the attaching operation of the cover member 15. Also, in order to bend the lateral surfaces 12*b* and 12*c*, it is not necessary to reduce the thickness of the lateral surfaces 12*b* and 12*c*, thereby preventing deterioration in moldability of components.

Figure 52:
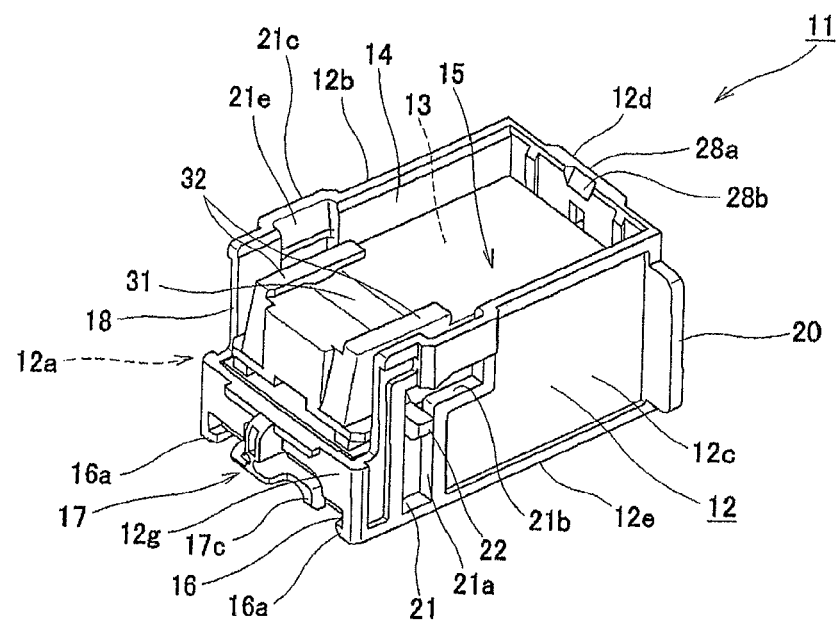
FIG. 52 is a perspective view illustrating a modification of the staple-refill which is notched from the front side to a lateral side of the casing, when seen from its front side, in a state in which the maximum amount of sheet-type connected staples are loaded.
Figure 53:
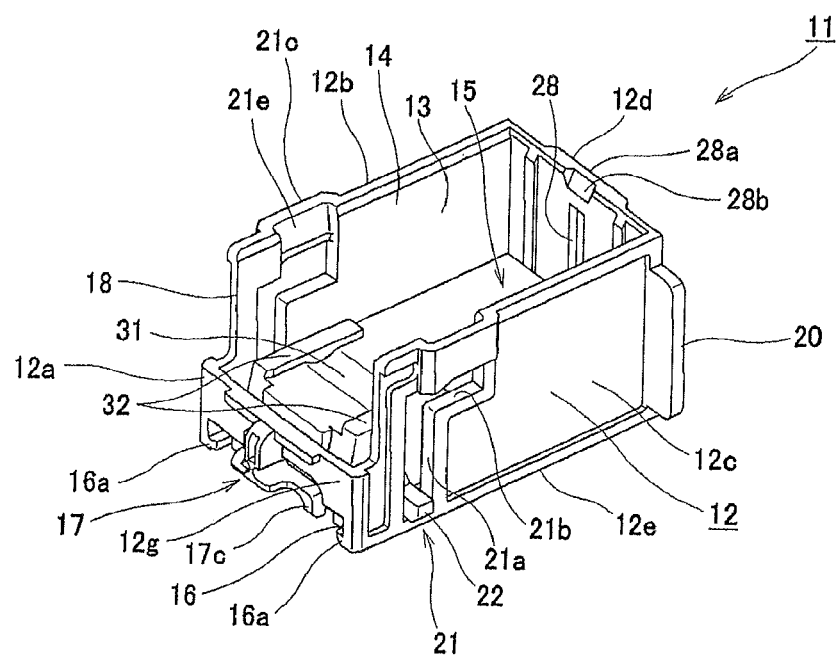
FIG. 53 is a perspective view illustrating a modification of the staple-refill which is notched from the front side to a lateral side of the casing, when seen from its front side, in a state in which the sheet-type connected staples are empty.

Meanwhile, the staple-refill may be configured as illustrated in FIGS. 52 and 53.

The staple-refill 11 illustrated in FIGS. 52 and 53 is configured so that the casing 12 at the side of the front surface 12*a* is notched from the front surface 12*a* to the lateral surfaces 12*b* and 12*c* at the side of the front surface 12*a*. Also, the staple-refill 11 is configured so that the fall-out preventing piece 17 is left immediately above the staple discharge port 16 at the front surface 12*a* of the casing 12. In this notch, the portion in which the front surface 12*a* of the casing 12 is largely notched functions as the notch portion 18. Also, the height of a front wall 12*g* configuring the front surface 12*a* of the casing which is provided with the fall-out preventing piece 17 is substantially equal to or higher than the uppermost layer of the stacked sheet-type connected staples 10, in the state the maximum amount of the sheet-type connected staples 10 is loaded, so that the sheet-type connected staples 10 accommodated in the staple accommodating portion 13 are prevented from falling from the notch portion 18.

<7-2. Description of Positioning when Staple-Refill is Mounted in Mounting Object Such as Package>

Figure 60:
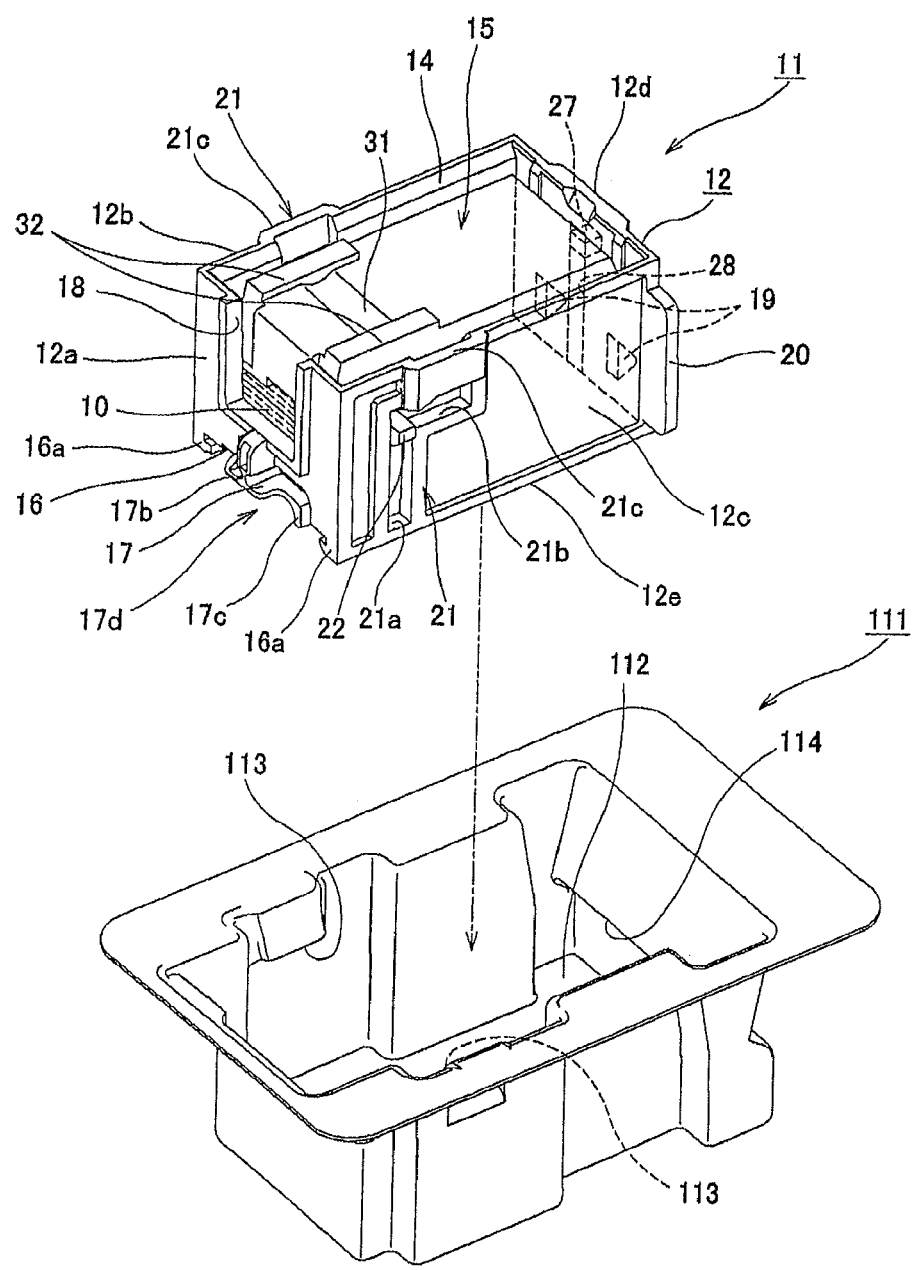
FIG. 60 is a perspective view illustrating a state in which the staple-refill is mounted in a mounting object, such as a package, by use of a guide boss protruding from the lateral end face opposite to the cover member as the positioning projection, and a projection protruding in a triangular shape from the rear surface of the casing as the positioning projection.

As illustrated in FIG. 60, in the staple-refill 11, the guide bosses 22 and 22 of the cover member 15 can be used as the positioning projection when the fill is mounted in the mounting object 111 such as a package. Specifically, the mounting object 111 includes a receiving portion 112 of a concave portion for receiving the staple-refill 11, and lateral positioning concave portions 113 and 113 formed by stepped portions at positions opposite to the guide bosses 22 and 22 protruding more than the lateral surfaces 12*b* and 12*c* of the casing. When the staple-refill 11 is transferring, the staple-refill is before use and is in the state in which the maximum amount of the sheet-type connected staples 10 are loaded therein. The guide bosses 22 and 22 are positioned above the vertical guide portions 21*a* and 21*a* of the guide holes 21 and 21. The lateral positioning concave portions 113 and 113 are formed by the stepped portions protruding inward at the positions corresponding to the positions of the guide bosses 22 and 22 in the state in which the maximum amount of the sheet-type connected staples 10 are loaded in the staple-refill 11. Also, the receiving portion 112 of the mounting object 111 is provided with the rear-surface positioning concave portions 114, which are engaged with the pair of second positioning projections 19 and 19 protruding in a triangular shape from the rear surface 12*d* of the casing 12, formed by a stepped portion at the lower side of the rear surface of the receiving portion 112.

Figure 61A:
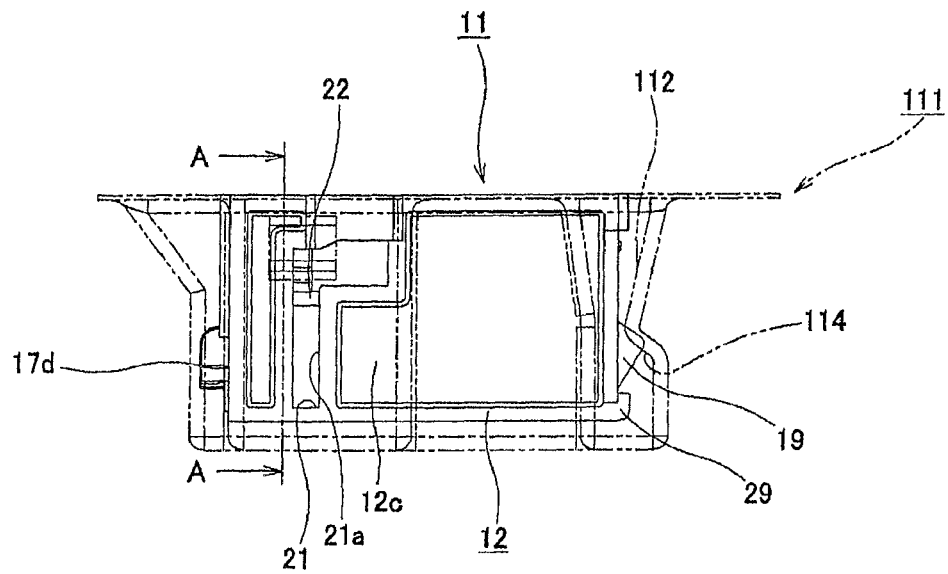
Figure 61B:
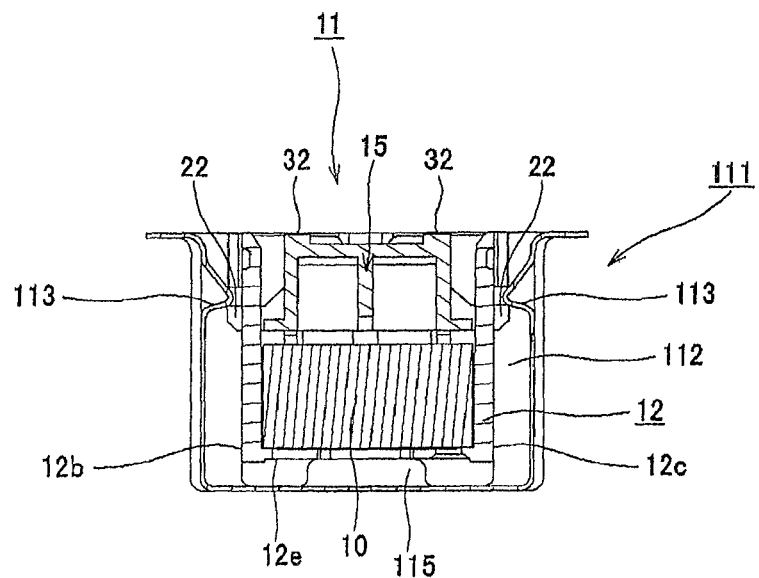

In general, since the package which is the mounting object 111 is a molded product of plastic or pulp, or a cardboard or foamed resin box, it is likely to be deformed. As illustrated in FIGS. 61(A) and 61(B), the staple-refill 11 is inserted in the receiving portion 112 of the mounting object 111, in the state in which the bottom surface 12*e* of the casing 12 functions as the insertion surface. If the staple-refill is received in the receiving portion 112, the guide bosses 22 and 22 at the side of the staple-refill 11 are engaged with the lateral positioning concave portions 113 and 113 beyond the stepped portion protruding inward from the receiving portion 112. Moreover, the second positioning projections 19 and 19 are engaged with the rear-surface positioning concave portions 114 beyond the stepped portion protruding inward from the receiving portion 112. In this way, as the staple-refill 11 is positioned in the receiving portion 112, the staple-refill 11 is received in the mounting object 111 in a state in which fall is further prevented. The received staple-refill 11 is supported from the lower side by one or plural bottom-surface support portions 115 protruding from the bottom surface of the receiving portion 122, as illustrated in FIG. 61(B), and the guide bosses 22 and 22 and the second positioning projections 19 and 19 are reliably engaged with the positioning concave portions 113 and 114 by the resilience of the bottom surface support portion 115.

Figure 62:
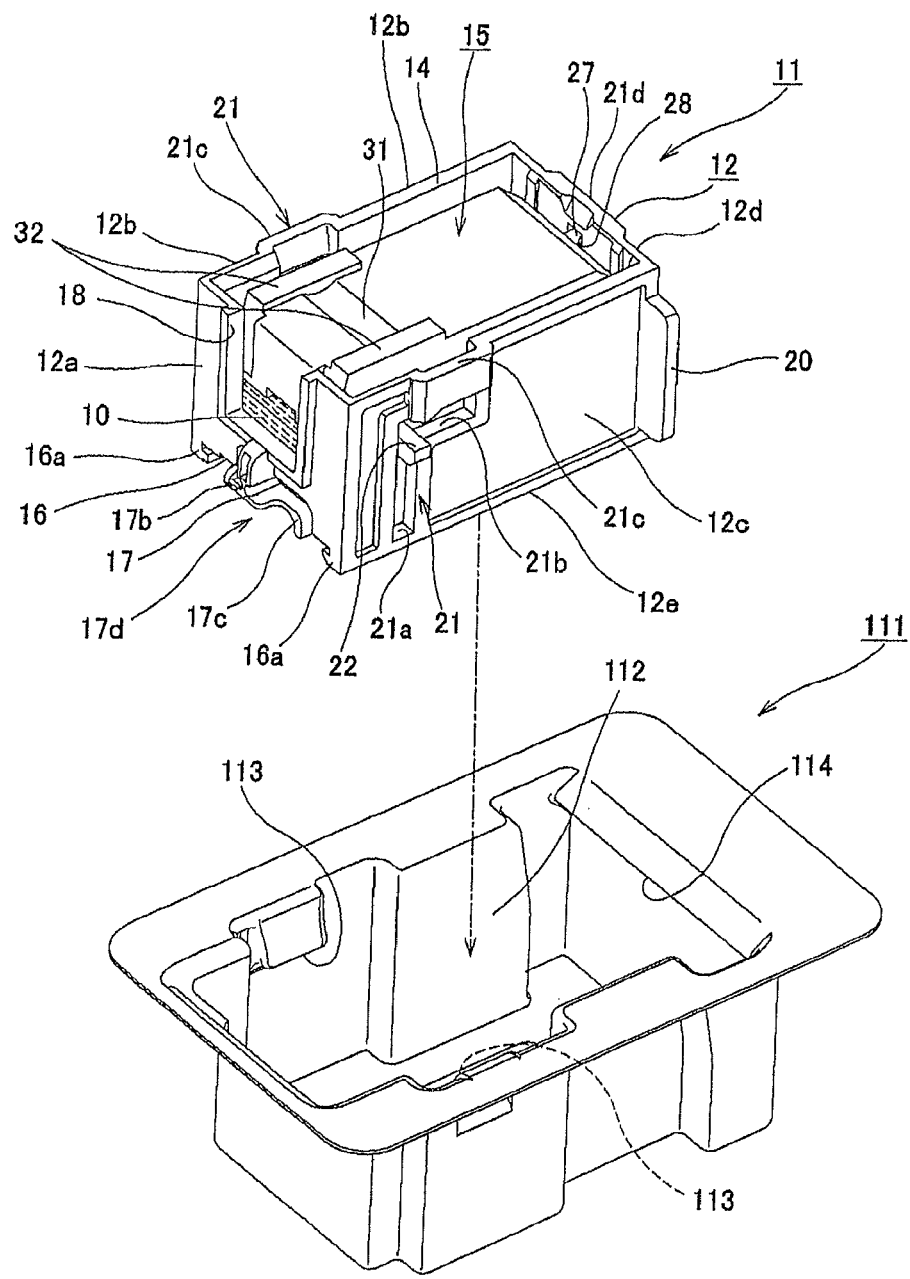
FIG. 62 is a perspective view illustrating a state in which the staple-refill is mounted in the mounting object, such as the package, by use of the guide boss protruding from the opposite lateral end face and the rear end face opposite of the cover member as the positioning projection.
Figure 63A:
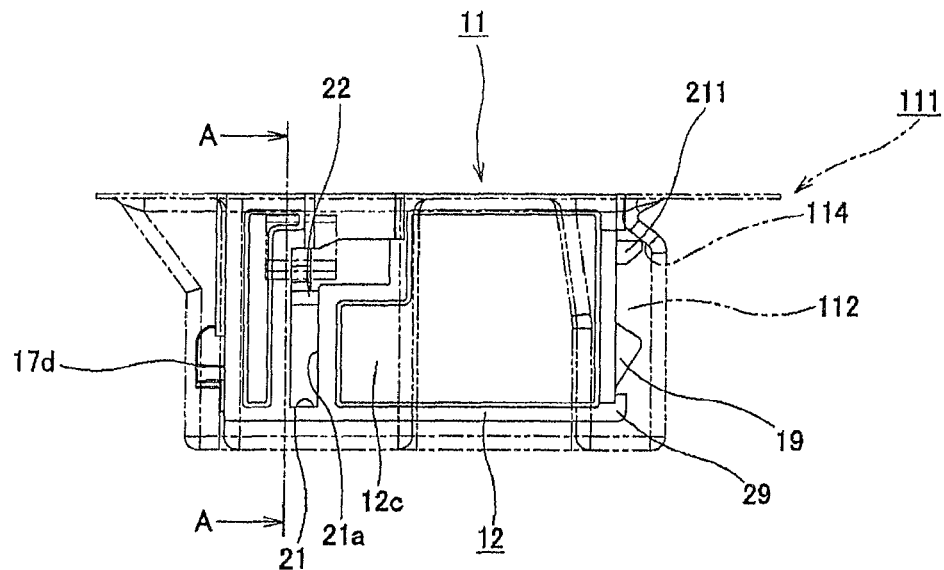

In the example illustrated in FIGS. 60 and 61, the rear-surface positioning concave portions 114 formed on the receiving portion 112 of the mounting object 111 are engaged with the pair of second positioning projections 19 and 19 protruding in the triangular shape from the rear surface 12*d* of the casing 12, but, alternatively, the positioning of the rear surface may be performed by using the guide boss 27 of the rear-side end face 15*b* of the cover member 15 protruding more than the rear surface 12*d* of the casing 12. That is, as illustrated in FIGS. 62, 63(A) and 64(B), the receiving portion 112 of the mounting object 111 is provided with the rear-surface positioning concave portion 114 at the position opposite to the guide boss 27, which protrudes more than the rear surface 12*d* of the casing, by the stepped portion. The stepped portion of the rear-surface positioning concave portion 114 protrudes inward at the position corresponding to the position of the guide boss 27 when the maximum amount of the sheet-type connected staples 10 are loaded in the staple-refill 11.

Figure 63B:
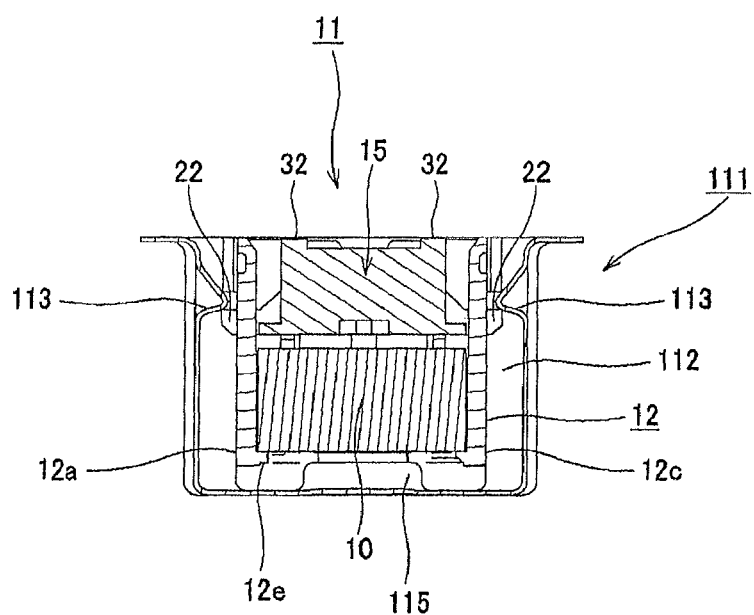

The staple-refill 11 is inserted in the receiving portion 112 of the mounting object 111, in the state in which the bottom surface 12*e* of the casing 12 functions as the insertion surface. If the staple-refill is received in the receiving portion 112, the guide bosses 22 and 22 at the side of the staple-refill 11 are engaged with the lateral positioning concave portions 113 and 113 beyond the stepped portion protruding inward from the receiving portion 112, and the guide boss 27 is engaged with the rear-surface positioning concave portions 114 beyond the stepped portion protruding inward from the receiving portion 112. In this way, as the staple-refill 11 is positioned in the receiving portion 112, the staple-refill 11 is received in the mounting object 111 in a state in which fall is further prevented. The received staple-refill 11 is supported from the lower side by one or plural bottom-surface support portions 115 protruding from the bottom surface of the receiving portion 122, as illustrated in FIG. 63(B), and the guide bosses 22 and 22 and the guide boss 27 are reliably engaged with the positioning concave portions 113 and 114 by the resilience of the bottom surface support portion 115.

The examples in FIGS. 60 to 63 have been described in the case where the mounting object 111 is the package, the concept of the positioning concave portions 113 and 114 may be applied to the cartridge 61 or the magazine 101 in which the cartridge 61 is mounted. Also, in the case where the mounting object 111 is the package, the bottom surface of the mounting object 111 may be provided with a cushion material such as an elastic body to absorb vibration at the transfer and thereby to protect the staple-refill 11.

<8. Description of Mounting Object (FIGS. 64 to 68)>

Figure 64:
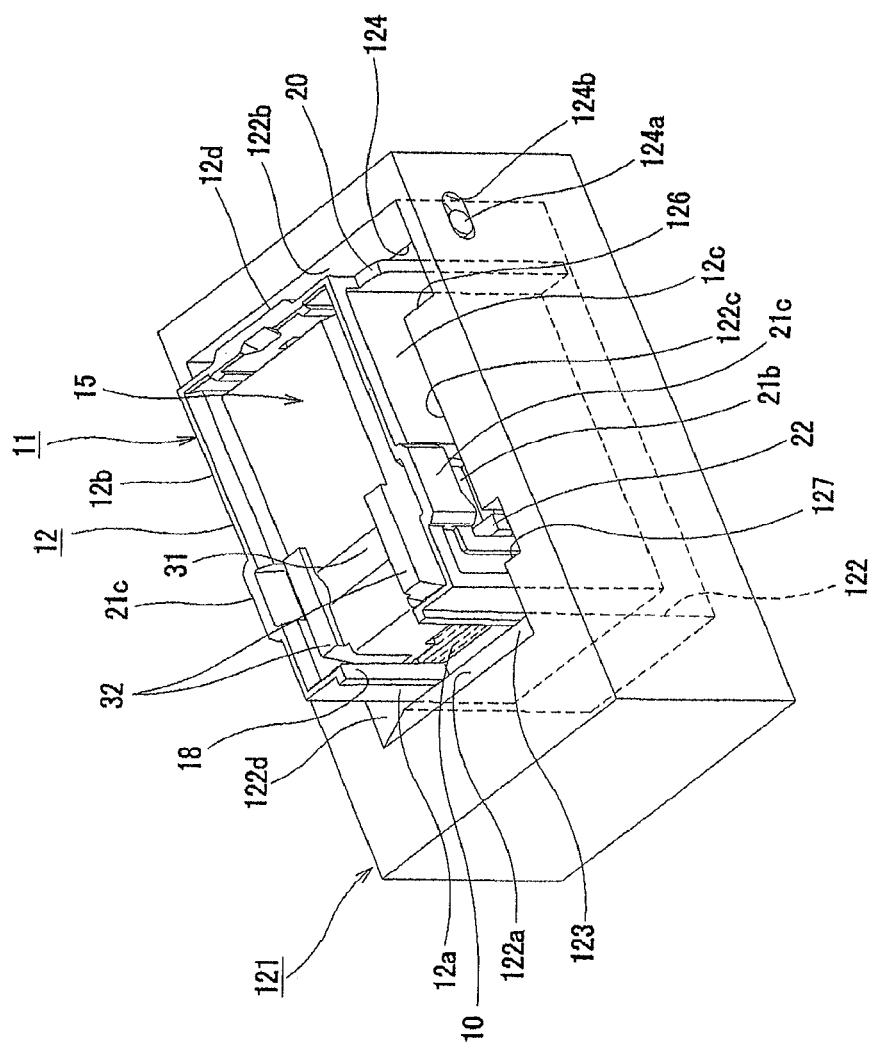
FIG. 64 is a perspective view illustrating a state in which the staple-refill is positioned and received in the mounting object by use of the projection formed on the front surface of the staple-refill and the projection formed on the rear surface.
Figure 65:
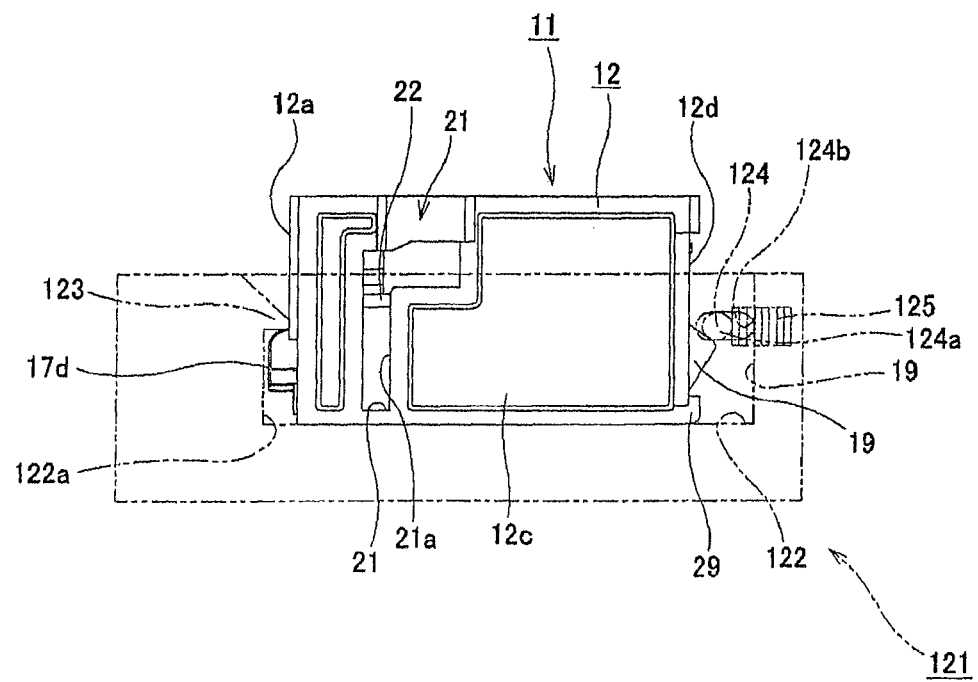
FIG. 65 is a perspective lateral view of FIG. 64.

The mounting object may be configured as illustrated in FIGS. 64 and 65. That is, a mounting object 121 illustrated in FIGS. 64 and 65 is provided with the receiving portion 122 of a concave portion for receiving the staple-refill 11. The front surface 12a of the casing 12 of the staple-refill 11 is provided with the projection 17d having the fall-out preventing piece 17 for preventing the sheet-type connected staples 10 from falling out from the staple discharging port 16, as illustrated in FIG. 10 or the like. The projection 17d functions as the first positioning projection. The receiving portion 122 is provided with a first positioning concave portion 123, which is engaged with the projection 17d, on the front surface 122a opposite to the front surface 12a of the casing 12 of the staple-refill 11. The first positioning concave portion 123 is formed by a stepped portion protruding inward more than the front surface 122a of the receiving portion 122.

The rear surface 12d of the casing 12 is provided with the pair of second positioning projections 19 and 19, as illustrated in FIG. 11 or the like. As illustrated in FIGS. 64 and 65, a rear surface 122b of the receiving portion 122 is provided with a positioning member 124 which is engaged with at least one of the pair of second positioning projections 19 and 19 to position the rear surface 12d of the casing 12. The positioning member 124 is engaged with the pair of second positioning projections 19 and 19. Although being not described in detail, the positioning member 124 is provided to move forward and backward in the receiving portion 122, and is guided by a guide member, which is known in the art, so that the positioning member is engaged with the pair of second positioning projections 19 and 19. The positioning member 124 is provided at the rear surface 122b, and always protrudes in the receiving portion 122 by a coil spring 125 functioning as a biasing member. Also, the positioning member 124 is configured so that an operation portion 124a faces outward through an operation hole 124b of the mounting object 121. If the staple-refill 11 is inserted, the positioning member 124 is pressed by the second positioning projections 19 and 19, and then is first retracted from the receiving portion 122. After that, the positioning member 124 again protrudes in the receiving portion 122 by the resilient force of the coil spring 125, and then is engaged with the second positioning projections 19 and 19. When the staple-refill 11 is pulled out from the receiving portion 122, the positioning member 124 is retracted from the receiving portion 122 by sliding the coil spring 125 in a direction to contract the coil spring 125 through the operation portion 124a, thereby releasing the state in which the positioning member is engaged from the second positioning projection portions 19 and 19. In the mounting object 111, three members, that is, the projection 17d functioning as the first positioning projection and the second positioning projections 19 and 19 functioning as the second positioning projection can be reliably received in the fall-out prevention state by engaging the first positioning concave portion 123 and the positioning member 124.

In the mounting object 121, the lateral surfaces 122c and 122d of the receiving portion 122 are provided with positioning concave portions 126 and 126, which are continuous with the rear surface 122b, formed along a depth direction of the receiving portion 122. The positioning concave portions 126 and 126 are engaged with the handle portions 20 and 20, which are formed to be continuous with the rear surface 122b of the casing 12 and function as the third positioning projection, to guide the insertion of the staple-refill 11 to be inserted and perform the positioning of the staple-refill 11. Also, the lateral surfaces 122c and 122d of the receiving portion 122 are provided with positioning concave portions 127 and 127 at positions opposite to the guide bosses 22 and 22 protruding more than the lateral surfaces 12b and 12c of the casing. As described above, the guide bosses 22 and 22 function as the fourth positioning projection, and are engaged with the positioning concave portions 127 and 127 to guide the insertion of the staple-refill 11 to be inserted and perform the positioning of the staple-refill 11.

Figure 66:
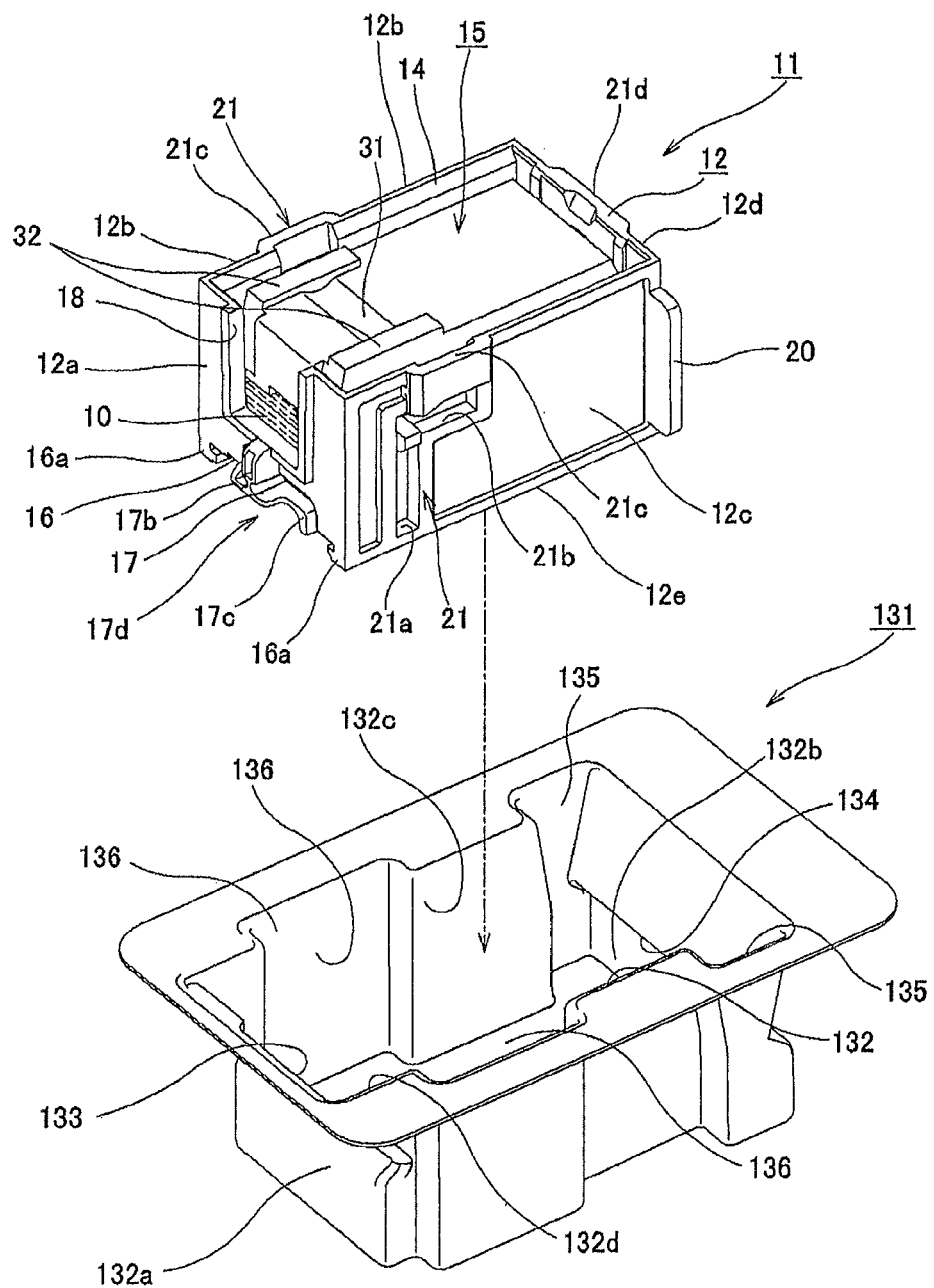
FIG. 66 is a perspective view illustrating a state in which the staple-refill is received in the mounting object in the modification of FIG. 64.
Figure 67:
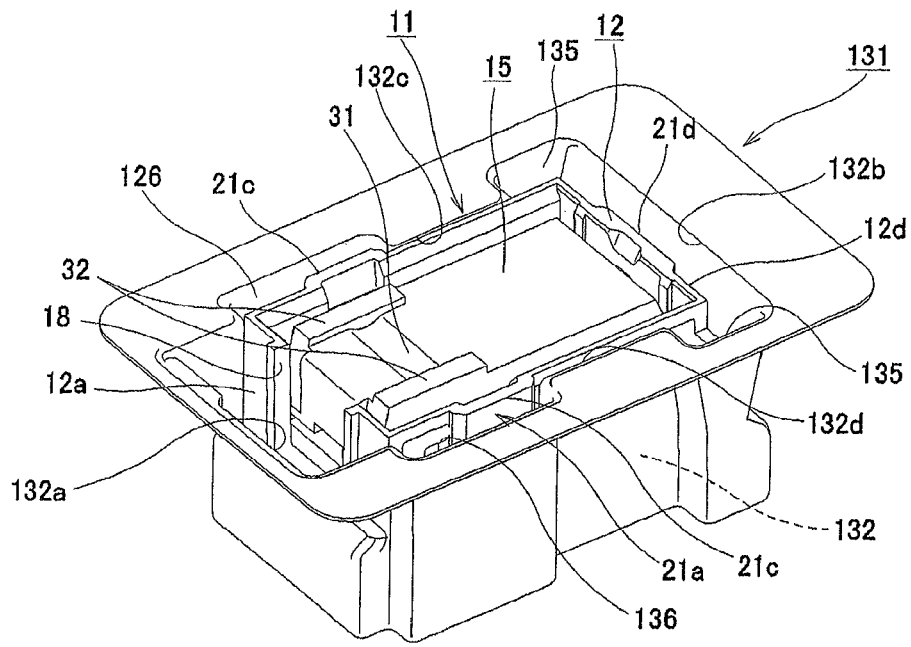
FIG. 67 is a perspective view illustrating a state in which the staple-refill has been received in the mounting object in the example of FIG. 64.
Figure 68:
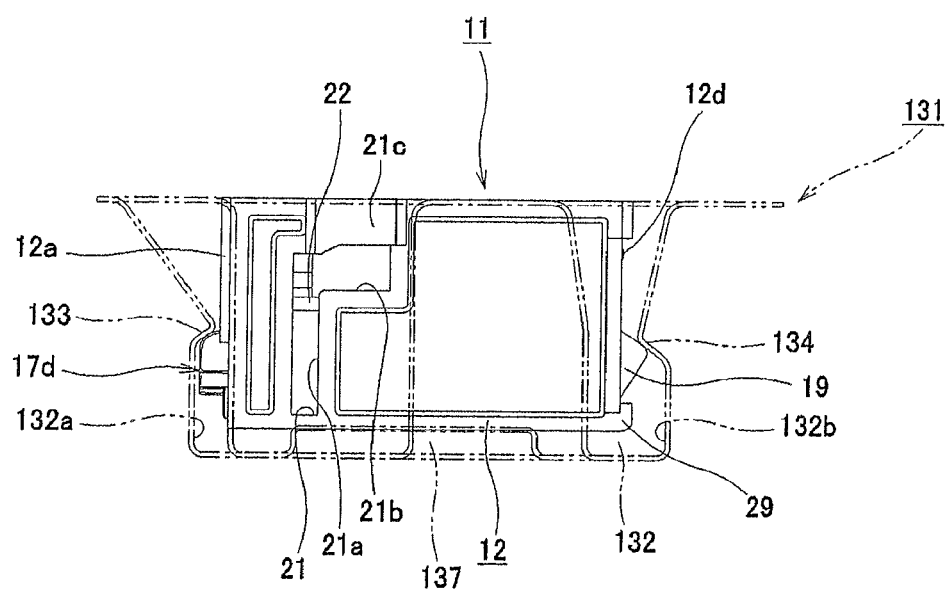
FIG. 68 is a perspective lateral view illustrating a state in which the staple-refill has been received in the mounting object in the example of FIG. 64.

FIGS. 66 to 68 illustrate a modification of the mounting object 121. The mounting object 131 is provided with a receiving portion 132 of a concave shape to receive the staple-refill 11. The receiving portion 132 is provided with a first positioning concave portion 133 on the front surface 132a opposite to front surface 12a of the casing 12 of the staple-refill 11, and the first positioning concave portion 133 is engaged with the projection 17d functioning as the first projection, and protrudes inward more than the front surface 132a of the receiving portion 132.

The rear surface 132b of the receiving portion 132 is provided with a second positioning concave portion 134 which is engaged with at least one of the pair of second positioning projections 19 and 19 formed on the rear surface 12d of the casing 12 to position the rear surface 12d of the casing 12. The positioning concave portion 134 is formed by the stepped portion protruding inward more than the rear surface 132b of the receiving portion 132. As illustrated in FIG. 68, the received staple-refill 11 is supported from the lower side by one or plural bottom-surface support portions 137 protruding from the bottom surface of the receiving portion 132, and the projection 17d and the second positioning projections 19 and 19 are reliably engaged with the positioning concave portions 133 and 134 by the resilience of the bottom surface support portion 137 to prevent rattling. In the mounting object 131, three members, that is, the projection 17d functioning as the first positioning projection and the second positioning projections 19 and 19 functioning as the second positioning projection can be reliably received in the fall-out prevention state by engaging the first positioning concave portion 133 and the positioning member 134.

The lateral surfaces 132c and 132d of the receiving portion 132 are provided with third positioning concave portions 135 and 135, which are continuous with the rear surface 122b, formed along a depth direction of the receiving portion 132. The third positioning concave portions 135 and 135 are engaged with the handle portions 20 and 20, which are formed to be continuous with the rear surface 12b of the casing 12 and function as the third positioning projection, to guide the insertion of the staple-refill 11 to be inserted and perform the positioning of the staple-refill 11.

Also, the lateral surfaces 132c and 132d of the receiving portion 132 are provided with positioning concave portions 136 and 136 at positions opposite to the guide holes 21 and 21 having bosses 22 and 22 protruding more than the lateral surfaces 12b and 12c of the casing which function as the fourth positioning projection. The joint portions 21c and 21c of the guide holes 21 and 21 are formed to slightly protrude outward, and the fourth positioning concave portions 136 and 136 are formed to escape the protruding portions of the joint portions 21c and 21c or the protruding portions of the guide bosses 22 and 22. The fourth positioning concave portions 136 and 136 are engaged with the joint portions 21c and 21c to guide the insertion of the staple-refill 11 to be inserted and perform the positioning of the staple-refill 11.

The fourth positioning concave portions 136 and 136 may include the same configuration as that of the positioning concave portions 127 and 127 for escaping the guide bosses 22 and 22, as illustrated in FIGS. 64 and 65. Also, in the case where the mounting objects 121 and 131 are the package, the bottom surface of the mounting objects 121 and 131 may be provided with a cushion material such as an elastic body to absorb vibration at the transfer and thereby to prevent rattling of the staple-refill 11.

<9. Description of Modification of Push Lever (FIGS. 69 to 78)>

<9-1. First Description of Modification of Push Lever and Notch Portion>

Figure 69:
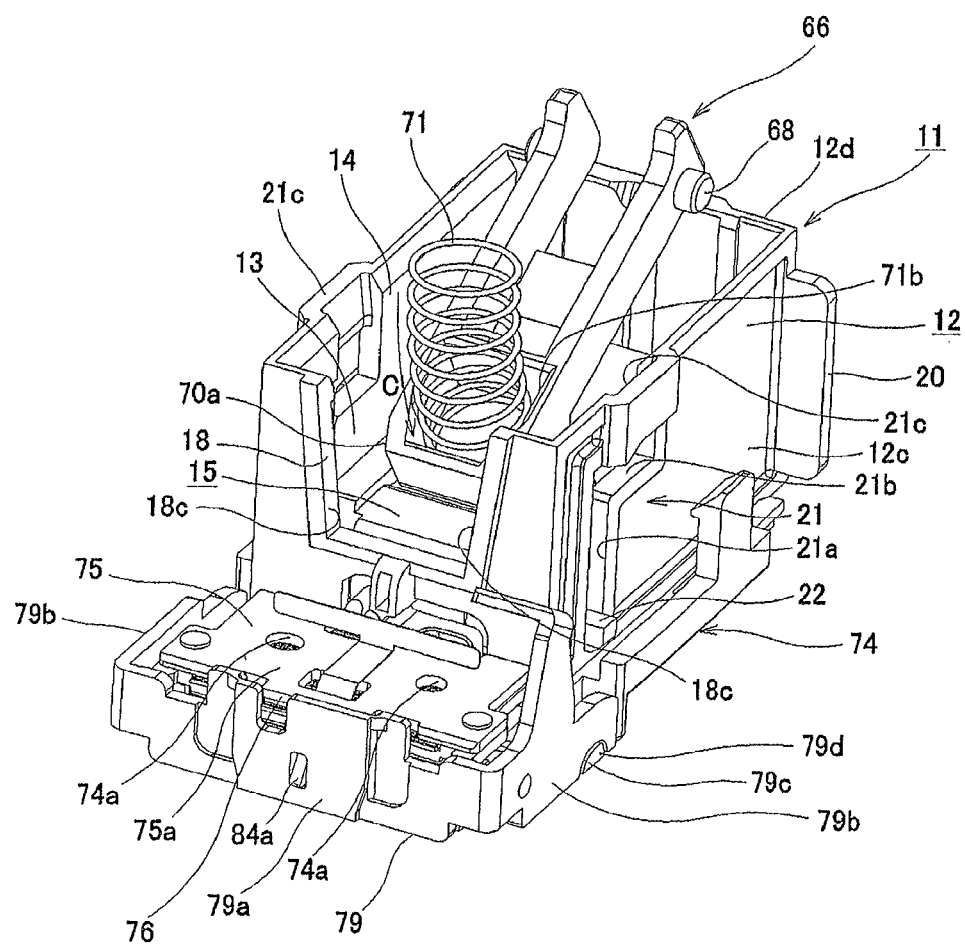
FIG. 69 is a perspective view illustrating an example in which a taper portion is formed on the push portion and the notch portion of the push lever, when seen from its front side, except for the cartridge body.
Figure 70:
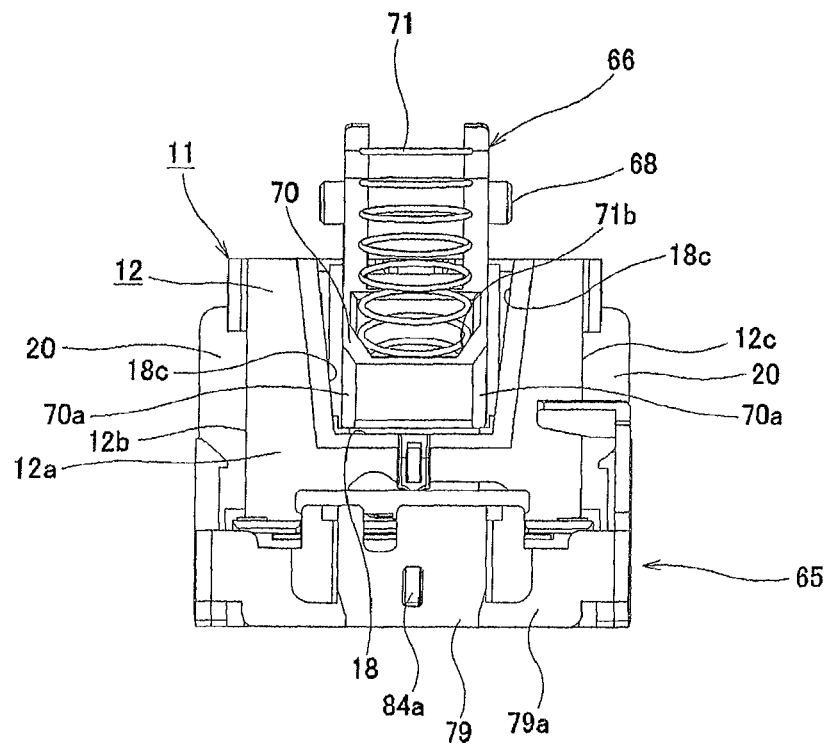
FIG. 70 is a front view illustrating an example in which a taper portion is formed on the push portion and the notch portion of the push lever, except for the cartridge body.
Figure 71:
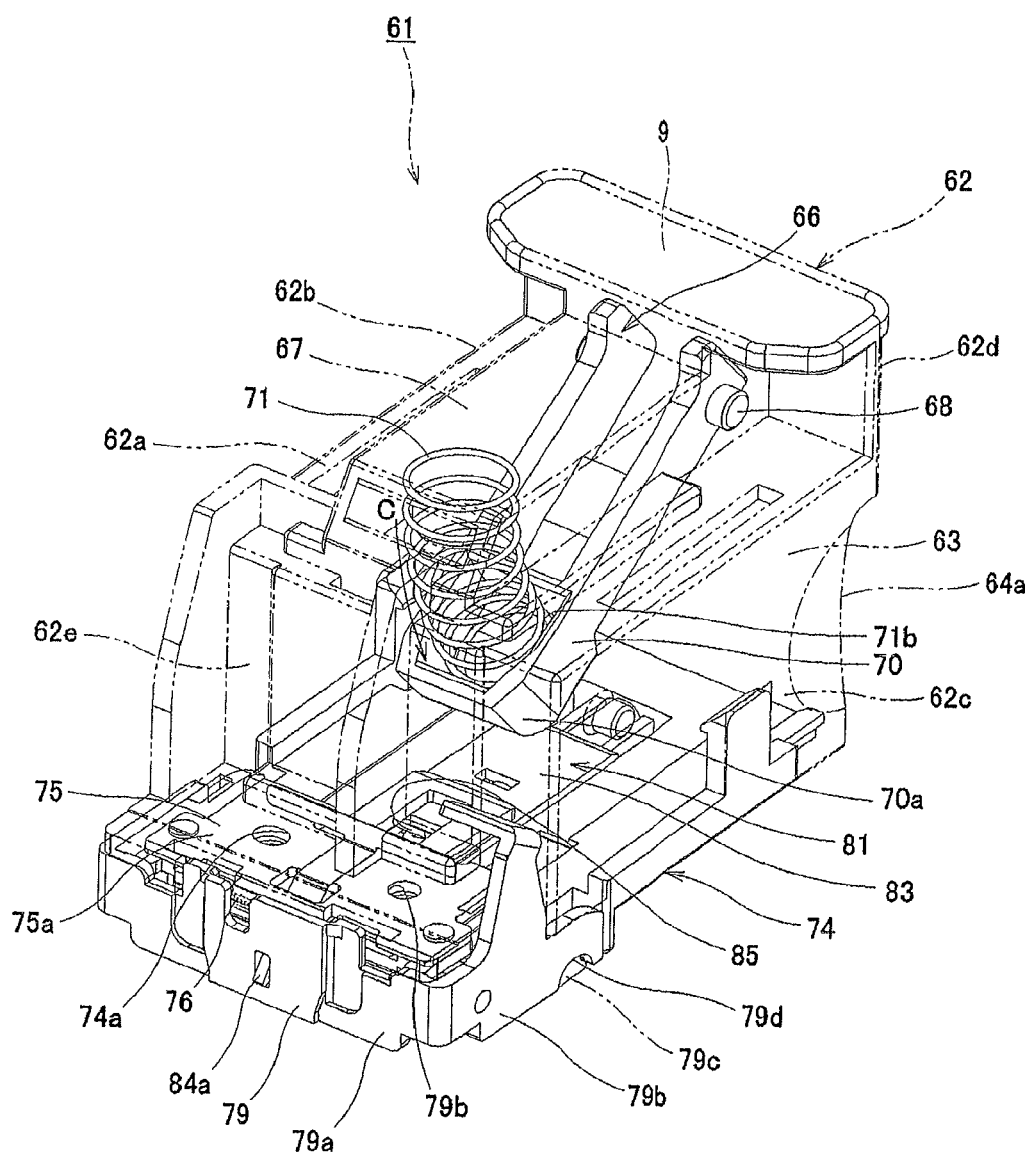
FIG. 71 is a perspective view illustrating an example in which a taper portion is formed on the push portion of the push lever, when seen from its front side, except for the staple-refill.

In the staple-refill 11 illustrated in FIGS. 69 to 71, the notch portion 18 formed in the front surface 12a of the casing 12 is formed in a reverse trapezoidal shape. Specifically, the notch portion 18 has a narrow width of its sides at the bottom surface 12e, and tapered portions 18c and 18c formed at both lateral edge portions. In this way, when the staple-refill 11 moves into or out of the cartridge 61, the push portion 70 of the push lever 66 can easily pass through the notch portion 18. The tapered portions 18c and 18c may be a straight taper or an arc-shaped taper.

The push lever 66 has taper portions 70a and 70a formed at both corner portions of the push portion 70. When the staple-refill 11 moves into or out of the cartridge 61, an insertion end of the push portion to the notch portion 18 is formed with the taper portions 70a and 70a, the push portion functions as a guide portion when the casing 12 moves above the cover member 15 or moves out of the cover member. The tapered portions 70a and 70a may be a straight taper or an arc-shaped taper.

As described above, in the example in FIGS. 69 to 71, the front surface 12a of the casing 12 is provided with the tapered portions 18c and 18c, and/or the push portion 70 of the push lever 66 is provided with the tapered portions 70a and 70a. Accordingly, when the staple-refill 11 is inserted into the cartridge 61, the push portion 70 of the push lever 66 can smoothly enter the position above the cover member 15 in the casing 12, without being caught by both opposite lateral edges of the notch portion 18. Also, when the staple-refill 11 is pulled out from the cartridge 61, the push portion 70 of the push lever 66 can pass through the notch portion 18 from the position above the cover member 15 in the casing 12.

In the example in FIGS. 69 to 71, although the push lever 66 pushes the cover member 15 down, the push lever 66 may directly push the sheet-type connected staples 10 in the staple accommodating portion 13 by use of the push portion 70, as described above, without providing the cover member 15. That is, in the case where the cover member 15 is not provided, the notch portion 18 may be provided with the tapered portions 18c and 18c, and the push portion 70 of the push lever 66 may be provided with the tapered portions 70a and 70a.

<9-2. Second Description of Modification of Push Lever and Notch Portion>

Figure 72:
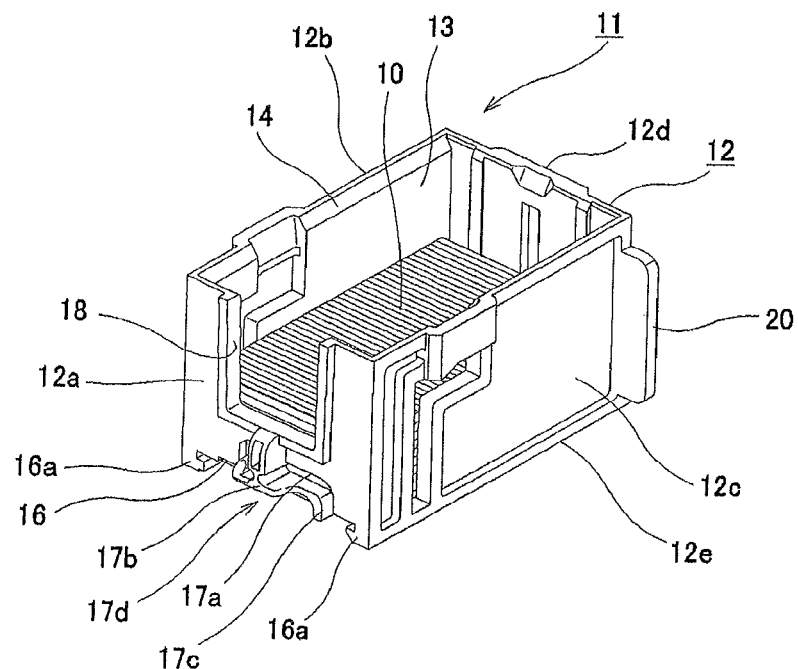
FIG. 72 is a perspective view of the staple-refill with no cover member.
Figure 73:
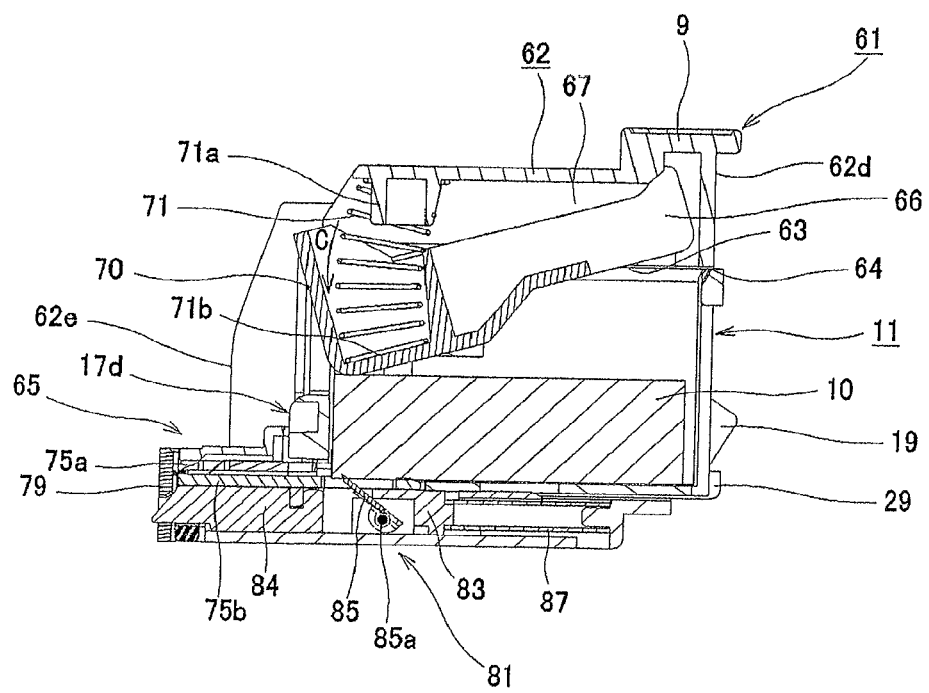
FIG. 73 is a cross-sectional view illustrating a state in which the staple-refill with no cover member is mounted in the cartridge, with the maximum amount of sheet-type connected staples being loaded.

Although the above example has been described in which the stacked sheet-type connected staples 10 in the staple-refill 11 is pushed by the push lever 66 of the cartridge 61 via the cover member 15, the staple-refill 11 may not be provided with the cover member 15. As illustrated in FIG. 72, since the cover member 15 is provided in the staple accommodating portion 13, the staple-refill 11 described herein is configured so that the uppermost layer of the stacked sheet-type connected staples 10 is directly exposed through the staple inserting port 14. If the staple-refill 11 is inserted into the refill accommodating port 63 of the cartridge 61, as illustrated in FIG. 73, the push lever 66 enters the staple accommodating portion 13 through the notch portion 18 formed on the front portion 12a of the casing 12. In this instance, the push lever 70 of the push lever 66 goes over the front wall of the front surface 12a below the notch portion 18, and then moves above the staked sheet-type connected staples 10 in the staple accommodating portion 13.

Figure 74:
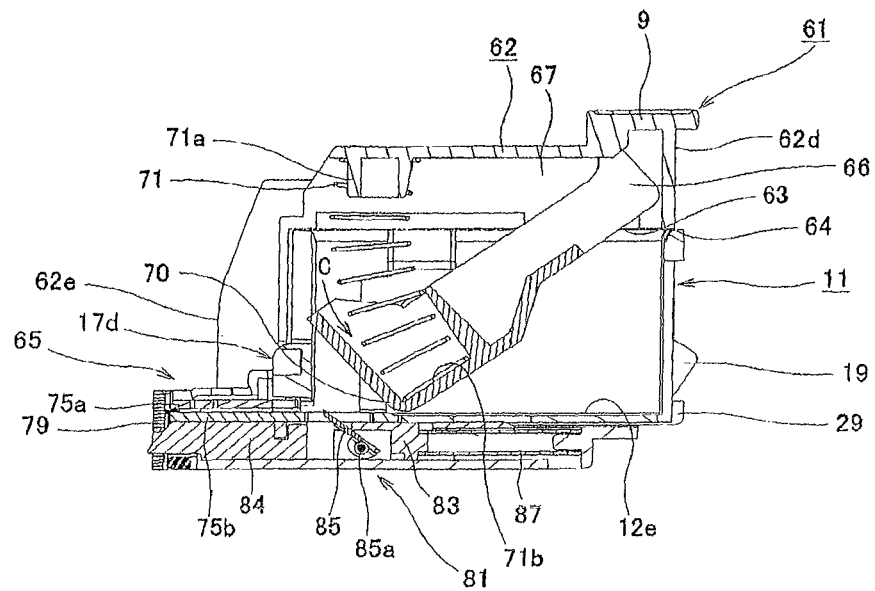
FIG. 74 is a cross-sectional view illustrating a state in which the staple-refill with no cover member is mounted in the cartridge, with the sheet-type connected staples being completely consumed.

As illustrated in FIG. 74, when the sheet-type connected staples 10 of the staple-refill 11 are completely consumed, the push lever 70 of the push lever 66 comes into contact with the bottom surface 12e of the staple accommodating portion 13. When the staple-refill 11 is pulled out from the cartridge 61, the push portion 70 of the push lever 66 moves out from the inside of the staple accommodating portion 13. In this instance, the push lever 70 moves over the front wall of the front surface 12a below the notch portion 18. In this way, in the case where the staple-refill 11 with no cover member 15 is mounted in the cartridge 61, the sheet-type connected staples 10 in the staple accommodating portion 13 are pressed against the bottom surface 12e, so that the sheet-type connected staples 10 can be sent to the striking section 65 of the cartridge 61.

Figure 75:
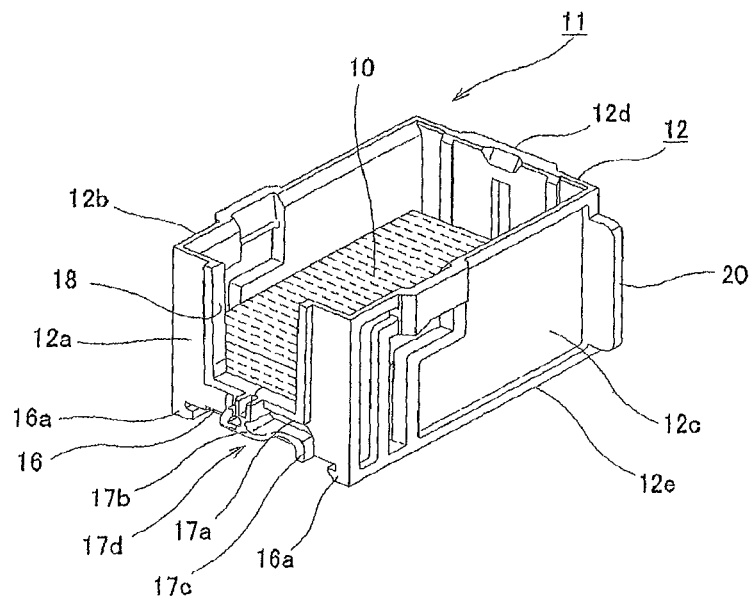
FIG. 75 is a perspective view of the staple-refill in which the front wall below the notch portion is formed at a position lower than that in the example of FIG. 72.

As illustrated in FIG. 75, in the staple-refill 11 with no cover member 15, the front wall of the front surface 12a below the notch portion 18 may be lower than the example in FIG. 72. In this instance, when the staple-refill 11 is accommodated in the refill accommodating port 63 of the cartridge 61, the push portion 70 of the push lever 66 does not collide against the front wall of the front surface 12a below the notch portion 18, but moves over the uppermost layer of the sheet-type connected staples 10, without coming into contact with the stacked sheet-type connected staples 10 in the staple accommodating portion 13 of the casing 12. Also, when the sheet-type connected staples 10 are completely consumed and thus the empty staple-refill 11 is pulled out from the refill accommodating port 63 of the cartridge 61, the front wall of the front surface 12a below the notch portion 18 is low, so that a height difference between the bottom surface 12e and the front wall is small. Accordingly, the push portion 70 of the push lever 66 can smoothly move over the front wall of the front surface 12a below the notch portion 18, thereby lessening the operation force when the staple-refill 11 is pulled out from the cartridge 61.

Figure 76:
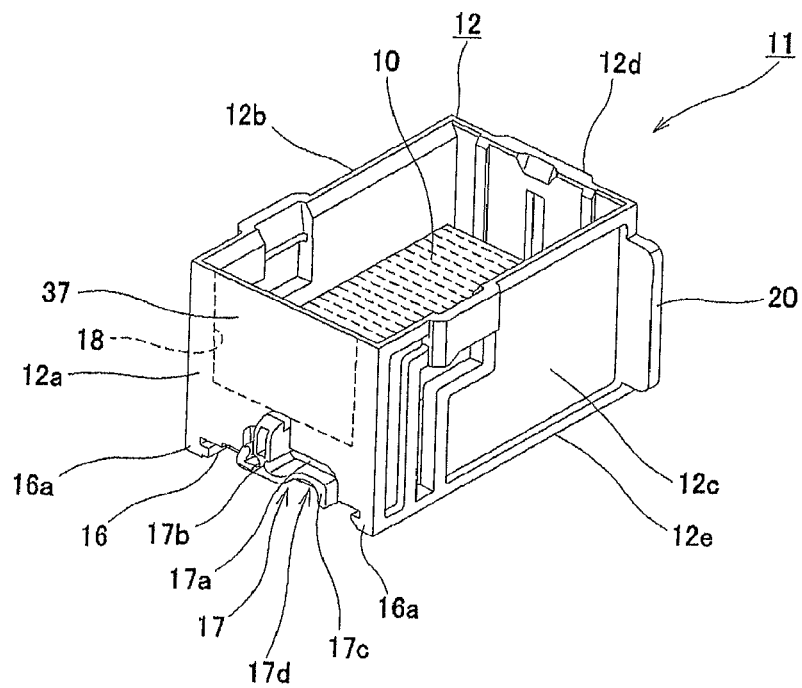
FIG. 76 is a perspective view of the staple-refill in which a dotted portion on the front surface of the casing is punched by the push portion of the push lever.
Figure 77:
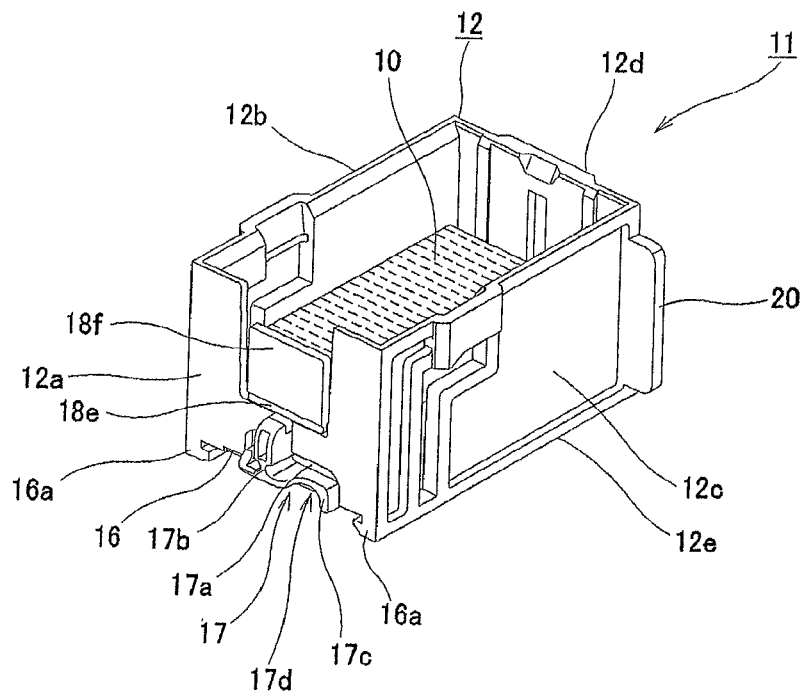
FIG. 77 is a perspective view of the staple-refill in which a thin hinge portion is formed on the front surface of the casing, and the front surface is bent by the push portion of the push lever.
Figure 78A:
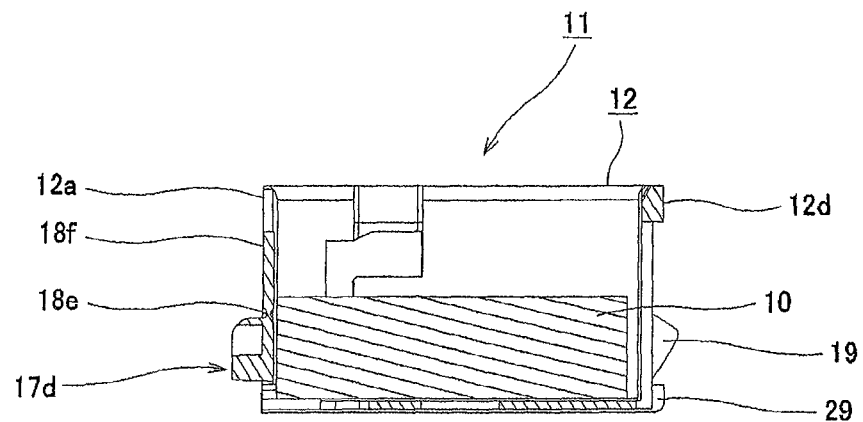
FIG. 78(A) is a cross-sectional view of the staple-refill.
Figure 78B:
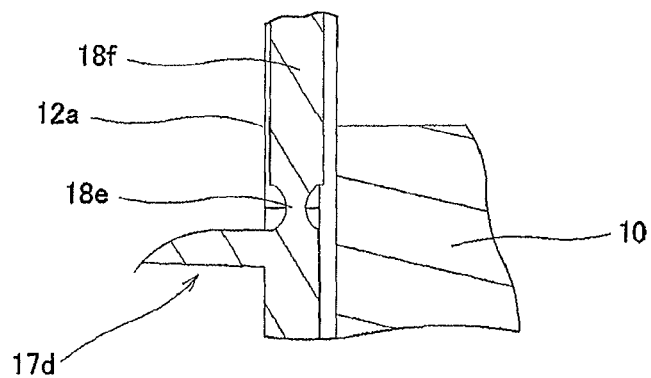
FIG. 78(B) is an enlarged cross-sectional view of major parts in vicinity of the hinge portion.

As illustrated in FIG. 76, the front surface 12a of the casing 12 is not provided with the notch portion 18, for example, the front surface 12a of the staple-refill 11 may be provided with a thin portion 37. When the staple-refill 11 is accommodated in the refill accommodating port 63, the push portion 70 of the push lever 66 breaks the thin portion 37 to penetrate the front surface 12a of the casing 12 and thereby to form the notch portion 18. The push portion moves over the uppermost layer of the sheet-type connected staples 10 in the staple accommodating portion 13. Also, when the staple-refill 11 is accommodated in the refill accommodating port 63, the push lever may move over the front wall of the front surface 12a. Alternatively, when the staple-refill is pulled out, the push portion may penetrate the front wall of the front surface 12a. Moreover, when the push portion penetrates the front surface 12a of the casing 12, as illustrated in FIGS. 77, 78(A) and 78(B), the front surface 12a of the casing may be provided with a hinge portion 18e which formed by the straight thin portion along the width direction. In the case where the front surface 12a of the casing 12 is provided with the hinge portion 18e, the push portion 70 of the push lever 66 moves over a punched piece 18f supported by the stacked sheet-type connected staples 10, when the staple-refill 11 is inserted into the refill accommodating port 63 of the cartridge 61. Also, when the staple-refill 11 is pulled out from the refill accommodating port 63, the punched piece 18f can be bent outward from the staple accommodating portion 13 via the hinge portion 18e. Meanwhile, the above-described example illustrated in FIGS. 76 and 77 may be configured to have the cover member 15. Also, in the example illustrated in FIGS. 76 and 77, the notch portion 18 may be formed on the tapered portions 18c and 18c, or the push portion 70 of the push lever 66 may be provided with the tapered portions 70a and 70a. In this way, the push lever 70 of the push lever 66 can easily pass the notch portion 18.

<10. Description of Modification of Guide of Push Lever (FIGS. 79 and 91)>

Figure 79:
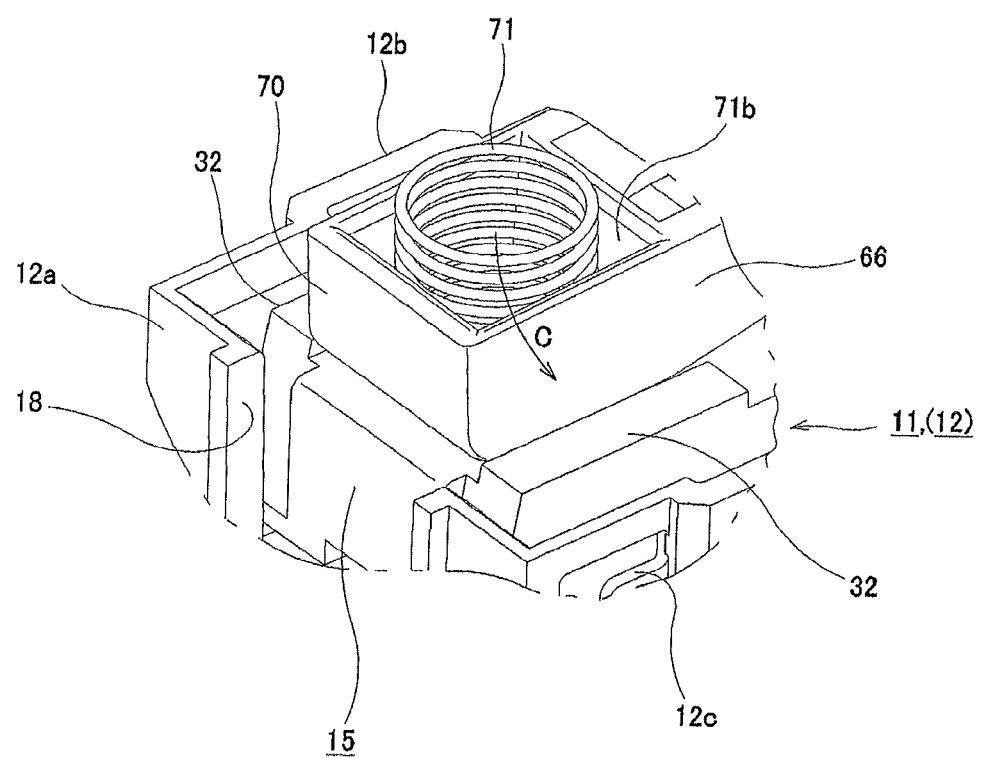
FIG. 79 is a perspective view of major parts to illustrate a relationship between the push lever and the guide wall of the cover member of the staple-refill which is loaded with the maximum amount of sheet-type connected staples.
Figure 80:
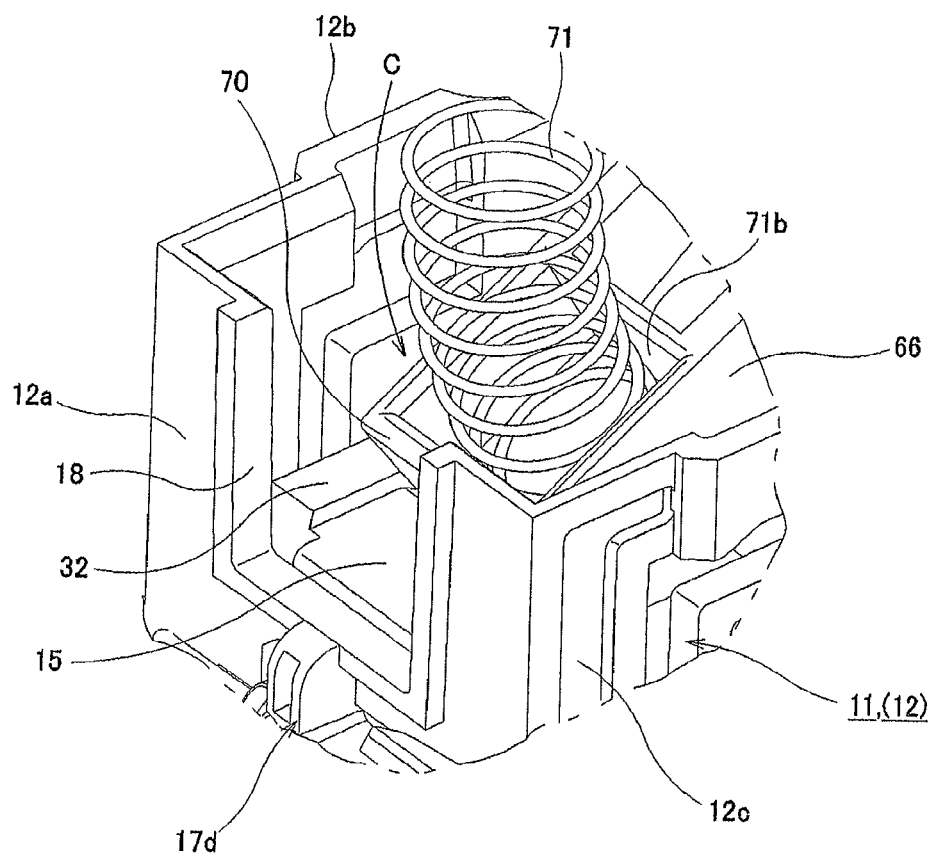
FIG. 80 is a perspective view of major parts to illustrate a relationship between the push lever and the guide wall of the cover member of the empty staple-refill in which the sheet-type connected staples are completely consumed.

As illustrated in FIGS. 79 and 80, when the staple-refill 11 is accommodated in the refill accommodating port 63 of the cartridge 61, the push portion 70 of the push lever 66 which enters the notch portion 18 formed on the front surface 12a of the casing 12 moves over the cover member 15 provided on the casing 12 of the staple-refill 11. In the cover member 15, as illustrated in FIGS. 8, 10, 11, 13 and 79, the guide walls 32 and 32 functioning as the guide portion of the push portion 70 are spaced apart from each other by the approximately width of the push portion 70 in the sliding direction of the push portion 70. Accordingly, when the maximum amount of the sheet-type connected staples 10 are loaded in the staple accommodating portion 13, the push portion 70 is not engaged with the concave-shaped engaging portion 31 of the cover member 15. But, as the staple accommodating portion 13 are decreased, as illustrated in FIG. 10, the push portion 70 is guided by the guide walls 32 and 32, and then are engaged with the concave-shaped engaging portion 31.

Figure 81:
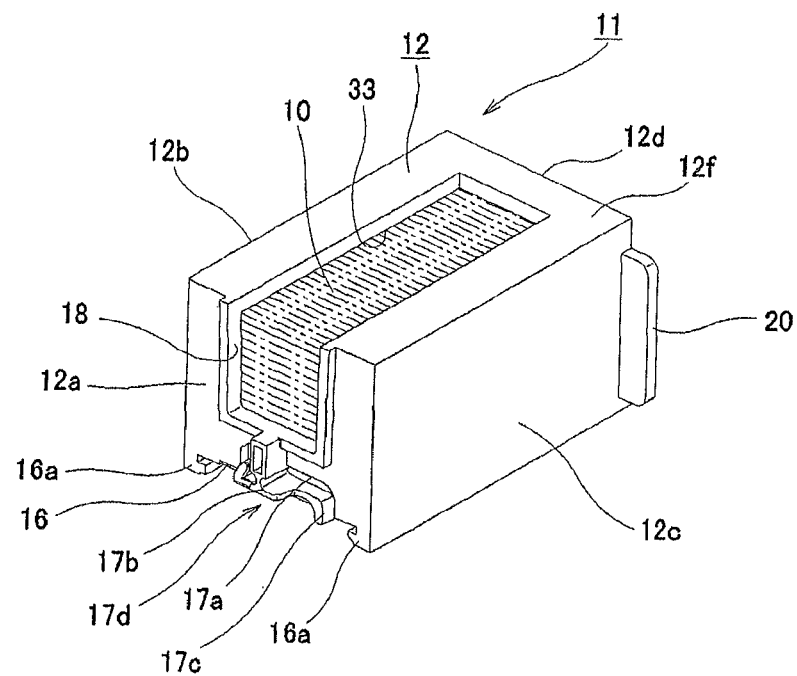
FIG. 81 is a perspective view of the staple-refill in which a lever guide hole is formed in the center of the front and top surfaces of the casing in a width direction thereof.

Even without providing the staple-refill 11 with the cover member 15, the sheet-type connected staples 10 in the casing 12 can be directly pushed by the push lever 70 of the push lever 66, as described above. In the example in FIG. 81, in the case where the staple-refill 11 is not provided with the cover member 15, the sheet-type connected staples 10 are loaded from the bottom surface of the staple-refill 11, a lever guide hole 33 is provided to penetrate the front surface 12a and the top surface 12 of the casing 12 along the center of the width direction thereof. The lever guide hole 33 is formed to have the substantially width as that of the push portion 70 so as to guide the moving push portion 70. In the lever guide hole 33, a portion corresponding to the front surface 12a of the casing 12 works as the notch portion 18.

Figure 82:
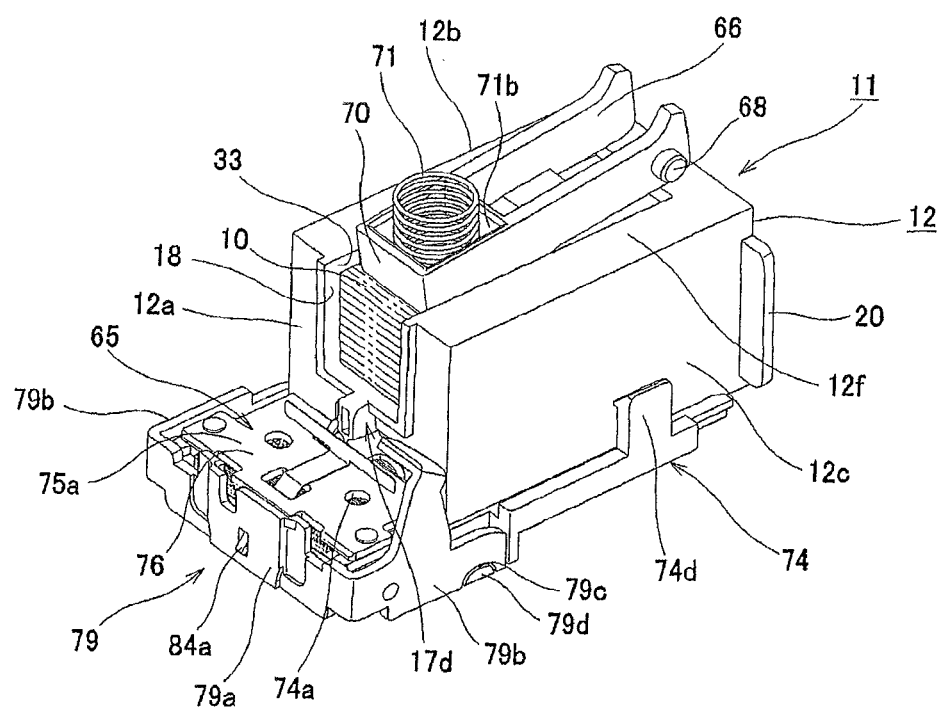
FIG. 82 is a perspective view illustrating a state in which the staple-refill loaded with the maximum amount of sheet-type connected staples illustrated in FIG. 81 is mounted in the cartridge, except for the cartridge body.
Figure 83:
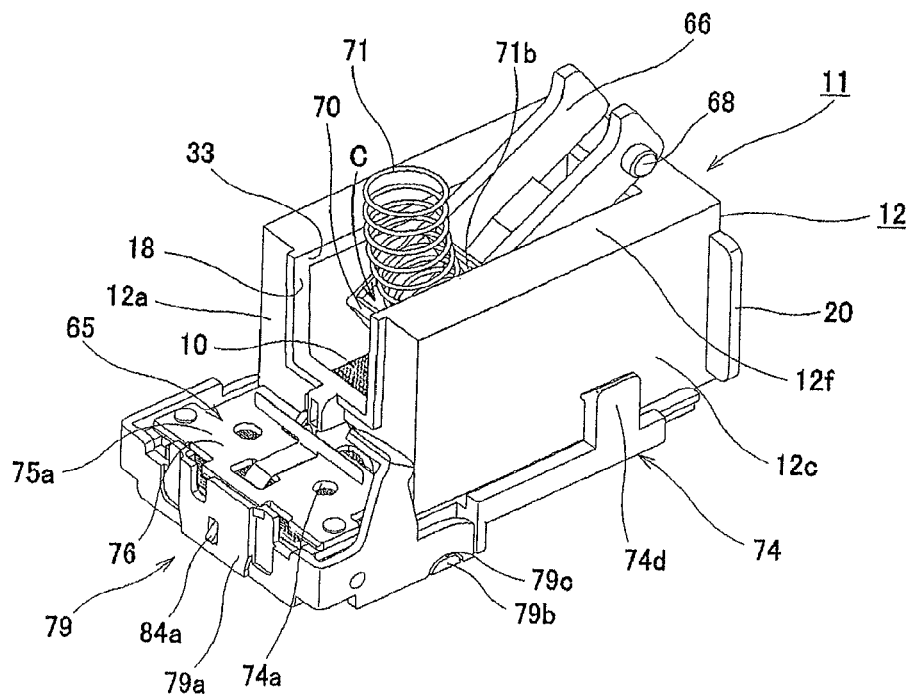
FIG. 83 is a perspective view illustrating a state in which the empty staple-refill with the sheet-type connected staples completely consumed illustrated in FIG. 81 is mounted in the cartridge, except for the cartridge body.

As illustrated in FIG. 82, if the staple-refill 11 is accommodated in the refill accommodating port 63 of the cartridge 61, the push portion 70 of the push lever 66 of the cartridge 61 enters the lever guide hole 33 from the side of the front surface 12a, and then moves to the side of a top surface 12f. As illustrated in FIG. 83, as the sheet-type connected staples 10 are decreased in the staple-refill 11, the push lever 66 is guided to the side of the top surface 12f of the lever guide hole 33, while pushing down the uppermost layer of the sheet-type connected staples 10. In this way, the push portion 70 can reliably push down the sheet-type connected staples 10. Also, when the staple-refill 11 is pulled out from the refill accommodating port 63 of the cartridge 61, the push portion 70 can be retracted from the front surface 12a of the casing 12, while being guided by the lever guide hole 33.

Figure 84:
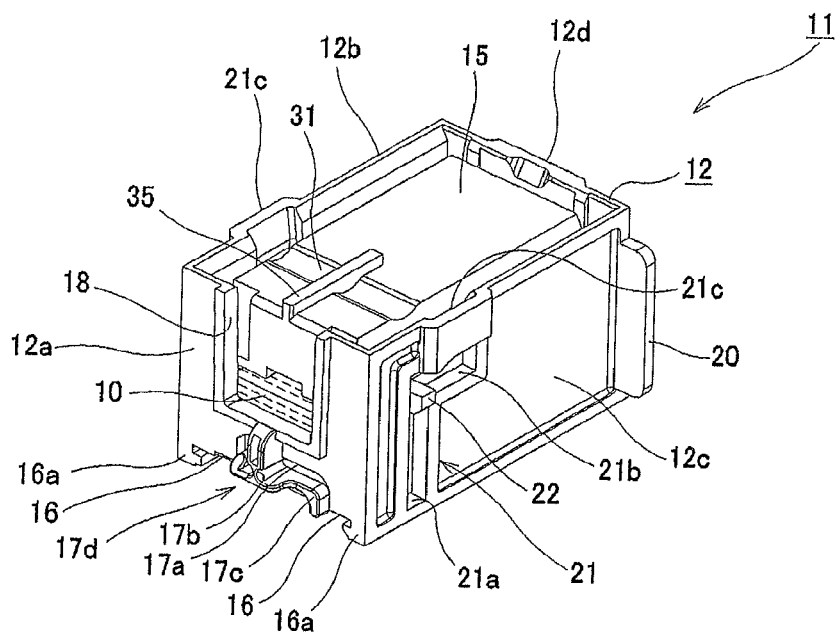
FIG. 84 is a perspective view of the staple-refill including the cover member provided with a guide rail.
Figure 85:
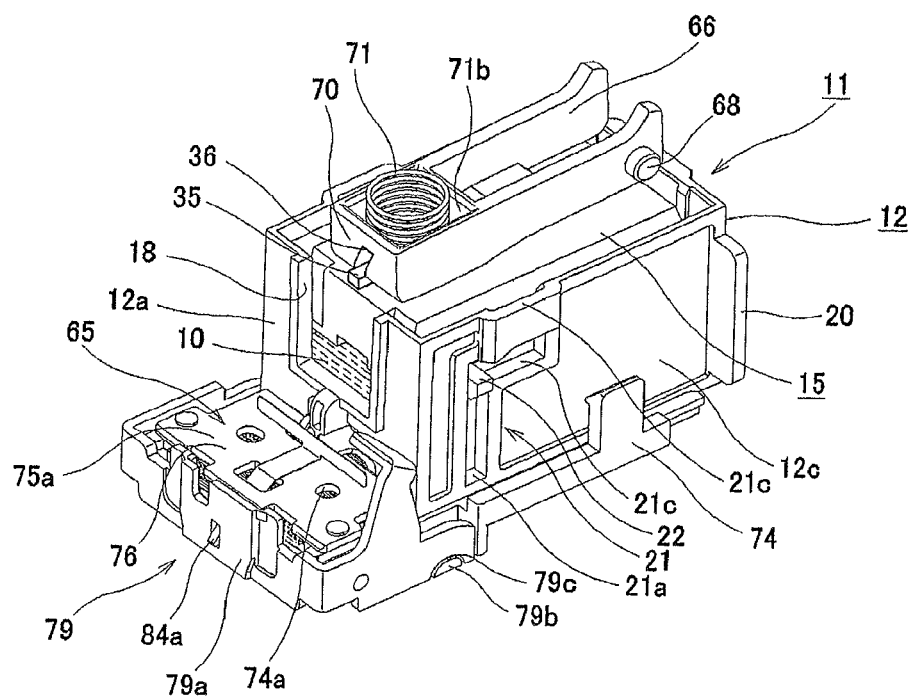
FIG. 85 is a perspective view illustrating a state in which the staple-refill loaded with the maximum amount of sheet-type connected staples illustrated in FIG. 84 is mounted in the cartridge, except for the cartridge.
Figure 86:
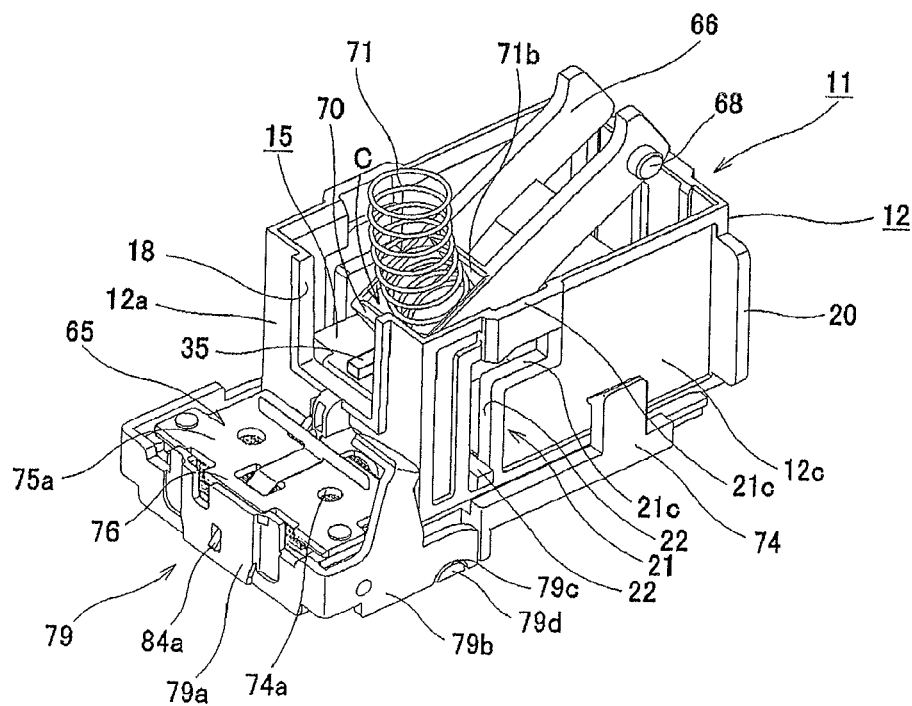
FIG. 86 is a perspective view illustrating a state in which the empty staple-refill with the sheet-type connected staples completely consumed illustrated in FIG. 84 is mounted in the cartridge, except for the cartridge body.

For the guide portion of the push portion 70 of the push lever 66, as illustrated in FIG. 84, the top surface of the cover member 15 may be provided with a ridge-shaped guide rail 35 at the center of the width direction thereof, in the case of the staple-refill 11 having the cover member 15. In this instance, as illustrated in FIG. 85, the push portion 70 is provided with a guide groove 36 which is engaged with the guide rail 35. If the staple-refill 11 is accommodated in the refill accommodating port 63 of the cartridge 61, the push portion 70 of the push lever 66 of the cartridge 61 moves over the cover member 15 in the staple accommodating portion 13 through the notch portion 18 formed on the front surface 12a of the casing 12. The guide rail 35 on the cover member 15 is engaged with the guide groove 36 of the push portion 70. The push portion 70 moves over the cover member 15 in the state in which the guide rail 35 is engaged with the guide groove 36, as illustrated in FIG. 86, as the sheet-type connected staples 10 are decreased in the staple-refill 11. In this way, the push portion 70 can reliably push the sheet-type connected staples 10 down. Also, when the staple-refill 11 is pulled out from the refill accommodating port 63 of the cartridge 61, the push portion 70 can be retracted from the front surface 12a of the casing 12, while being engaged with and guided by the guide groove 36. Accordingly, the staple-refill 11 can be easily pulled out from the refill accommodating port 63 of the cartridge 61.

Figure 87:
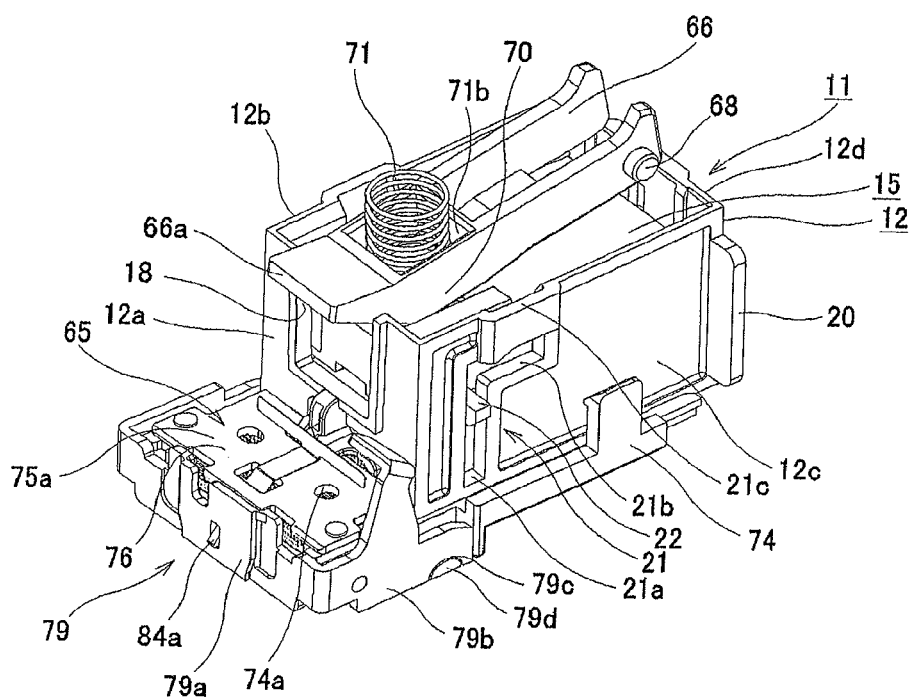
FIG. 87 is a perspective view illustrating a state in which the staple-refill loaded with the maximum amount of sheet-type connected staples is mounted in the cartridge provided with a guide piece at the leading end portion of the push lever, except for the cartridge body.

As illustrated in FIG. 87, the guide portion of the push portion 70 of the push lever 66 may be provided on the leading end portion of the push lever 66. That is, the push lever 66 is provided with a guide piece 66a to extend its leading end portion. In this instance, the notch portion 18 of the casing 12 of the staple-refill 11 is formed in a substantially rectangular shape, and the guide piece 66a has a substantially width as that of the notch portion so as to be engaged with the notch portion 18. Also, the guide piece 66a is formed to have a length so that the push lever 66 is always engaged with the notch portion from the state in which the maximum amount of the sheet-type connected staples 10 in the staple-refill 11 is loaded in the staple-refill 11 to the state in which the sheet-type connected staples 10 are completely consumed (the state in which the cover member 15 is positioned at the lowest position).

Figure 88:
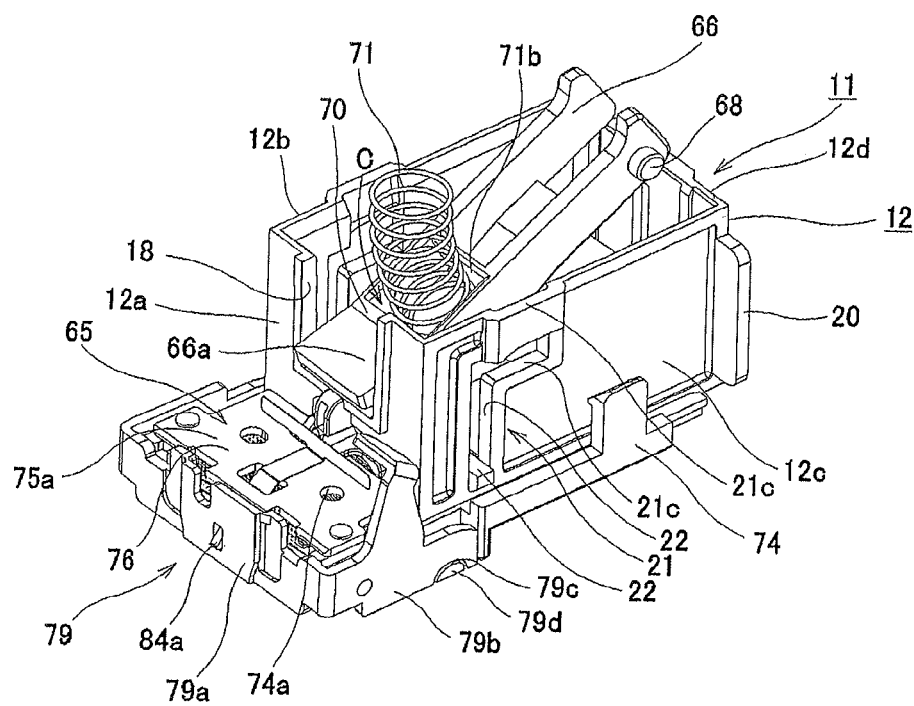
FIG. 88 is a perspective view illustrating a state in which the empty staple-refill with the sheet-type connected staples are completely consumed is mounted in the cartridge provided with a guide piece at the leading end portion of the push lever, except for the cartridge body.

As illustrated in FIG. 87, if the staple-refill 11 is accommodated in the refill accommodating port 63 of the cartridge 61, the push portion 70 of the push lever 66 of the cartridge 61 moves over the cover member 15 in the staple accommodating portion 13 through the notch portion 18 of the casing 12. The guide piece 66a provided on the leading end portion of the push lever 66 is engaged with the notch portion 18. As illustrated in FIG. 88, if the sheet-type connected staples 10 are decreased in the staple-refill 11, the push lever 66 is correspondingly pivoted in the direction of the arrow C in FIG. 88 by the resilient force of the coil spring 71, and then is moved along the top surface of the cover member 15. In this instance, the guide piece 66a of the push lever 66 is continuously engaged with the notch portion 18 of the casing 12. In this instance, the push portion 70 can be guided by the notch portion 18 to reliably push the sheet-type connected staples 10 down. Also, when the staple-refill is pulled out from the refill accommodating port 63 of the cartridge 61, since the guide piece 66a is engaged with the notch portion 18, the push portion 70 can be smoothly retracted through the notch portion 18 formed on the front surface 12a of the casing 12. That is, the staple-refill 11 can be easily pulled out from the refill accommodating port 63 of the cartridge 61.

Also, in an example in FIGS. 87 and 88, the staple-refill 11 may not be provided with the cover member 15 in the refill accommodating port 63. In this instance, the push portion 70 of the push lever 66 directly pushes down the sheet-type connected staples 10 in the refill accommodating port 63. In this instance, since there is no cover member 15, the staple-refill does not have the guide function like the guide walls 32 and 32. However, since the guide piece 66a of the push lever 66 is engaged with the notch portion 18, the push lever 66 can be reliably guided.

Figure 89A:
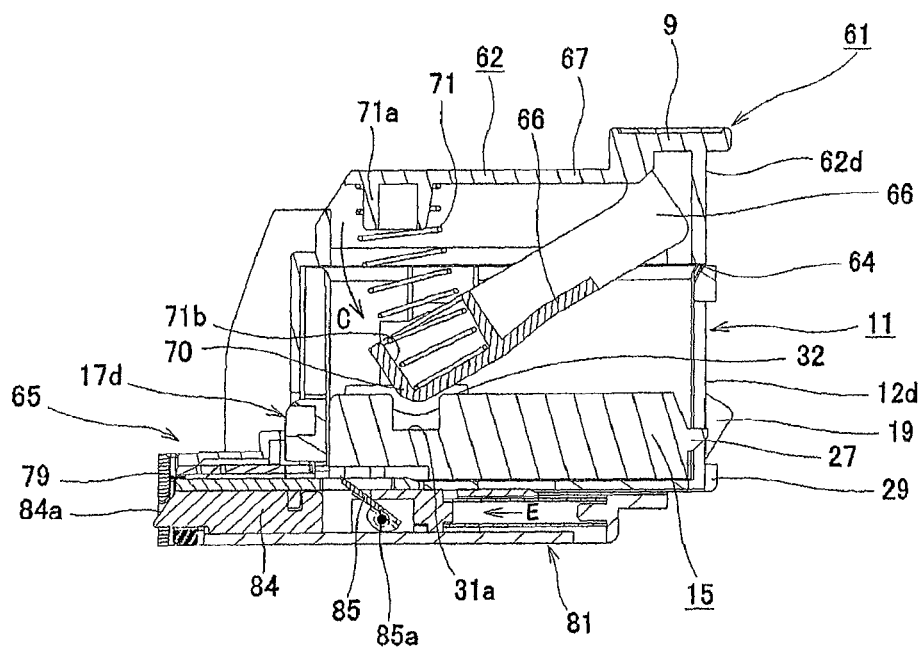
Figure 89B:
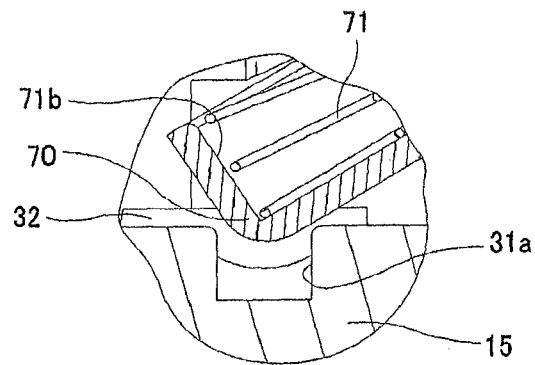
Figure 90A:
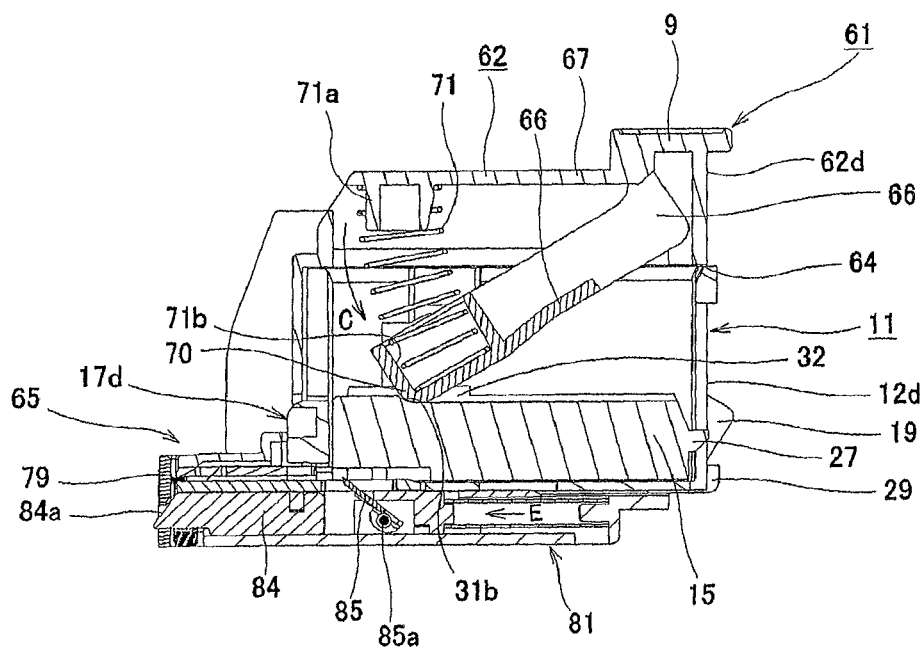
Figure 90B:
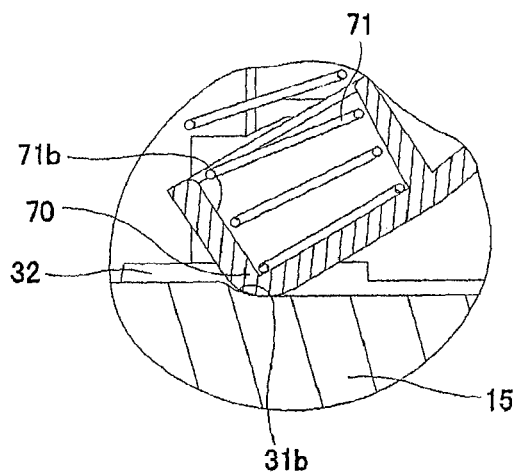

According to the above-described examples illustrated in FIGS. 10, 42 or the like, if the sheet-type connected staples 10 are decreased in the staple-refill 11 or are completely consumed, the push portion 70 of the push lever 66 is engaged with the concave-shaped engaging portion 31 formed on the cover member 15 of the staple-refill 11, so that the staple-refill 11 is not fallen out from the refill accommodating port 63 of the cartridge 61. That is, as illustrated in FIGS. 89(A) and 89(B), the cover member 15 is provided with the concave portion 31a on the top surface thereof. Therefore, if the sheet-type connected staples 10 are decreased in the staple-refill 11 or are completely consumed, the push portion 70 of the push lever 66 is engaged with the concave portion 31a, so that the staple-refill 11 is not fallen out from the cartridge 61. Also, to prevent the staple-refill 11 being fallen out from the cartridge 61, as illustrated in FIGS. 90(A) and 90(B), the top surface of the cover member 15 may be provided with a stepped portion 31b functioning as an engaging portion with the push portion 70 of the push lever 66. The stepped portion 31b is formed such that a portion at the side the notch portion 18 of the front surface 12a of the casing 12 is high, and a portion at the opposite side is low. In this way, if the sheet-type connected staples 10 are decreased in the staple-refill 11 or are completely consumed, the push portion 70 of the push lever 66 is moved from the high side (the side of the notch portion) of the stepped portion 31b to the low side, and thus is engaged with stepped portion 31b having a height difference. In this way, if the sheet-type connected staples 10 are decreased in the staple-refill 11 or are completely consumed, the push portion 70 of the push lever 66 is engaged with the concave-shaped engaging portion 31 formed on the cover member 15 of the staple-refill 11, so that the staple-refill 11 is not fallen out from the refill accommodating port 63 of the cartridge 61.

Figure 91A:
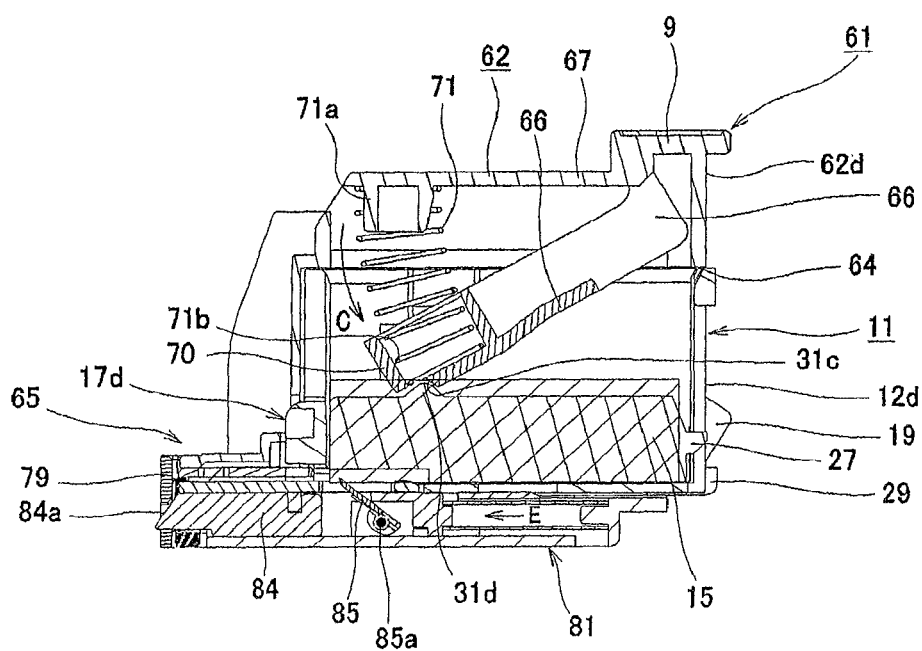
Figure 91B:
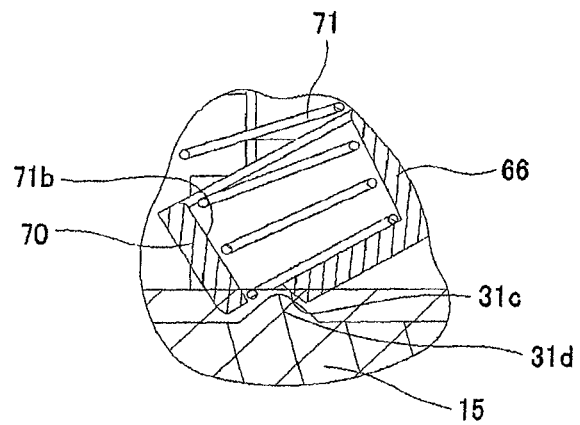

As illustrated in FIGS. 91(A) and 91(B), the push portion 70 of the push lever 66 may be provided with a concave portion 31c, and the top surface of the cover member 15 may be provided with a boss portion 31d. The concave portion 31c is a corner portion of the push portion 70, and is formed on the contact portion of the push portion 70 when the push portion 70 moves over the top surface of the cover member 15 through the notch portion 18. In this instance, if the sheet-type connected staples 10 are decreased in the staple-refill 11 or are completely consumed, the push portion 70 is moved over the top surface of the cover member 15, so that the boss portion 31d of the cover member 15 is engaged with the concave portion 31c of the push portion 70. In this way, if the sheet-type connected staples 10 are decreased in the staple-refill 11 or are completely consumed, the push portion 70 of the push lever 66 is engaged with the concave-shaped engaging portion 31 formed on the cover member 15 of the staple-refill 11, so that the staple-refill 11 is not fallen out from the refill accommodating port 63 of the cartridge 61.

<11. Description of Modification of Locking Mechanism of Staple-Refill (FIGS. 92 to 99)>

The locking mechanism 72 illustrated in FIGS. 32 to 35 prevents the staple-refill 11 from falling out from the cartridge 61 by engaging the guide bosses 22 and 22 of the cover member 15 of the staple-refill 11 with the engaging portions 73 and 73 formed on the inner surface of the lateral surfaces 62b and 62c of the cartridge 61. In particular, the locking mechanism 72 is configured to prevent the staple-refill 11 from pulling out from the refill accommodating port 63 when the staple-refill 11 is in the sheet-type connected staples 10, and also to pull out the staple-refill 11 from the refill accommodating port 63 when the sheet-type connected staples 10 are completely consumed in the staple-refill 11. In this way, the locking mechanism 72 prevents the sheet-type connected staples 10 sent to the striking section 65 and the sheet-type connected staples 10 in the staple-refill 11 from being divided, and prevents the staple-refill 11 from being remounted and failed. The locking mechanism implementing the above functions may be configured as FIGS. 92 and 95.

<11-1. Description of First Modification of Locking Mechanism>

Figure 92:
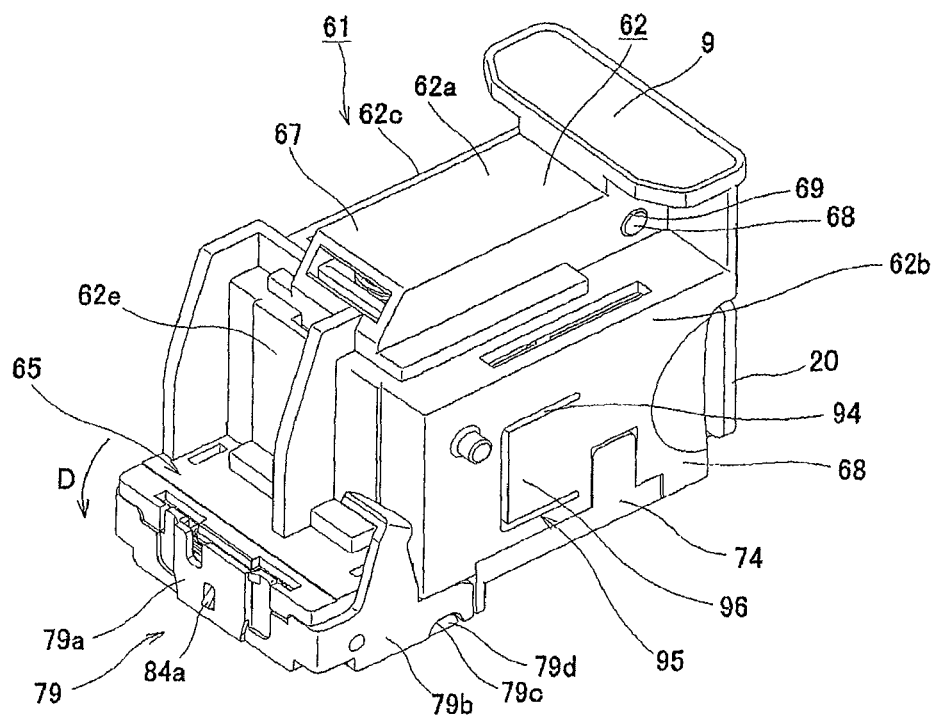
FIG. 92 is a perspective view illustrating a first modification of the locking mechanism of the staple-refill.
Figure 93:
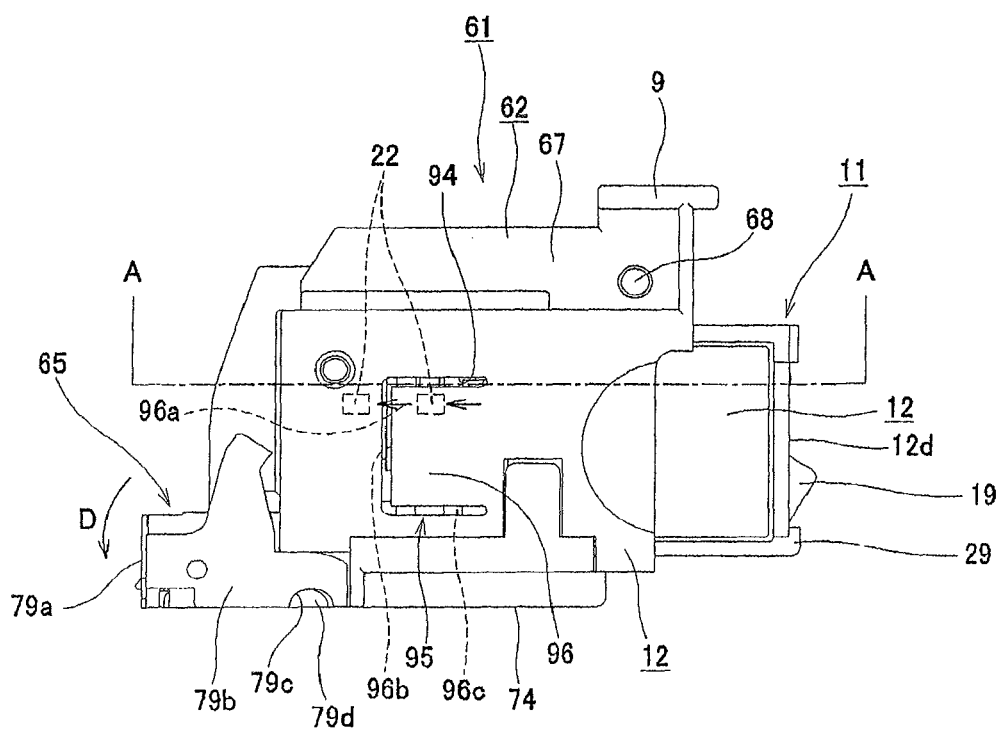
FIG. 93 is a lateral view illustrating the first modification of the locking mechanism when the staple-refill is inserted into the cartridge.
Figure 94:
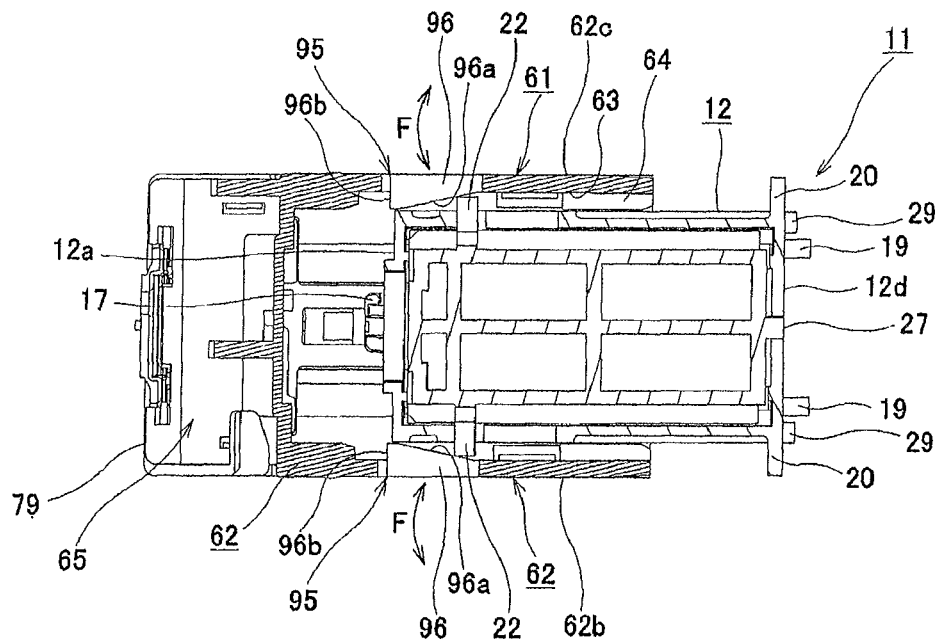
FIG. 94 is a cross-sectional view illustrating the first modification of the locking mechanism when the staple-refill is inserted into the cartridge (cross-sectional view taken along the line A-A in FIG. 93).

The locking mechanism 95 has resilient engaging pieces 96 and 96 formed on the inner surface of the lateral surfaces 62b and 62c of the cartridge body 62 which configures the cartridge 61, as an engaging portion engaged with the guide bosses 22 and 22 of the cover member 15 protruding outward from the lateral surfaces 12b and 12c of the casing 12. The resilient engaging pieces 96 and 96 form a C-shaped slit 94, as illustrated in FIGS. 92 to 94, and the leading end portion is resiliently displaced in the direction of the arrow F in FIG. 70 to extend over the inside and outside of the refill accommodating port 63. As illustrated in FIG. 94, the resilient engaging pieces 96 and 96 are formed with an inclined surface at the side of the refill accommodating port 63, and have pick-up portions 96a and 96a for picking up the guide bosses 22 and 22 of the staple-refill 11. Also, the resilient engaging pieces 96 and 96 have separation restricting portions 96b and 96b formed, at a portion opposite to the pick-up portions 96a and 96a, in parallel with the vertical guide portions 21a and 21a of the guide holes 21 and 21 of the staple-refill 11 to restrict separation of the staple-refill 11. The separation restricting portions 96b and 96b are formed by vertical walls so as not to be disengaged from the guide bosses 22 and 22. Also, the resilient engaging pieces 96 and 96 have a lateral edge, which is parallel to the insertion direction of the staple-refill 11 at the side of the top surface 62a of the cartridge body 62, of a height equal to or slightly higher than the height of the guide bosses 22 and 22 of the cover member 15 when the maximum amount of the sheet-type connected staples 10 is loaded in the staple-refill 11. Moreover, the height of the lateral edge which is parallel to the insertion direction of the staple-refill 11 at the side of the base plate member 74 of the cartridge body 62 is positioned at a position higher than the height of the guide bosses 22 and 22 when the sheet-type connected staples 10 are completely consumed in the staple-refill 11, so that the bottom portions of the resilient engaging pieces 96 and 96 function as disengaging portions 96c and 96c.

Figure 95:
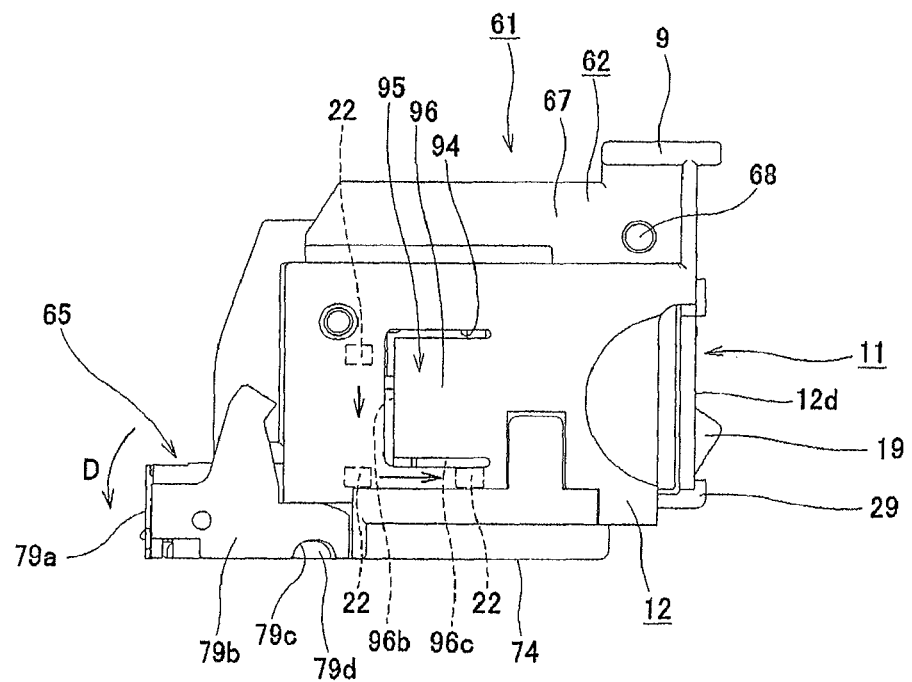
FIG. 95 is a lateral view illustrating the first modification of the locking mechanism when the staple-refill has been inserted into the cartridge.

As illustrated in FIGS. 93 and 94, when the staple-refill 11 is accommodated in the refill accommodating port 63 of the cartridge 61 through the refill inserting port 64, the guide bosses 22 and 22 of the cover member 15 first abut against the tapered surface of the pick-up portions 96a and 96a to resiliently displace the resilient engaging pieces 96 and 96 outward from the refill accommodating port 63. Continuously, the guide bosses 22 and 22 move over the pick-up portions 96a and 96a, and are engaged with the vertical wall of the separation restricting portions 96b and 96b of the resilient engaging pieces 96 and 96 resiliently returned. In use, the guide bosses 22 and 22 move gradually the separation restricting portions 96b and 96b down as the sheet-type connected staples 10 are decreased. When the sheet-type connected staples 10 of the staple-refill 11 is completely consumed, as illustrated in FIG. 95, the boss portions 23, 23, 23 and 23 formed on the rear surface of the cover member 15 are engaged with the escape portions 24, 24, 24 and 24 formed at four corners of the bottom surface 12e of the casing 12 (see FIG. 15), so that the guide bosses 22 and 22 are placed below the disengaging portions 96c and 96c lower than the separation restricting portions 96b and 96b. In this way, the staple-refill 11 can be separated from the refill accommodating port 63.

<11-2. Description of Second Modification of Locking Mechanism>

Figure 96:
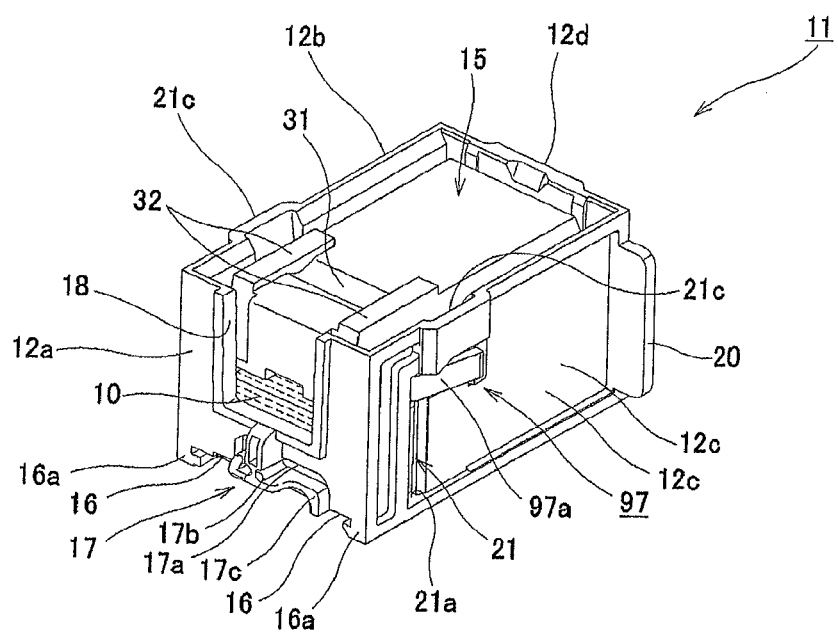
FIG. 96 is a lateral view illustrating the second modification of the locking mechanism of the staple-refill.

Although the above-described locking mechanism 95 is provided with the resilient engaging pieces 96 and 96 at the side of the cartridge 61, a locking mechanism 97 according to the second modification described herein is provided with resilient engaging pieces 97a and 97a at the side of the staple-refill 11. That is, as illustrated in FIGS. 96 and 97(B), the cover member 15 of the staple-refill 11 is provided with the resilient engaging pieces 97a and 97a which are formed integrally with the guide bosses 22 and 22. The resilient engaging pieces 97a and 97a are formed in an L-shape, and are extended to be gradually spaced apart from the lateral surfaces 12b and 12c towards the rear surface 12d of the casing 12 from the leading end portions of the guide bosses 22 and 22 passing through the guide holes 21 and 21 of the lateral surfaces 12b and 12c of the casing 12. The resilient engaging pieces 97a and 97a are resiliently displaced in the direction of the arrow G in FIG. 73(B) which are moved close to and apart from the lateral surfaces 12b and 12c of the casing 12.

Figure 97A:
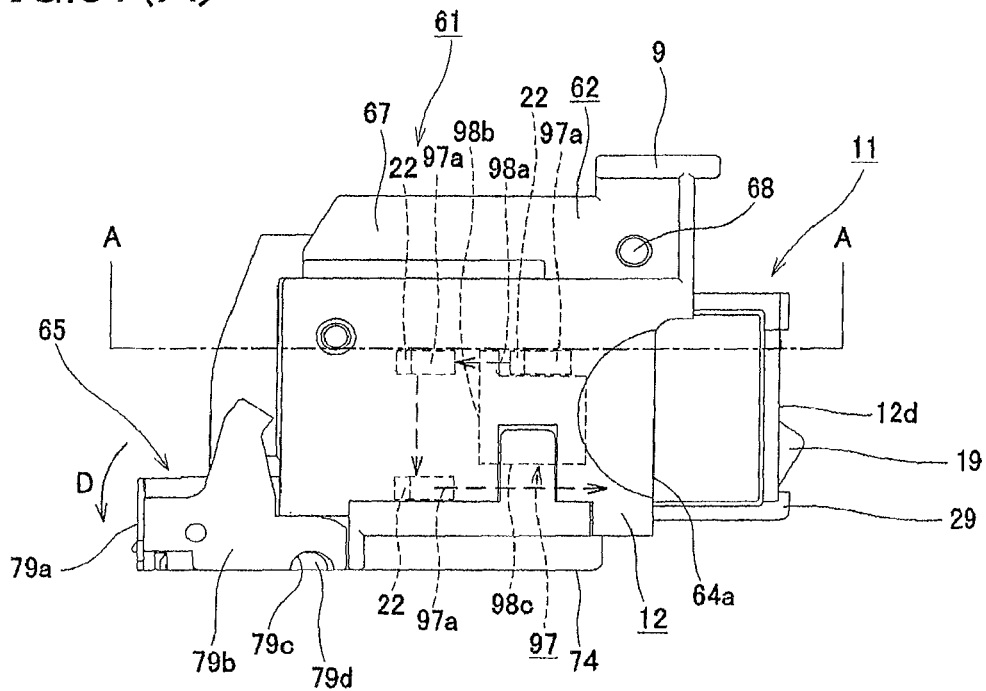
Figure 97B:
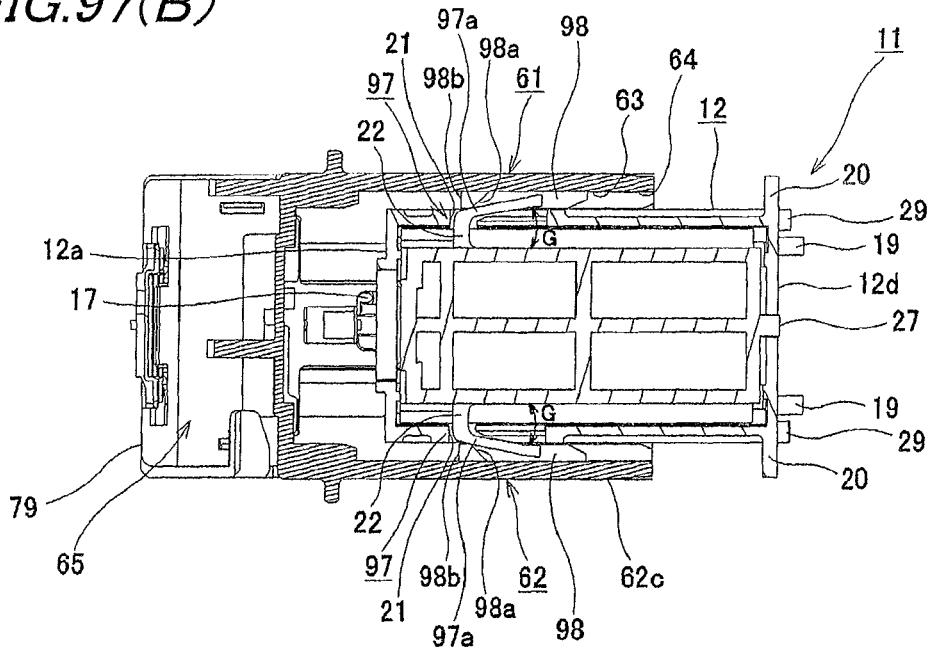

The resilient engaging pieces 97a and 97a are engaged with the engaging portions 98 and 98 formed on the inner surface of the lateral surfaces 62b and 62c of the cartridge body 62, as illustrated in FIGS. 97(A) and 97(B). The engaging portions 98 and 98 protrude inward rather than the lateral surfaces 62b and 62c are formed with an inclined surface at the side of the refill accommodating port 63, and have pick-up portions 98a and 98a for picking up the resilient engaging pieces 97a and 97a at the side of the staple-refill 11. The pick-up portions 98a and 98a have a height equal to or slightly higher than the height of the guide bosses 22 and 22 of the cover member 15 when the maximum amount of the sheet-type connected staples 10 is loaded in the staple-refill 11. Also, the resilient engaging pieces 97a and 97a have separation restricting portions 98b and 98b formed, at a portion opposite to the pick-up portions 98a and 98a, in parallel with the vertical guide portions 21a and 21a of the guide holes 21 and 21 of the staple-refill 11 to restrict separation of the staple-refill 11. The separation restricting portions 98b and 98b are formed by vertical walls so as not to be disengaged from the leading end portions of the resilient engaging pieces 97a and 97a. Moreover, the height of the lateral edge which is parallel to the insertion direction of the staple-refill 11 at the side of the base plate member 74 of the cartridge body 62 is positioned at a position higher than the height of the guide bosses 22 and 22 when the sheet-type connected staples 10 are completely consumed in the staple-refill 11, so that the bottom portions of the resilient engaging pieces 97a and 97a function as disengaging portions 98c and 98c.

Figure 98A:
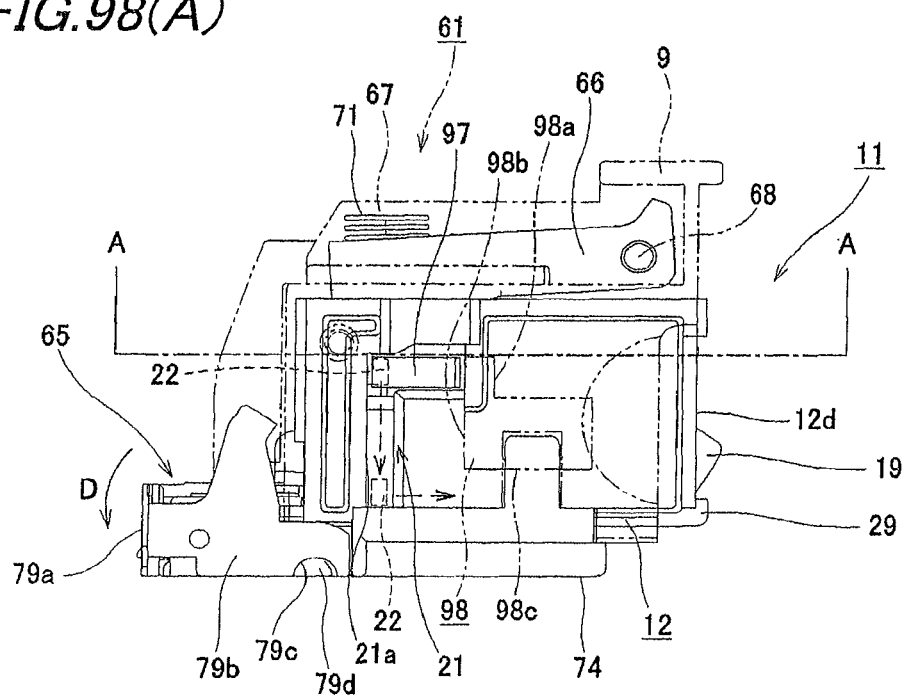
Figure 98B:
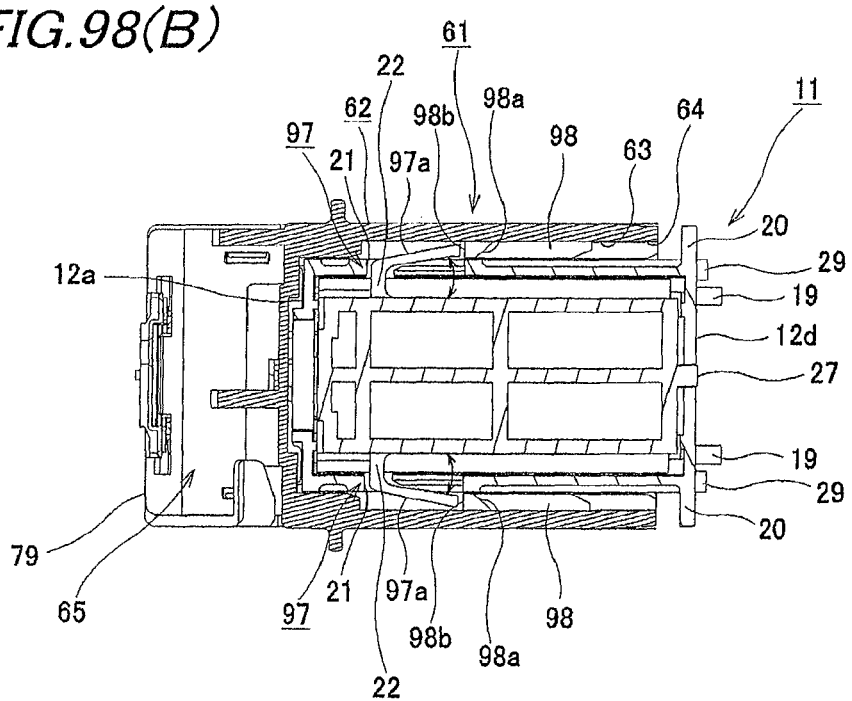
Figure 99:
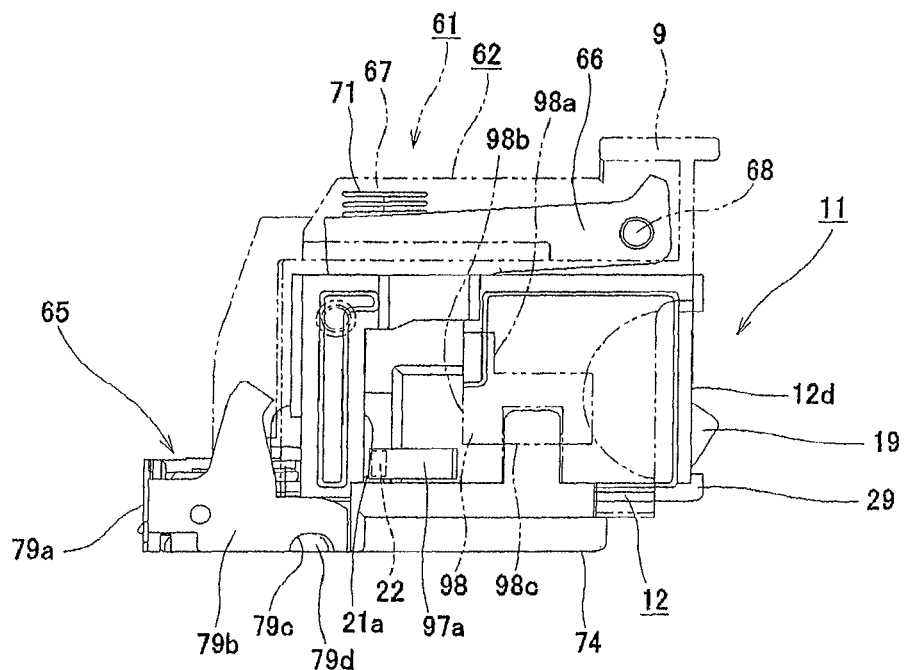
FIG. 99 is a lateral view illustrating a second modification of the locking mechanism in which the sheet-type connected staples in the staple-refill are completely consumed.

As illustrated in FIGS. 97(A) and 97(B), when the staple-refill 11 is accommodated in the refill accommodating port 63 of the cartridge 61 through the refill inserting port 64, the resilient engaging pieces 97a and 97a of the guide bosses 22 and 22 of the cover member 15 first abut against the tapered surface of the pick-up portions 98a and 98a at the proximal end thereof to resiliently displace the resilient engaging pieces in a direction close to the lateral surfaces 12b and 12c of the casing 12. As illustrated in FIGS. 98(A) and 98(B), the leading end portions at the rear surface 12d move over the pick-up portions 98a and 98a, and are engaged with the vertical wall of the separation restricting portions 98b and 98b. In use, the resilient engaging pieces 97a and 97a formed integrally with the guide bosses 22 and 22 move gradually the separation restricting portions 98b and 98b down as the sheet-type connected staples 10 are decreased. When the sheet-type connected staples 10 of the staple-refill 11 is completely consumed, as illustrated in FIG. 99, the boss portions 23, 23, 23 and 23 formed on the rear surface of the cover member 15 are engaged with the escape portions 24, 24, 24 and 24 formed at four corners of the bottom surface 12e of the casing 12 (see FIG. 15), so that the guide bosses 22 and 22 are placed below the disengaging portions 98c and 98c lower than the separation restricting portions 98b and 98b. In this way, the staple-refill 11 can be separated from the refill accommodating port 63.

<12. Description of Positioning of Staple-Refill in Height Direction (FIGS. 100 to 103)>

Figure 100:
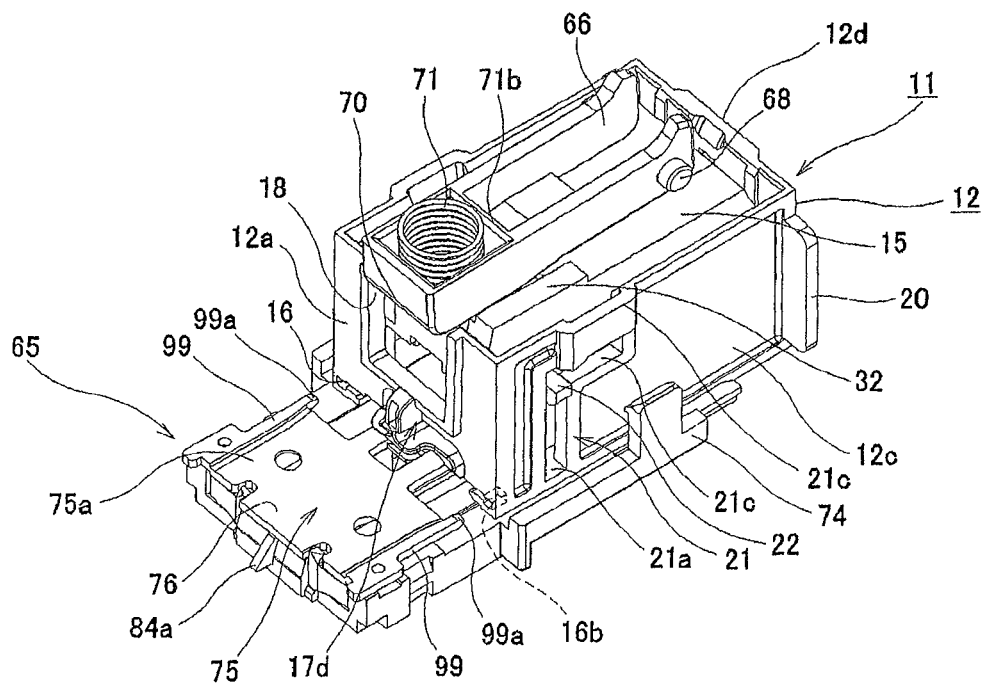
FIG. 100 is a perspective view illustrating the cartridge including a positioning boss of a height direction, except for the cartridge.
Figure 101:
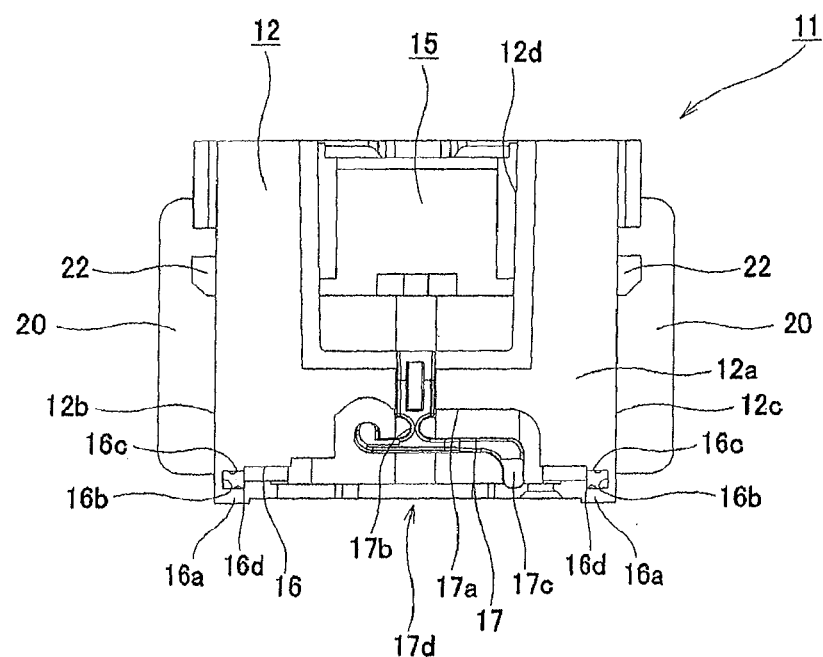
FIG. 101 is a front view of the staple-refill.
Figure 102:
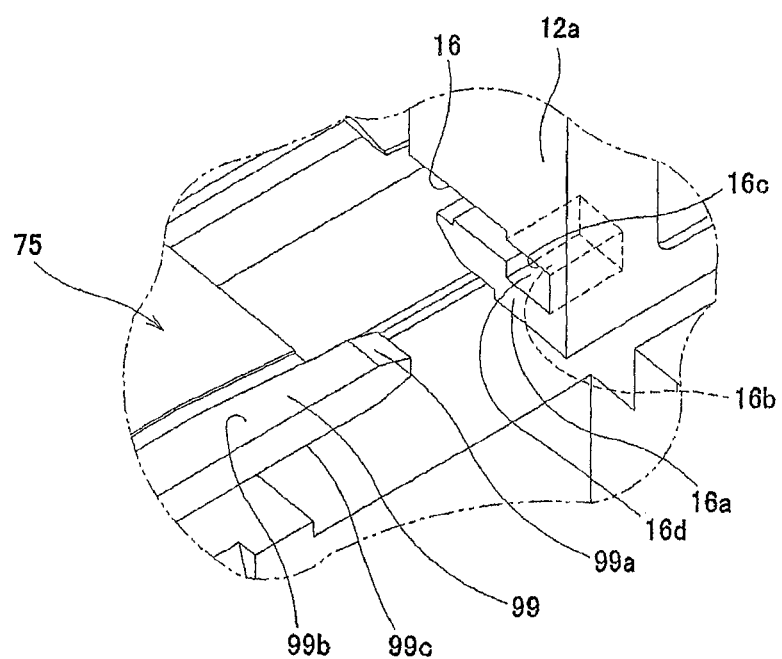
FIG. 102 is a perspective view of major parts to illustrate a state in which the positioning boss of the height direction is engaged with the staple-refill.

As illustrated in FIGS. 39 and 40, the positioning of the sheet-type connected staples 10 in the direction perpendicular to the transfer direction thereof is performed by fitting the positioning convex portion 89 of the staple guide plate 75b at the side of the cartridge 61 into the positioning concave portion 26 formed on the bottom surface 12e of the casing 12 of the staple-refill 11. In an example in FIG. 100, the positioning of the sheet-type connected staples 10 in a stacking direction thereof (thickness direction of the sheet-type connected staples 10) is further performed. Specifically, as illustrated in FIGS. 100 and 102, the staple guide cover 75a configuring the staple guide section 75 is provided with positioning fitting pieces 99 an d99 for positioning the staple-refill 11 in the height direction thereof at both leg portions at the side of the refill accommodating port 63. The positioning fitting pieces 99 and 99 are tapered to form a sharp portion at its leading end portions and thereby to form insertion guide portions 99a and 99a. The staple-refill 11 to be positioned is provided with positioning fitting holes 16b and 16b at both sides of the staple discharge port 16 of the front surface 12a of the casing 12.

Figure 103:
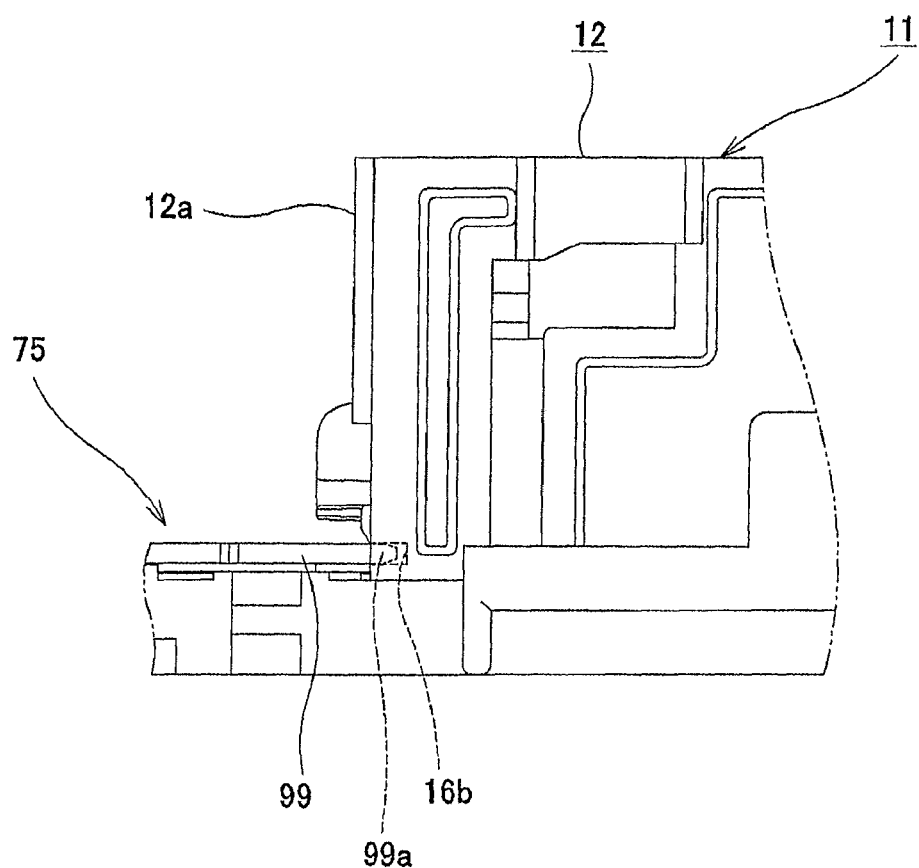
FIG. 103 is a lateral view of major parts to illustrate a state in which the positioning boss of the height direction is engaged with the staple-refill.

As illustrated in FIGS. 102 and 103, if the staple-refill 11 is accommodated in the refill accommodating port 63 of the cartridge 61, as illustrated in FIGS. 39 and 40, the positioning convex portion 89 of the staple guide plate 75b at side of the cartridge 61 is fitted into the position concave portion 26 formed on the bottom surface 12e of the casing 12 to perform the positioning of the sheet-type connected staples 10 in the direction perpendicular to the transfer direction thereof. Also, in the example, a top surface 99b and a bottom surface 99c of the positioning fitting pieces 99 and 99 of the staple guide cover 75a configuring the staple guide section 75 are fitted into the positioning fitting holes 16b and 16b while being held by an upper edge 16c and a lower edge 16d of the staple discharge port 16 formed in the front surface 12a of the casing 12. In this way, the lowermost sheet-type connected staple 10 in the staple accommodating portion 13 is reliably transferred to the passage formed between the staple guide cover 75a and the staple guide plate 75b of the staple guide section 75 from the staple discharge port 16 of the staple-refill 11. Meanwhile, the positioning fitting pieces 99 and 99 may not be formed on the staple guide cover 75a, but be formed on the staple guide plate 75b.

<13. Other Modifications>

<13-1. Description of First Modification>

In the above description, the case where the cartridge 61 can be attached to or detached from the magazine 101 at the side of the stapling-machine main-body and the case where the staple-refill 11 can be attached to or detached from the cartridge 61 have been explained. But, the cartridge 61 may be provided at the stapling-machine main-body, and the staple-refill 11 may be attached to or detached from the cartridge 61 at the side of the stapling-machine main-body. As illustrated in FIGS. 1 to 4, although the electric stapling machine for the saddle stitch has been explained as examples, the staple-refill may be applied to an electric stapling machine for an edge binding function provided in the paper processing device 3, or any electric stapling machines for use in other usage.

<13-2. Description of Second Modification>

Figure 104:
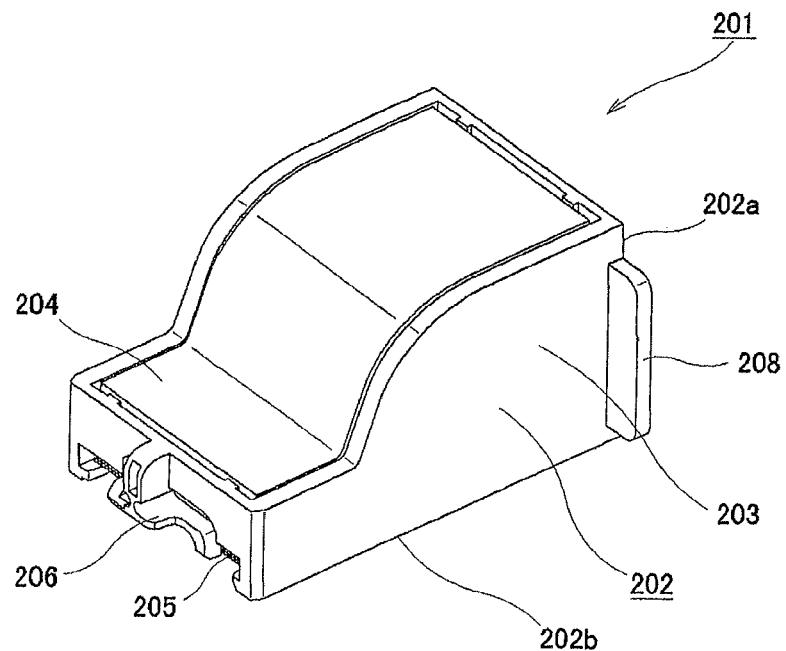
FIG. 104 is a perspective view illustrating the staple-refill received with the connected staples wound in a roll type, when seen from its front side.

In the above description, although the substantially rectangular staple-refill 11 using the sheet-type connected staples 10 has been explained, a staple-refill 201 accommodated with roll-type connected staples 200 may be used. The staple-refill 201 includes a casing 202, as illustrated in FIGS. 104 to 108. The casing 202 includes a staple accommodating portion 203 having a substantially circular section for accommodating a roll body 200a wound with a sheet-type connected staple as a roll shape, and a guide portion 204 which is spatially continuous with the staple accommodating portion 203 and guides the jointed staple 200 drawn out from the roll body 200a to the striking section 65 of the cartridge 61. The leading end portion of the guide portion 204 is provided with a staple discharge port 205 of a slit shape which functions as a staple discharge portion for discharging the connected staple 200, as illustrated in FIG. 104.

The staple discharge port 205 is formed to have a size of, for example, one sheet to five sheets of the sheet-type connected staples 10. Also, a fall-out preventing piece 206 is provided immediately above the staple discharge port 16, and protrudes rather than the staple discharge port 205. The fall-out preventing piece 206 is pivotally displaced in a plane parallel to the plane, in which the staple discharge port 205 is formed, via a thin hinge to open and close the staple discharge port 206. The fall-out preventing piece 206 functions as the first positioning projection, for example, when the staple-refill 201 is mounted in the mounting object such as the package.

The rear surface 202a of the casing 202 at the side of the staple accommodating portion 203 is provided with a pair of second positioning projections 207 and 207. The pair of second positioning projections 207 and 207 protrudes in a triangular shape at positions at a regular interval from a center line of the rear surface 202a in a width direction thereof. When the staple-refill 201 is mounted in the mounting object, such as the magazine of the stapling-machine main-body, the staple-refill 201 is mounted in the state in which the staple-refill is positioned by one position of the fall-out preventing piece 206 functioning as the first positioning projection as described above, and two positions of the second positioning projections 207 and 207 on the rear surface. The second positioning projections 207 and 207 may have an arc-shape, a stepped shape, or other shape illustrated in FIGS. 50(A) to 50(C), and the number of the second positioning projections 207 and 207 may be single or three or more second positioning projections, as illustrated in FIGS. 16 and 17.

Also, as illustrated in FIGS. 51(A) and 51(B), the second positioning projections may be provided as the second positioning concave portion.

The rear surface 202a of the casing 202 is provided with handle portions 208 and 208 formed by projections protruding in the direction of both lateral surfaces, and the handle portion 208 has the same height as the rear surface 202a. The handle portions 208 and 208 function as portions by which a finger is caught when the staple-refill 201 is detached from the cartridge 61. When the staple-refill 201 is mounted in the cartridge 61, the handle portions 208 and 208 are positioned at the opening end of the staple-refill insertion port 64 of the cartridge, more specifically, at the attaching/detaching operation recessed portion 64a which will be described later. When the staple-refill 201 is pulled out from the cartridge 61, the handle portions 208 and 208 exposed through the attaching/detaching operation recessed portion 64a is caught by the finger or the like so that the staple-refill 201 is easily pulled out from the cartridge 61. Also, when the staple-refill is mounted in the mounting object such as the package, the handle portions 208 and 208 function as the third positioning projections together with the fall-out preventing piece 206 functioning as the first positioning projection and the second positioning projections 207 and 207 on the rear surface.

As the configuration of the handle portion, as illustrated in FIGS. 18 to 20, the rear surface of the casing may be provided with the through-hole 20a, or may be provided with the notch portion 20c, as illustrated in FIGS. 22 and 23. Also, as illustrated in FIGS. 26 to 28, the recessed portions 20d and 20d may be configured as the handle portions.

Also, the rear surface 202a of the casing 202 is provided with pushed portions 209 and 209 which protrude from corner portions of the bottom surface to have the same height. When the cartridge 61 incorporated with the staple-refill 201 is mounted in the magazine 101 of the stapling-machine main-body, the pushed portions 209 and 209 are pressed against the mounting lever 104 which functions as the pressing portion of the magazine 101, so that the cartridge is positioned in the magazine 101. The pushed portions 209 and 209 is not limited to any position if its position is on the rear surface 12d, but it is preferable that the pushed portions are formed at a position near a region in which the bottom surface with high strength intersects with the lateral surfaces and the rear surface to improve its positioning accuracy. When the cartridge 61 mounted with the staple-refill 201 is mounted in the magazine 101 of the stapling-machine main-body, the pushed portions 209 and 209 are pressed against the push portions 102 and 102 of the magazine 101.

Meanwhile, the number of the pushed portions 209 and 209 is preferably one, or three or more, but it is preferable that the pushed portions are disposed to evenly apply a pushing force. Also, as illustrated in FIGS. 43 and 44, the pushed portions 209 and 209 may be configured as the flat portions 29a and 29a, or, as illustrated in FIGS. 45 and 46, may be configured as the concave portions 29b and 29b.

The bottom surface 202b of the casing 202 is provided with a notch recessed portion 211 which is continuous with the staple discharge port 205. The notch recessed portion 211 of the bottom surface is further provided with a positioning concave portion 212, which is recessed toward the rear surface 202a, at the substantial center thereof. The positioning concave portion 212 is engaged with the positioning convex portion formed on the bottom surface of the cartridge in which the staple-refill 201 described later is mounted. Referring to FIGS. 39 and 40, if the staple-refill 201 is accommodated in the refill accommodating port 63 of the cartridge 61, the positioning convex portion 89 of the staple guide plate 75b of the cartridge 61 is fitted into the positioning concave portion 212 formed on the bottom surface 202b of the casing 202 to perform the positioning of the connected staple 200 in a direction perpendicular to the transfer direction thereof.

Figure 105:
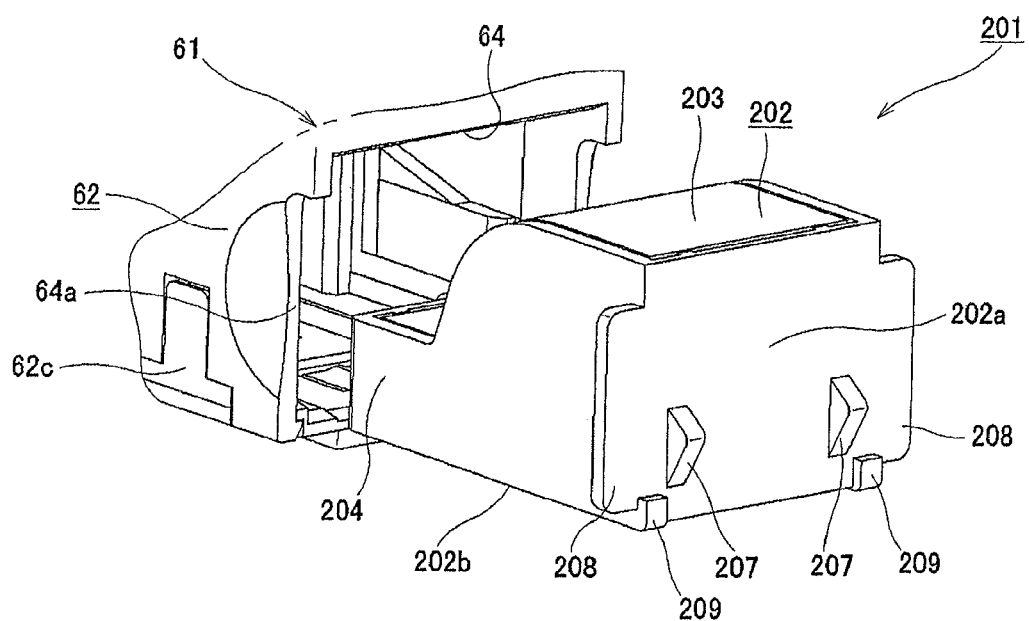
FIG. 105 is a perspective view of the staple-refill in FIG. 104, when seen from its rear side.
Figure 106:
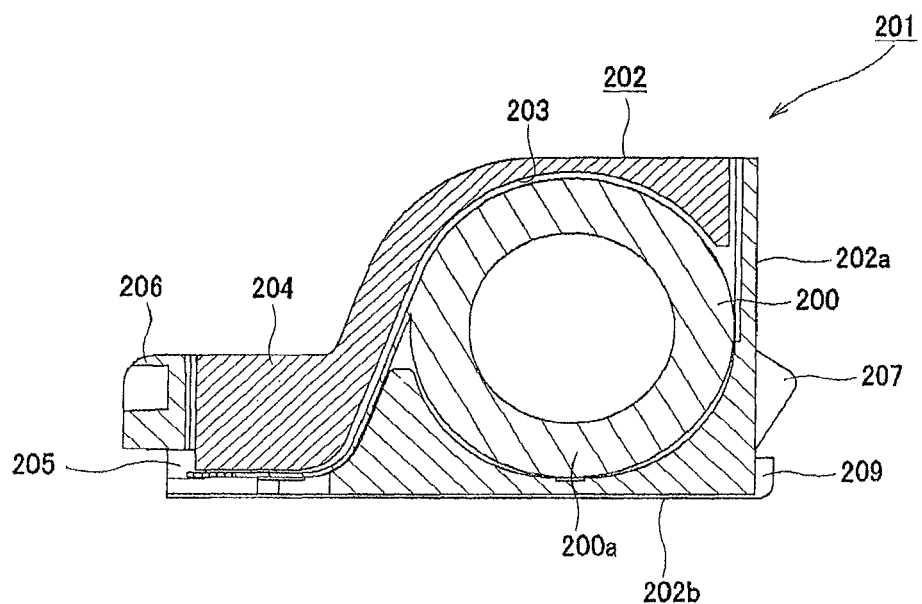
FIG. 106 is a cross-sectional view of the staple-refill in FIG. 104.
Figure 107:
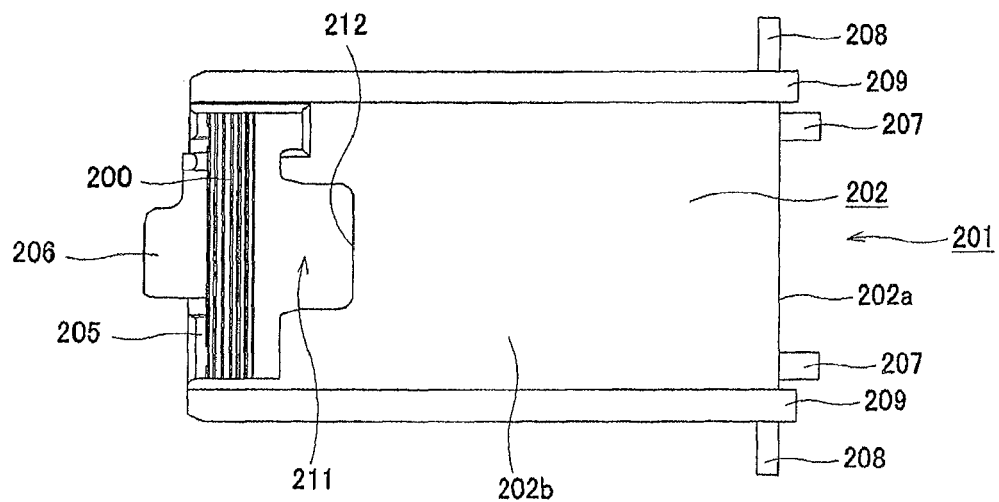
FIG. 107 is a bottom view of the staple-refill in FIG. 104.
Figure 108:
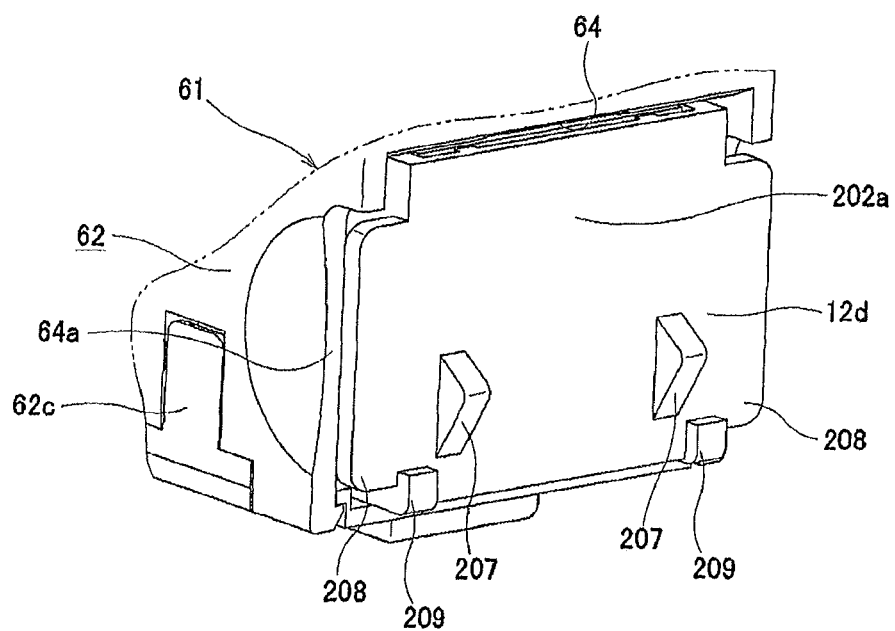
FIG. 108 is a perspective view illustrating a state in which the staple-refill in FIG. 104 is mounted in the cartridge.

The staple-refill 201 configured as described above is mounted in the cartridge 61 which is mounted in the magazine of the stapling-machine main-body of the electric stapling machine 1, as illustrated in FIGS. 105 and 106. The staple-refill is provided the notched space at the upper side of the front side, that is, the upper side of the guide portion 204, but the staple-refill is reliably mounted in the cartridge 61 by the upper portion of the staple accommodating portion 203, the positioning concave portion 212 and the positioning convex portion 89. The staple-refill 201 has an appearance different from that of the above-described staple-refill 11, but, the staple-refill is mounted in the refill accommodating portion 63 of the cartridge 61 since the push lever 41 at the side of the cartridge 61 is disposed on the side of the staple accommodating portion 203 and the space portion forming above the guide portion 204.

In accordance with to an embodiment, as shown in the figures, a staple-refill 11 may include: a casing 12 in which a plurality of sheet-type connected staples 10 are stacked and accommodated; a staple inserting port 14 which is formed in the casing 12 and through which the sheet-type connected staples 10 are inserted in the casing 12 in an insertion direction; a staple discharge port 16 which is formed in the casing 12 and from which the sheet-type connected staples 10 in the casing 12 are discharged; a cover member 15 which covers the sheet-type connected staples 10 in the casing 12 from a side of the staple inserting port 14; a guide boss 22 formed in the cover member 15; a guide portion 21 which is formed in the casing 12 and extending in the insertion direction, the guide boss 22 being engaged with the guide portion 21 to guide the cover member 15 in the insertion direction; and a notch portion 18 formed in the casing 12 and extending from an edge of the staple inserting port 14 in the insertion direction.

According to this structure, since the casing is provided with the notch portion extending from the edge of the staple inserting port in the insertion direction, the casing can easily outward bend the staple inserting port adjacent to the surface formed with the notch portion. Accordingly, the staple inserting port is increased, so that it is possible to easily perform attaching operation of the cover member or inserting operation of the sheet-type connected staples.

In the above structure, the guide boss may include a first boss 22 and a second boss 22 respectively formed on opposed end faces 15a, 15a of the cover member 15 in a width direction perpendicular to the insertion direction, and the guide portion may include a first guide part 21 and a second guide part 21 respectively formed on side surfaces 12b, 12c of the casing 12 which are opposed to each other in the width direction.

In the above structure, the staple inserting port 14 may be formed on one 12f of two surfaces 12f, 12e of the casing 12 which are perpendicular to the insertion direction.

The staple discharge port 16 may be formed on another surface 12a of the casing 12 including the insertion direction and a width direction in which each of staples of the sheet-type connected staples extends. The notch portion 18 is formed between the staple discharge port 16 and the staple inserting port 14 in the insertion direction.

In the above structure, the cover member 15 may include an additional guide boss 27 on an end face 15b of the cover member 15 between the said opposite end faces 15a, 15a, and the casing 12 may include an additional guide portion 28 extending in the insertion direction, wherein the additional guide boss 27 engages with the additional guide portion 28.

In the above structure, the notch portion 18 may include an opening thorough which a push lever 66 for pressing the sheet-type connected staples 10 the casing 12 via the cover member 15 at a side of a stapling machine 1 or a cartridge 61 passes when the casing 12 is attached to or detached from the staple-refill 11 to/from a main-body of the stapling-machine 1 or the cartridge 61 to be attached to or detached from the main-body of the stapling machine 1.

In the above structure, the notch portion 18 may be structured such that a push lever 66 passes through an opening portion of the notch portion 18, in an attaching/detaching operation of the staple-refill 11 to/from a main-body of a stapling-machine 1 or a cartridge 61 to be attached to or detached from the main-body of the stapling machine 1. The push lever 66 may include at a side of the stapling-machine main-body or the cartridge 61, and adapted to press the sheet-type connected staples 10 in the casing 12 via the cover member 15.

In the above structure, the notch portion 18 may be formed on at least one of said side surfaces 12b, 12c the casing 12 on which the first guide part 21 or the second guide part 21 is formed.

In the above structure, the guide portion may comprise a guide hole 21. The guide boss 22 may penetrate through the guide portion 21 to protrude outward. The guide boss 22 may engage with a positioning concave portion 113 of a mounting object 111 that accommodates the casing 12. The positioning concave portion 113 may be positioned at a position corresponding to the guide boss 22.

In the above structure, the cover member 15 may include a check claw 22a on a peripheral portion thereof. The casing 12 may include a check groove 22b which is engaged with the check claw 22a to prevent the cover member 15 from moving to the staple inserting port 14.

In the above structure, the notch portion 18 may include a bottom end 18B (as shown, for example, in FIG. 13) at an end of the notch portion 18 in the insertion direction at a side of the staple discharge port 16. The casing 12 may include one farthest end in one side in the insertion direction and the other farthest end in the other side in the insertion direction. The bottom end 18B of the notch portion 18 may position in the insertion direction between the staple discharge port 16 and a center of said one farthest end and the other farthest end of the casing 12 in the insertion direction.

In the above structure, the notch portion 18 may be formed on the side surface 12a of the casing 12 on which the staple discharge port 16 is formed.

In the above structure, the notch portion 18 may include a bottom end 18B at an end of the notch portion 18 in the insertion direction at a side of the staple discharge port 16. The casing 12 may include a wall 12BT defining the other 12*e* of said two surfaces 12*f*, 12*e* perpendicular to the insertion direction. A dimension L1 of the cover member 15 in the insertion direction may be larger than a length L2 between a face of the wall 12BT in a side of the staple inserting port 14 and the bottom end 18B of the notch portion 18 in the insertion direction. A dimension L1 of the cover member 15 in the insertion direction may be substantially the same with a length L2 between a face of the wall 12BT in a side of the staple inserting port 14 and the bottom end 18B of the notch portion 18 in the insertion direction.

In accordance with to an embodiment, as shown in the figures, a staple-refill 11, 201 may include: a casing 12, 202 in which a connected staple 10, 200 is accommodated; a staple discharge port 16, 205 which is formed in the casing 12, 202 to discharge the connected staple 10, 200 from the casing 12, 202; a first positioning projection 17*d*, 206 which is formed on a surface 12*a* of the casing 12, 202 on which the staple discharge portion 16, 205 is formed; and a second positioning projection 19, 207 which is formed on a surface 12*d*, 202*a* of the casing 12, 202 which is opposite to the surface 12*a* on which the staple discharge portion 16, 205 is formed.

In the above structure, at least one of the first positioning projection 17*d*, 206 and the second position projection 19, 207 may include a plurality of projection sections.

The staple-refill 11, 201 may further include a third positioning projection 20, 208 protruding outward from said opposite surface 12*d*, 202*a* on which the second positioning projection 19, 207 is formed.

In the above structure, the casing 12 may include: a staple inserting port 14 through which the connected staple 10 is inserted in the casing 12 in an insertion direction; a cover member 15 which covers the connected staple 10 in the casing 12 from a side of the staple inserting port 14; a guide boss 22 formed in the cover member 15; and a guide hole 21 which is formed in the casing 12 and extending in the insertion direction, the guide boss 22 being engaged with the guide hole 21 to guide the cover member 15 in the insertion direction. The guide boss 22 may pass through the guide hole 21 to protrude outward, thereby forming a fourth positioning projection.

In the above structure, the first positioning projection 17*d*, 206 may be displaceable from a position which is overlapped with the staple discharge port 16, 205 to a position which is escaped from the staple discharge port 16, 205.

According to an embodiment, the staple-refill is supported by the first and second positioning projections which are provided on the opposite surfaces of the casing. Accordingly, the staple-refill can be accommodated in the mounting object in a stable posture by engaging the first and second positioning projections with the positioning concave portions of the mounting object.

In accordance with to an embodiment, as shown in the figures, a staple-refill 11 may include: a casing 12 in which a plurality of sheet-type connected staples 10 are stacked and accommodated; and a notch portion 18 which is formed on one side surface 12*a* of the casing 12. The casing 12 may be attached to or detached from a main-body of a stapling-machine 1 or a cartridge 61 which is to attached to or detached from the stapling-machine main-body, in a transfer direction in which the sheet-type connected staples 10 in the casing is transferred to a striking section in the stapling machine 1. The notch portion 18 may have a shape to enable a push lever 66 to pass, at least in a detaching operation of the casing 12 from the stapling-machine main-body or the cartridge, wherein the push lever 66 pushes and biases the sheet-type connected staples 10 in the casing 12 in a stacking direction in which the sheet-type connected staples 10 are stacked in the casing 12.

According to this structure, the releasing operation of the push lever is not necessary, thereby improving its operability. Also, the push lever can continuously push the sheet-type connected staples, thereby preventing the staple-refill from being fallen out from the stapling-machine main-body or the cartridge, in addition to reliably sending the sheet-type connected staples using the transfer mechanism.

In the above structure, the notch portion 18 may be formed to enable the push lever 66 to pass in a state in which the push lever 66 is pushing and biasing the sheet-type connected staples 10 in the stacking direction.

In the above structure, the side surface of the casing 12 on which the notch portion 18 may be formed is an insertion surface 12*a* from which the staple-refill 11 is inserted to the stapling-machine main-body or the cartridge. The notch portion 18 may be formed by opening the insertion surface 12*a* at a side of a staple inserting port 14 through which the sheet-type connected staples 10 are inserted in the casing 12.

In the above structure, the staple-refill may further include a cover member 15 which covers the sheet-type connected staples 10 in the casing 12 and is movable in the stacking direction. The cover member 15 may push and bias the sheet-type connected staples 10 by being pushed and biased by the push lever 66.

In the above structure, the casing 12 may include a handle portion 20 on a surface 12*d* opposite to the insertion surface 12*a*.

In the above structure, the notch portion 18 may include a tapered portion 18*c* of which a side for receiving the push lever 66 is wide.

In accordance with to an embodiment, as shown in the figures, a staple-refill 11, 201 may include: a casing 12, 202 in which a connected staple 10, 200 is accommodated and which is to be mounted in a main-body of a stapling-machine 1 or a cartridge 61 to be mounted in the main-body of the stapling-machine 1, the stapling-machine main-body or the cartridge including a staple guide portion 75 that guides width ends and at least one of upper and lower flat portions of the connected staple 10 during transferring the connected staple 10, 200; a staple discharge portion 16, 205 which is formed in the casing 12, 202 to discharge the connected staple 10, 200 from the casing 12, 202; and a pushed portion 29, 19, 209 which is provided on the casing 12, 202 and to be pushed by a push portion 102, 104 that pushes the casing 12, 202 towards the staple guide portion 75 when the staple-refill 11, 201 or the cartridge 61 is mounted in the stapling-machine main-body.

According to this structure, when the staple-refill is positioned in the stapling-machine main-body or the cartridge, the staple-refill is pushed by the push portion of the cartridge or the stapling-machine main-body. Also, since the staple-refill is pushed by a mounting reference portion, the staple-refill can be accurately positioned in the stapling-machine main-body or the cartridge.

In the above structure, the casing 12, 202 may be pushed by the push portion 102, 104 to be in close-contact with the staple guide portion 75, when the staple-refill 11, 201 or the cartridge 61 is mounted in the stapling-machine main-body.

In the above structure, the casing 12, 202 may include a locked portion 19, 209 which is to be engaged with a locking member 104 that maintain a state in which the casing 12, 202 is pushed by the push portion 102.

In the above structure, the pushed portion 29, 209 may include an inclined portion. When the staple-refill 11, 201 or the cartridge 61 is mounted in the stapling-machine main-body, the inclined portion of the pushed portion 29, 209 may be pressed by the push portion 102, so that the casing 12, 202 is in close-contact to the staple guide portion 75, and the staple-refill is locked to the stapling-machine main-body or the cartridge.

In the above structure, the inclined surface of the pushed portion 29, 209 may face a direction of a bottom surface 12e of the casing 12, 202 and the staple guide portion 75.

In the above structure, the pushed portion may include an arc-shape surface 19c of a convex or concave shape facing a direction of a bottom surface 12e of the casing 12 and the staple guide portion 75.

In the above structure, the pushed portion may include a stepped shape 19 formed by a surface parallel to a surface 12a of the casing 12 at a side of the staple guide portion 75 and a surface parallel to a bottom surface 12e of the casing 12.

In the above structure, the staple-refill 11, 201 may be mounted in the stapling-machine main-body or the cartridge which is provided with the staple guide portion 75 at a front side thereof and includes a face plate 76 with which the staple guide portion 75 comes into contact and which forms a gap through which the staple to be struck passes.

According to an embodiment, when the staple-refill is positioned in the stapling-machine main-body or the cartridge, the staple-refill is pushed by the push portion of the cartridge or the stapling-machine main-body. Also, since the staple-refill is pushed by a mounting reference portion, the staple-refill can be accurately positioned in the stapling-machine main-body or the cartridge. As a result, it is possible to shorten a stroke of a transfer plate or a guide member of a transfer mechanism of a connected staple of the stapling-machine main-body or the cartridge, thereby miniaturizing the stapling-machine main-body or the cartridge.

Also, according to an embodiment, since the gap through which the staple passes is formed by bringing the staple guide portion into contact with the face plate to allow the casing be close to the staple guide portion, it is possible to reliably maintain a size of the gap.

In accordance with an embodiment, as shown in the figures, a stapling machine 1 may include: a stapling machine main body; a staple-refill 11 which includes a casing 12 in which a plurality of sheet-type connected staples 10 are stacked and accommodated, and which is to be mounted directly in the stapling machine main body or mounted in the stapling machine main body through a cartridge 61; and a push lever 66 which pushes and biases the sheet-type connected staples 10 in the casing 12 in a stacking direction in which the sheet-type connected staples 10 are stacked in the casing 12. A notch portion 18 may be formed on one side surface 12a of the casing 12. The notch portion 18 may have a shape to enable the push lever 66 to pass in a detaching operation of the staple-refill 11 from the stapling-machine main-body or the cartridge.

In accordance with an embodiment, as shown in the figures, a stapling machine 1 may include: a stapling-machine main-body; and a staple-refill 11, 201 which is to be mounted directly in the stapling machine main body or mounted in the stapling machine main body through a cartridge 61. The staple-refill 11, 201 may include a casing 12, 202 in which a connected staple 10, 200 is accommodated. The stapling-machine main-body or the cartridge may include a staple guide portion 75 that guides width ends and at least one of upper and lower flat portions of the connected staple 10 during transferring the connected staple 10, 200. The staple-machine main-body may include a push portion 102, 104 that pushes the casing 12, 202 towards the staple guide portion 75 when the staple-refill 11, 201 or the cartridge 61 is mounted in the stapling-machine main-body. The casing 12, 202 may include a pushed portion 29, 19, 209 which is pushed by the push portion 102, 104.

DESCRIPTION OF REFERENCE NUMERALS

1 . . . electric staple/saddle stitch unit; 1b . . . staple unit; 2 . . . image forming apparatus; 3 . . . paper processing device; 5 . . . guide roller; 6 . . . knife edge; 7 . . . folding roller; 8 . . . discharge tray; 9 . . . tap; 9a . . . frame; 10 . . . sheet-type connected staple; 11 . . . staple-refill; 12 . . . casing; 12a . . . front surface; 12b, 12c . . . lateral surface; 12d . . . rear surface; 12e . . . bottom surface; 12f . . . top surface; 12g . . . front wall; 13 . . . staple accommodating portion; 14 . . . staple inserting opening; 15 . . . cover member; 15a . . . lateral end face; 15b . . . rear-side end face; 16 . . . staple discharging port; 16a . . . end face; 16b . . . positioning fitting hole; 16c . . . upper edge; 16d . . . lower edge; 16e . . . corner portion; 17 . . . fall-out preventing piece; 17a . . . concave portion; 17b . . . hinge; 17c . . . boss portion; 17d . . . projection; 18 . . . notch portion; 18a . . . slit; 18b . . . circular portion; 18c . . . tapered portion; 18e . . . hinge portion; 18f . . . punch piece; 19, 19a, 19b . . . second positioning projection; 19c . . . upper end face; 19d . . . positioning concave portion; 20 . . . handle portion; 20a . . . through-hole; 20b . . . recessed portion; 20c . . . notch portion; 20d . . . recessed portion; 21 . . . guide hole; 21a . . . vertical guide portion; 21b . . . horizontal guide portion; 21c . . . joint portion; 22 . . . guide boss; 22a . . . check claw; 22b . . . check groove; 23 . . . boss portion; 24 . . . escape portion; 25 . . . notch recessed portion; 26 . . . positioning concave portion; 27 . . . guide boss; 27a . . . recessed portion; 27b . . . guide groove; 28 . . . guide hole; 29 . . . pushed portion; 29a . . . planar portion; 29b . . . concave portion; 31 . . . engaging portion; 31a . . . concave portion; 31b . . . stepped portion; 31c . . . concave portion; 31d . . . boss portion; 32 . . . guide wall; 33 . . . lever guide hole; 34a . . . vertical portion; 34b . . . horizontal portion; 35 . . . guide rail; 36 . . . guide groove; 37 . . . thin portion; 61 . . . cartridge; 61a . . . pivot boss; 62 . . . cartridge body; 62a . . . top surface; 62b, 62c lateral surfaces; 62d . . . rear surface; 62e . . . front surface; 64 . . . refill inserting port; 64a . . . attaching/detaching operation recessed portion; 64b . . . notch recessed portions; 65 . . . striking section; 66 . . . push lever; 66a . . . guide piece; 67 . . . lever installing portion; 68 . . . pivot shaft; 69 . . . pivot hole; 70 . . . push portion; 70a . . . tapered portion; 71 . . . coil spring; 71a . . . locking convex portion; 71b . . . locking concave portion; 72 . . . locking mechanism; 73 . . . engaging portion; 73a . . . pick-up portion; 73b . . . separation restricting portion; 73c . . . disengaging portion; 74 . . . base plate member; 74a . . . positioning hole; 74b, 74c . . . positioning boss; 74d, 74d . . . engaging piece; 74e . . . engaging recessed portion; 75 . . . staple guide section; 75a . . . staple guide cover; 75b . . . staple guide plate; 76 . . . anvil; 77 . . . pusher; 77a . . . leg portion; 77b . . . guide recessed portion; 78 . . . biasing member; 79 . . . faceplate; 79a . . . face portion; 79b . . . arm portion; 79c . . . support recessed portion; 79d . . . pivot support boss; 80a . . . forming plate; 80b . . . driver plate; 81 . . . transfer mechanism; 82 . . . guide recessed portion; 82a . . . guide wall; 83 . . . guide member; 83a . . . opening; 83b, 84b . . . concave portion; 84 . . . transfer plate; 84a . . . inclined portion; 85 . . . transfer claw; 85a . . . support shaft;

86 . . . torsion coil spring; 87 . . . coil spring; 88 . . . positioning mechanism; 89 . . . positioning convex portion; 91 . . . first abutting portion; 92 . . . second abutting portion; 94 . . . slit; 95 . . . locking mechanism; 96 . . . resilient engaging piece; 96a . . . pick-up portion; 96b . . . separation restricting portion; 96c . . . disengaging portion; 97 . . . locking mechanism; 97a . . . resilient engaging piece; 98 . . . engaging portion; 98a . . . pick-up portion; 98b . . . separation restricting portion; 98c . . . disengaging portion; 99 . . . positioning fitting piece; 99a . . . insertion guide portion; 101 . . . magazine; 102 . . . pushing portion; 102a . . . convex portion; 103 . . . mounting reference portion; 104 . . . mounting lever; 104a . . . engaging piece; 105 . . . pivot support portion; 106 . . . pushing member; 106a . . . pushing portion; 111 . . . mounting object; 112 . . . receiving portion; 113 . . . lateral positioning concave portion; 114 . . . rear-surface positioning concave portion; 115 . . . bottom surface support portion; 121 . . . mounting object; 122 . . . receiving portion; 122a . . . front surface; 122b . . . rear surface; 122c, 122d . . . lateral surface; 123 . . . first positioning concave portion; 124 . . . positioning member; 124a . . . operation portion; 124b . . . operation hole; 125 . . . coil spring; 126 . . . positioning concave portion; 127 . . . positioning concave portion; 131 . . . mounting object; 132 . . . receiving portion; 132a . . . front surface; 132b . . . rear surface; 132c, 132d . . . lateral surface; 133 . . . first positioning concave portion; 134 . . . second positioning concave portion; 135 . . . third positioning concave portion; 136 . . . fourth positioning concave portion; 137 . . . bottom-surface support portion; 200 . . . connected staple; 201 . . . staple-refill; 202 . . . casing; 202a . . . rear surface; 202b . . . bottom surface; 203 . . . staple accommodating portion; 204 . . . guide portion; 205 . . . staple discharge port; 206 . . . fall-out preventing piece; 207 . . . second positioning projection; 208 . . . handle portion; 209 . . . pushed portion; 211 . . . notch recessed portion; 212 . . . positioning concave portion

What is claimed is:

1. A staple-refill comprising:
   a casing including a front wall, a rear wall, side walls and a bottom wall that define a space in which a plurality of sheet-type connected staples are stacked and accommodated;
   a staple discharge portion which is formed in the front wall and from which the sheet-type connected staples in the casing are discharged;
   a cover member which covers the sheet-type connected staples in the casing;
   a guide boss formed in the cover member;
   a guide portion which is formed in the side walls and extending in a stacking direction in which the sheet-type connected staples are stacked in the casing, the guide boss being engaged with the guide portion to guide the cover member in the stacking direction; and
   a notch portion provided in the front wall, the notch portion having an edge extending from an upper edge of the front wall in the stacking direction,
   wherein the cover member is disposed in the casing such that the notch portion does not, overlap with the cover member as seen in the stacking direction,
   wherein the notch portion is provided at an upper side of the staple discharge portion in the stacking direction and includes a bottom end which is an end of the notch portion at a side of the staple discharge portion in the stacking direction, and
   wherein a dimension of the cover member in the stacking direction is larger than a length between a surface of the bottom wall at a side of the cover member and a bottom end of the notch portion in the stacking direction.

2. The staple-refill according to claim 1, wherein the guide boss includes a first boss and a second boss respectively formed on opposed end faces of the cover member in a width direction perpendicular to the stacking direction, and
   wherein the guide portion includes a first guide part and a second guide part respectively formed in the side walls of the casing which are opposed to each other in the width direction.

3. The staple-refill according to claim 2, wherein the cover member is provided with an additional guide boss on an end face of the cover member between the opposed end faces, and
   wherein the casing is provided with an additional guide portion extending in the stacking direction, wherein the additional guide boss engages with the additional guide portion.

4. The staple-refill according to claim 1,
   wherein the notch portion includes an opening through which a push lever for pressing the sheet-type connected staples in the casing via the cover member at a side of a stapling machine or a cartridge passes when the casing is attached to or detached from the staple-refill to/from a main-body of the stapling-machine or the cartridge to be attached to or detached from the main-body of the stapling machine.

5. The staple-refill according to claim 1,
   wherein the notch portion is structured such that a push lever passes through an opening of the notch portion, in an attaching/detaching operation of the staple-refill to/from a main-body of a stapling-machine or a cartridge to be attached to or detached from the main-body of the stapling machine, and
   wherein the push lever is provided at a side of the stapling-machine main-body or the cartridge, and adapted to press the sheet-type connected staples in the casing via the cover member.

6. The staple-refill according to claim 1, wherein the guide portion comprises a guide hole, and
   wherein the guide boss penetrates through the guide portion to protrude outward, and the guide boss engages with a positioning concave portion of a mounting object that accommodates the casing, the positioning concave portion being positioned at a position corresponding to the guide boss.

7. The staple-refill according to claim 1,
   wherein the cover member is provided with a check claw on a peripheral portion thereof, and
   wherein the casing is provided with a check groove which is engaged with the check claw to prevent the cover member from moving toward the upper edge of the front wall.

8. A staple-refill comprising:
   a casing including a front wall, a rear wall, side walls and a bottom wall that define a space in which a plurality of sheet-type connected staples are stacked and accommodated;
   a staple discharge portion which is provided in the front wall and from which the sheet-type connected staples in the casing are discharged in a discharge direction;
   a cover member which covers the sheet-type connected staples in the casing;
   a guide boss formed in the cover member;
   a guide portion which is provided its the side walls and extending in a stacking direction in which the sheet-type connected staples are stacked in the casing, the guide boss being engaged with the guide portion to guide the cover member in the stacking direction; and a notch portion provided in the front wall, the notch portion having an edge extending from an upper edge of the front wall in the stacking direction, wherein the notch portion is provided between the staple discharge portion and the upper edge of the front wall in the stacking direction, wherein the cover member is disposed in the casing such that the notch portion does not overlap with the cover member as seen in the stacking direction.

9. The staple-refill according to claim 8, wherein the notch portion has the edge continuous with the upper edge of the front wall such that the side walls are more easily deformed in a width direction in which the side walls face each other.

10. A staple-refill comprising:

a casing including a front wall, a rear wall, side walls and a bottom wall that define a space in which a plurality of sheet-type connected staples are stacked and accommodated;

a staple discharge portion which is provided in the front wall and from which the sheet-type connected staples in the casing are discharged;

a cover member which covers the sheet-type connected staples in the casing;

a boss formed in the cover member;

a hole portion which is provided in the side walls, the boss being arranged in the hole portion to allow the cover member to move in a stacking direction in which the sheet-type connected staples are stacked in the casing; and a notch portion provided in the front wall, the notch portion having an edge extending from an upper edge of the front wall in the stacking direction, wherein the notch portion is provided at an upper side of the staple discharge portion in the stacking direction, wherein the cover member is disposed in the casing such that the notch portion does not overlap with the cover member as seen in the stacking direction.

* * * * *